US012359465B2

(12) United States Patent
Denison et al.

(10) Patent No.: US 12,359,465 B2
(45) Date of Patent: Jul. 15, 2025

(54) LOCK

(71) Applicant: TriTeq Lock and Security, LLC, Elk Grove Village, IL (US)

(72) Inventors: William D. Denison, North Barrington, IL (US); Gabriel Ribu, Niles, IL (US)

(73) Assignee: TRITEQ LOCK AND SECURITY, LLC, Elk Grove Village, IL (US)

( * ) Notice: Subject to any disclaimer, the term of this patent is extended or adjusted under 35 U.S.C. 154(b) by 520 days.

(21) Appl. No.: 17/673,658

(22) Filed: Feb. 16, 2022

(65) Prior Publication Data

US 2022/0259893 A1 Aug. 18, 2022

Related U.S. Application Data

(60) Provisional application No. 63/149,737, filed on Feb. 16, 2021.

(51) Int. Cl.
*E05B 47/00* (2006.01)
*E05B 1/00* (2006.01)
(Continued)

(52) U.S. Cl.
CPC ........ *E05B 47/0012* (2013.01); *E05B 1/0007* (2013.01); *E05B 3/08* (2013.01); *E05B 15/006* (2013.01); *E05B 37/0031* (2013.01); *E05B 37/0072* (2013.01); *E05B 47/0673* (2013.01); *E05B 63/0056* (2013.01);
(Continued)

(58) Field of Classification Search
CPC ........ E05B 3/08; E05B 1/003; E05B 47/0012; E05B 47/0673; E05B 15/0053; E05B 37/0031; E05B 63/0056; E05B 2047/0058; E05B 13/10; E05B 13/105; E05B 13/106; E05B 13/108
See application file for complete search history.

(56) References Cited

U.S. PATENT DOCUMENTS

| | | | |
|---|---|---|---|
| 3,157,042 | A | 11/1964 | Wolz |
| 3,269,204 | A | 8/1966 | Schleicher, Jr. |

(Continued)

FOREIGN PATENT DOCUMENTS

| | | | |
|---|---|---|---|
| DE | 19754923 | C1 | 4/1999 |
| DE | 102006001293 | A1 | 7/2007 |

(Continued)

*Primary Examiner* — Kristina R Fulton
*Assistant Examiner* — Christopher F Callahan
(74) *Attorney, Agent, or Firm* — The Watson IP Group, PLC; Jovan N. Jovanovic

(57) ABSTRACT

A lock comprising a housing assembly, an actuatable lock assembly and a locking shell assembly. The housing assembly has a cavity and a bore. The actuatable lock assembly is rotatable between a closed orientation and an open orientation, and includes an outer body and an inner body. The inner body has a knob and an elongated shaft with an axial pin that interfaces with a slot in the outer body. The locking shell assembly has a shell housing bore extending therethrough. A rear portion of the shell housing has a slot with a longitudinal first portion and a transverse second portion. The axial pin is slidably movable along the longitudinal first portion and slidably movable along the transverse second portion upon rotation of the inner body relative to the shell housing.

10 Claims, 53 Drawing Sheets

(51) Int. Cl.
*E05B 3/08* (2006.01)
*E05B 15/00* (2006.01)
*E05B 37/00* (2006.01)
*E05B 47/06* (2006.01)
*E05B 63/00* (2006.01)
*E05C 3/04* (2006.01)
*E05C 3/12* (2006.01)

(52) U.S. Cl.
CPC ................ *E05C 3/041* (2013.01); *E05C 3/12* (2013.01); *E05B 2047/0024* (2013.01); *E05B 2047/0054* (2013.01); *E05B 2047/0058* (2013.01)

(56) References Cited

U.S. PATENT DOCUMENTS 3,648,241 A 3/1972 Naito
3,910,078 A 10/1975 Schulz
3,926,019 A 12/1975 Mazeika
4,126,341 A 11/1978 Bradstock
4,148,092 A 4/1979 Martin
4,149,212 A 4/1979 Willach
4,161,870 A 7/1979 Barnes
4,220,022 A 9/1980 Willach
4,457,148 A 7/1984 Johansson
4,522,047 A 6/1985 Johl
4,594,864 A 6/1986 Hart
4,616,862 A 10/1986 Ward
4,620,088 A 10/1986 Flies
4,637,237 A 1/1987 Witkoski
4,712,398 A 12/1987 Clarkson
4,748,833 A 6/1988 Nagasawa
4,771,620 A 9/1988 Kleinhany
4,798,068 A 1/1989 Nakauchi
4,810,861 A 3/1989 Herriott
4,820,330 A 4/1989 Lin
4,843,851 A 7/1989 Frolov
4,887,442 A 12/1989 Lavelle
4,887,445 A 12/1989 Beatty
4,895,036 A 1/1990 Larson
4,901,545 A 2/1990 Bacon
4,916,927 A 4/1990 O'Connell et al.
4,924,685 A 5/1990 Usina
5,010,750 A 4/1991 Boser
5,033,282 A 7/1991 Gartner
5,083,122 A 1/1992 Clark
5,228,730 A 7/1993 Gokcebay
5,245,329 A 9/1993 Gokcebay
5,265,452 A 11/1993 Dawson
5,307,658 A 5/1994 Kokubu
5,337,043 A 8/1994 Gokcebay
5,337,588 A 8/1994 Chhatwal
5,339,661 A 8/1994 Eisermann
5,339,662 A 8/1994 Goldman
5,347,267 A 9/1994 Murray
5,367,295 A 11/1994 Gokcebay
5,373,718 A 12/1994 Schwerdt
5,385,039 A 1/1995 Feldpausch
5,389,919 A 2/1995 Warren
5,392,025 A 2/1995 Figh
5,421,178 A 6/1995 Hamel
5,437,174 A 8/1995 Aydin
5,507,161 A 4/1996 Broekaert
5,507,162 A 4/1996 Chhatwal
5,542,274 A 8/1996 Thordmark
5,552,777 A 9/1996 Gokcebay
5,588,317 A 12/1996 Bianco
5,588,318 A 12/1996 Osborne
5,592,408 A 1/1997 Keskin
5,611,227 A 3/1997 Solovieff
5,634,701 A 6/1997 Hendrich
5,646,605 A 7/1997 Leonaggeo
5,653,134 A 8/1997 Lee
5,671,621 A 9/1997 Watanuki
5,678,868 A 10/1997 Williams
5,685,182 A 11/1997 Chhatwal
5,735,152 A 4/1998 Dietz
5,742,236 A 4/1998 Cremers
5,782,118 A 7/1998 Chamberlain
5,791,177 A 8/1998 Bianco
5,791,178 A 8/1998 Chamberlain
5,816,083 A 10/1998 Bianco
5,819,563 A 10/1998 Bianco
5,823,028 A 10/1998 Mizuno
5,845,524 A 12/1998 Koehler
5,886,644 A 3/1999 Keskin
5,894,277 A 4/1999 Keskin
5,905,446 A 5/1999 Benore
5,906,124 A 5/1999 Su
5,946,956 A 9/1999 Hotzl
6,000,609 A 12/1999 Gokcebay
6,005,487 A 12/1999 Hyatt, Jr.
6,062,612 A 5/2000 Lin
6,068,305 A 5/2000 Myers
6,068,308 A 5/2000 Molzer
6,085,560 A 7/2000 Dalton, Jr.
6,092,404 A 7/2000 Chhatwal
6,106,035 A 8/2000 Hetherington
6,116,066 A 9/2000 Gartner
6,125,673 A 10/2000 Luker
6,130,611 A 10/2000 Pellaton
6,147,622 A 11/2000 Fonea
6,196,037 B1 3/2001 Urschel
6,209,367 B1 4/2001 Hyatt, Jr.
6,256,932 B1 7/2001 Jyawook
6,286,347 B1 9/2001 Frolov
6,341,448 B1 1/2002 Murray
6,345,522 B1 2/2002 Stillwagon
6,360,573 B1 3/2002 Ming-Chih
6,370,928 B1 4/2002 Chies
6,374,649 B1 4/2002 Holcomb
6,374,653 B1 4/2002 Gokcebay
6,378,344 B1 4/2002 Gartner
6,406,071 B1 6/2002 LaViola
6,442,986 B1 9/2002 Russell
6,474,119 B1 11/2002 Halvorson
6,474,122 B2 11/2002 Davis
6,483,424 B1 11/2002 Bianco
6,490,896 B2 12/2002 Segawa
6,496,101 B1 12/2002 Stillwagon
6,513,356 B1 2/2003 Yang
6,543,264 B2 4/2003 Frolov
6,552,650 B1 4/2003 Gokcebay
6,564,600 B1 5/2003 Davis
6,575,504 B2 6/2003 Roatis
6,580,355 B1 6/2003 Milo
6,581,986 B2 6/2003 Roatis
6,598,434 B2 7/2003 Yang
6,615,623 B1 9/2003 Ormerod
6,615,625 B2 9/2003 Davis
6,623,053 B1 * 9/2003 Hwang ................ E05B 55/005
292/336.3
6,640,594 B1 11/2003 Yao
6,647,753 B2 11/2003 Engler
6,655,180 B2 12/2003 Gokcebay
6,684,671 B2 2/2004 Beylotte
6,718,806 B2 4/2004 Davis
6,725,693 B2 4/2004 Yu
6,758,070 B2 7/2004 Yu
6,815,623 B1 11/2004 Holland
6,826,935 B2 12/2004 Gokcebay
6,867,685 B1 3/2005 Stillwagon
6,879,243 B1 4/2005 Booth
6,892,557 B2 5/2005 Bieniek
7,007,526 B2 3/2006 Frolov
7,010,948 B1 3/2006 Hsieh
7,021,093 B2 4/2006 Fukatsu
7,040,125 B2 5/2006 Ciezki
7,069,755 B2 7/2006 Lies
7,073,827 B2 7/2006 Cherry
7,089,770 B2 8/2006 Ramsauer
7,145,434 B2 12/2006 Mlynarczyk
7,221,272 B2 5/2007 Hosselet

(56) References Cited

U.S. PATENT DOCUMENTS

| | | | | |
|---|---|---|---|---|
| 7,296,447 | B2 | 11/2007 | Priest | |
| 7,303,215 | B2 | 12/2007 | Moon | |
| 7,318,331 | B2 | 1/2008 | Miao | |
| 7,334,443 | B2 | 2/2008 | Meekma | |
| 7,336,150 | B2 | 2/2008 | Gokcebay | |
| 7,439,850 | B2 | 10/2008 | Boulard | |
| D580,739 | S | 11/2008 | Pelletier | |
| 7,444,844 | B1 | 11/2008 | Lee | |
| 7,681,424 | B2 | 3/2010 | Antonucci | |
| 7,698,916 | B2 | 4/2010 | Davis | |
| 7,768,378 | B2 | 8/2010 | Hill | |
| 7,770,423 | B2 | 8/2010 | Wu | |
| 7,845,202 | B2 | 12/2010 | Padilla | |
| 7,856,858 | B2 | 12/2010 | Laval | |
| D630,489 | S | 1/2011 | Gratzki | |
| 7,870,770 | B2 | 1/2011 | Blanch | |
| 7,874,190 | B2 | 1/2011 | Krisch | |
| 8,028,553 | B2 | 10/2011 | Lange | |
| 8,079,237 | B2 | 12/2011 | Yang | |
| 8,084,701 | B1 * | 12/2011 | Misner | H01H 27/06 200/566 |
| 8,113,024 | B2 | 2/2012 | Yang | |
| 8,122,746 | B2 | 2/2012 | Hyatt, Jr. | |
| 8,161,781 | B2 | 4/2012 | Gokcebay | |
| 8,419,083 | B2 | 4/2013 | Burmesch | |
| 8,453,481 | B2 | 6/2013 | Meekma | |
| D686,055 | S | 7/2013 | Li | |
| 8,495,898 | B2 | 7/2013 | Gokcebay | |
| 8,539,802 | B2 | 9/2013 | Meyerle | |
| 8,555,685 | B2 | 10/2013 | Frolov | |
| 8,590,948 | B2 | 11/2013 | Shen | |
| 8,616,031 | B2 | 12/2013 | Ullrich | |
| 8,677,792 | B2 | 3/2014 | Wheeler | |
| 9,208,628 | B2 | 12/2015 | Gokcebay | |
| 9,222,284 | B2 | 12/2015 | Gokcebay | |
| 9,273,492 | B2 | 3/2016 | Gokcebay | |
| 9,536,359 | B1 | 1/2017 | Gokcebay | |
| 9,663,972 | B2 | 5/2017 | Ullrich | |
| 10,465,422 | B2 | 11/2019 | Ullrich | |
| 10,597,902 | B2 | 3/2020 | Guo | |
| 2003/0127866 | A1 | 7/2003 | Martinez | |
| 2004/0159135 | A1 | 8/2004 | Kato | |
| 2004/0172991 | A1 | 9/2004 | Forster | |
| 2004/0261477 | A1 | 12/2004 | Wang | |
| 2005/0121919 | A1 | 6/2005 | Smock | |
| 2005/0179517 | A1 | 8/2005 | Harms | |
| 2005/0210937 | A1 | 9/2005 | Okuda | |
| 2005/0284200 | A1 | 12/2005 | Moon | |
| 2006/0082163 | A1 | 4/2006 | Dionysian | |
| 2006/0087177 | A1 | 4/2006 | Hata | |
| 2006/0112747 | A1 | 6/2006 | Moon | |
| 2006/0248932 | A1 | 11/2006 | Yang | |
| 2007/0188303 | A1 | 8/2007 | Faro | |
| 2007/0295044 | A1 | 12/2007 | Tsukano | |
| 2008/0012360 | A1 | 1/2008 | Engel | |
| 2008/0246286 | A1 | 10/2008 | Ostrowski | |
| 2009/0165510 | A1 | 7/2009 | Sugimoto | |
| 2012/0297842 | A1 | 11/2012 | Gartner | |
| 2013/0285393 | A1 | 10/2013 | Roatis | |
| 2014/0001930 | A1 | 1/2014 | Slogoff | |
| 2014/0202220 | A1 | 7/2014 | Denison | |
| 2016/0186463 | A1 * | 6/2016 | Roatis | E05C 3/12 70/266 |
| 2018/0073271 | A1 * | 3/2018 | Romero | E05B 15/0033 |
| 2019/0345733 | A1 * | 11/2019 | Roatis | E05B 3/08 |

FOREIGN PATENT DOCUMENTS

| | | | |
|---|---|---|---|
| GB | 2281938 | A | 3/1995 |
| GB | 2429032 | A | 2/2007 |
| JP | H0291371 | A | 3/1990 |
| KR | 200204006 | Y1 | 11/2000 |
| WO | 2004100082 | A1 | 11/2004 |
| WO | 2009109972 | A1 | 9/2009 |
| WO | 2010041210 | A1 | 4/2010 |
| WO | 2012122697 | A1 | 9/2012 |
| WO | 2014028332 | A1 | 2/2014 |
| WO | 2014186475 | A1 | 11/2014 |

* cited by examiner

LOCK

CROSS-REFERENCE TO RELATED APPLICATION

The present application claims priority from U.S. Provisional Patent Application Ser. No. 63/149,737 filed on Feb. 16, 2021, entitled "LOCK".

The present application is related to, but does not claim priority from, PCT Patent Application No. PCT/US2014/038016 filed May 14, 2014, entitled "Lock" the entire specification of which is hereby incorporated by reference, which claims priority from U.S. Provisional Patent Application Ser. No. 61/823,685, filed May 15, 2013, entitled "Hybrid-Electronic Core Lock", the entire specification of each of which is hereby incorporated by reference.

BACKGROUND OF THE DISCLOSURE

1. Field of the Disclosure

The disclosure relates in general to locks, and more particularly, to a core lock that is configured to provide electronic locking and unlocking of a lock. While not limited thereto, such a lock is well suited for use in association with furniture and cabinets, including as a retrofit to existing furniture and cabinets. Of course, the lock is not limited to such use or to such a field of use, and the foregoing is solely for purposes of example.

2. Background Art

Many cabinets, desks, and other storage applications utilize locks that include a shell mounted on the door or cabinet, and an insertable and removable lock core that plugs into the shell. The shell not only houses the core, but also attaches to a driver for accomplishing the locking and unlocking function when rotated. The lock core acts to lock the driver in place when there is no key inserted in the lock core due to lock core tumblers that protrude into the shell to restrict the lock core and driver from rotation.

When the correct key is inserted in the lock core, the protruding tumblers move with respect to the cuts in the key blade and no longer protrude into the shell and no longer restrict rotation of the lock core. As the lock core is turned by the user rotating the key, drive serves to drive a cam or locking bar to the unlocked position.

Such systems are ubiquitous, however, there are nevertheless drawbacks. For example, such systems typically have a vast number of different tumbler configurations, and corresponding keys associated with each such different tumbler configuration. As a result, a supplier must include a relatively large supply of spare locks, tumblers and keys to match those that are out in the field. Additionally, the removal and replacement of such locks (necessitated by the changing of the duty of a piece of furniture, dismissal of an employee, loss of a set of keys, etcetera) is very time consuming and labor intensive.

SUMMARY OF THE DISCLOSURE

The disclosure is directed to a lock. The lock includes a housing assembly, an actuatable lock assembly and a latching assembly. The housing assembly defines a cavity. The actuatable lock assembly is associated with the housing. The actuatable lock assembly is positionable in at least a closed orientation and an open orientation.

The actuatable lock assembly includes an outer body, an inner body and a biasing member. A locking shell assembly is provided that interfaces with the actuatable lock assembly and includes a shell housing and a back plate.

In another aspect of the disclosure, the disclosure is directed to a lock comprising a housing assembly, an actuatable lock assembly and a locking shell assembly. The housing assembly defines a cavity. The housing assembly has front surface and a back surface opposite the front surface, with a bore extending therethrough. The actuatable lock assembly is associated with the housing. The actuatable lock assembly is rotatable relative to the housing assembly in at least one of a closed orientation and an open orientation. The actuatable lock assembly further comprises an outer body and an inner body. The outer body is extendable through the bore of the housing assembly. The outer body has a bore extending therethrough, and having a front portion and a rear portion, with a longitudinal slot defined in the rear portion. The inner body includes a knob with an elongated shaft extending therefrom, and through the bore of the outer body, and, an axial pin extending radially from the elongated shaft and slidably positionable along the longitudinal slot. The locking shell assembly has a shell housing bore extending therethrough, a rear portion of the shell housing having a slot with a longitudinal first portion and a transverse second portion. The axial pin is slidably movable along the longitudinal first portion and slidably movable along the transverse second portion upon rotation of the inner body relative to the shell housing.

In some configurations, the lock further includes an axial notch and a latch. The axial notch is defined in the front portion of the outer body of the actuatable lock assembly. The latch is positionable within the cavity of the housing. The latch is insertable into the axial notch of the front portion of the of the actuatable lock assembly. In a locked configuration, removal of the latch from the axial notch is precluded, thereby precluding rotation of the outer body relative to the housing. In an unlocked configuration, the latch is removably positionable relative to the latch so as to be directable out of the axial notch sufficiently to allow rotation of the outer body relative to the housing.

In some configurations, the transverse second portion of the slot of the shell housing further includes a locking detent, wherein, in a locked configuration, the axial pin is positioned within the locking detent.

In some configurations, the transverse slot defines a quarter turn of the knob.

In some configurations, the longitudinal slot has a proximal end at or near the front portion, and a distal end spaced apart therefrom away from the front portion. The actuatable lock assembly further includes a biasing member biasing the axial pin toward the proximal end of the longitudinal slot.

In some configurations, the biasing member biases the axial pin into the proximal end of the longitudinal slot. The axial pin limits the further slidably movement by the inner body relative to the outer body.

In some configurations, the biasing member comprises a spring positioned between an outer surface of the front portion and a rear portion of the knob.

In some configurations, the outer body is precluded from longitudinal slidable movement within the bore of the housing, while the inner body is both selectively rotatable with the outer body within the bore of the housing, and, slidably movable within the bore of the housing and the within the bore of the outer body.

In some configurations, a circlip is coupled to a distal end of the rear portion of the outer body. The circlip interfaces with the rear portion of the shell housing, to, preclude slidable movement of the outer body within the bore of the housing.

In some configurations, the housing is positionable on an outer surface of a volume to be protected.

In some configurations, the lock further includes a latching assembly positionable in one of a locked position and an unlocked position. The latching assembly is positioned within the cavity of the housing. The latching assembly further includes an actuator, and, upon actuation of thereof, is configured to position the latching assembly in one of a locked position and an unlocked position. Positioning in the unlocked position allows rotation of the knob, and, in turn, direction of the actuatable lock assembly from a closed orientation to the open orientation. Positioning in the locked position precludes direction of the actuatable lock assembly into the open orientation.

In some configurations, the lock further includes an electric control assembly electronically coupled to the actuator and positioned within the housing assembly. The electronic control assembly is configured to control the same. An input device is positioned on the front surface of the housing assembly. The input device allows a user to provide an authorizing signal to the electronic control assembly to direct the actuator to initiate rotation thereof.

BRIEF DESCRIPTION OF THE DRAWINGS

The disclosure will now be described with reference to the drawings wherein.

DETAILED DESCRIPTION OF THE DISCLOSURE

Figure 1A:
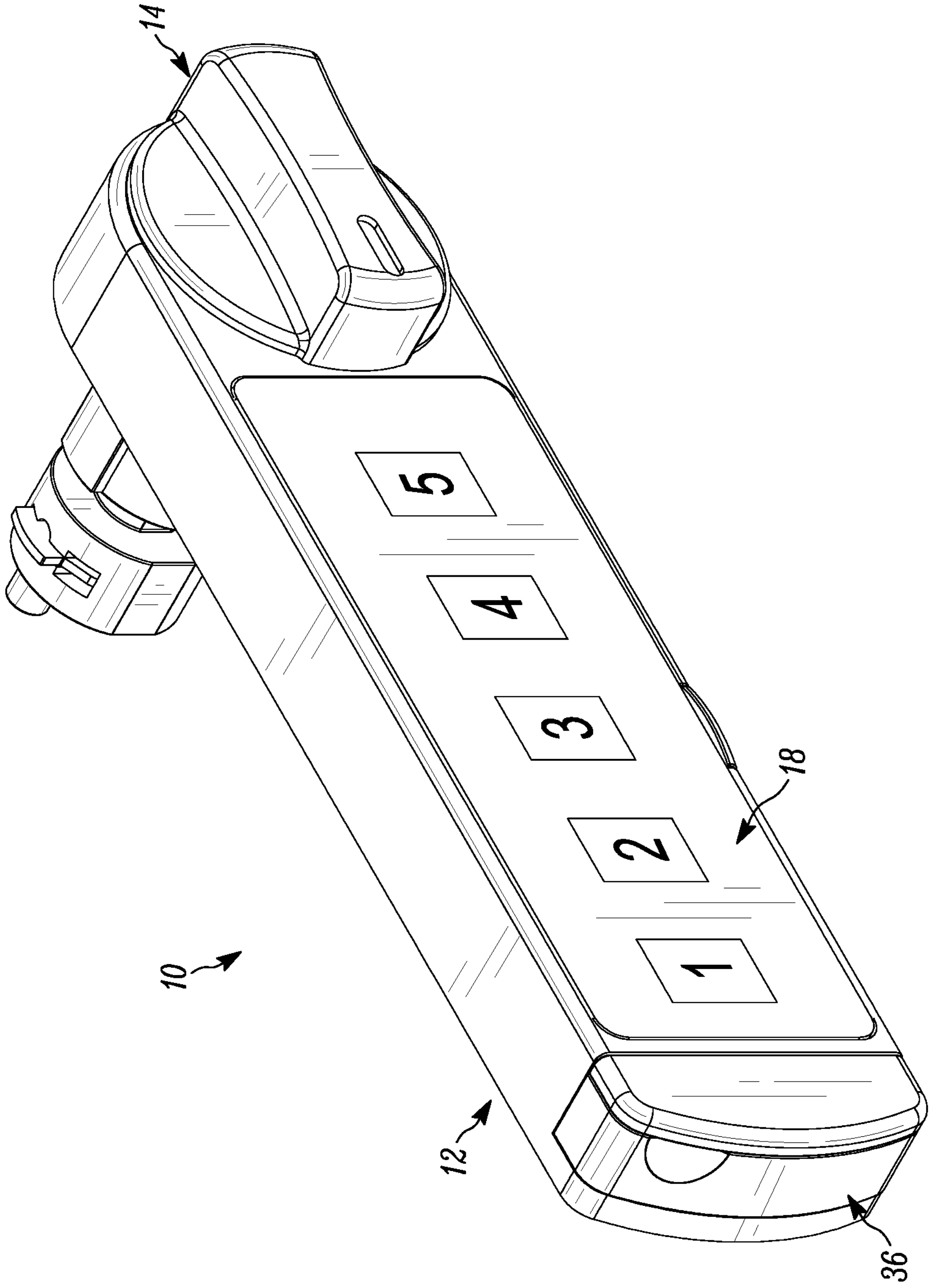
FIG. 1A of the drawings is a front perspective view of the lock of the present disclosure.

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1B:
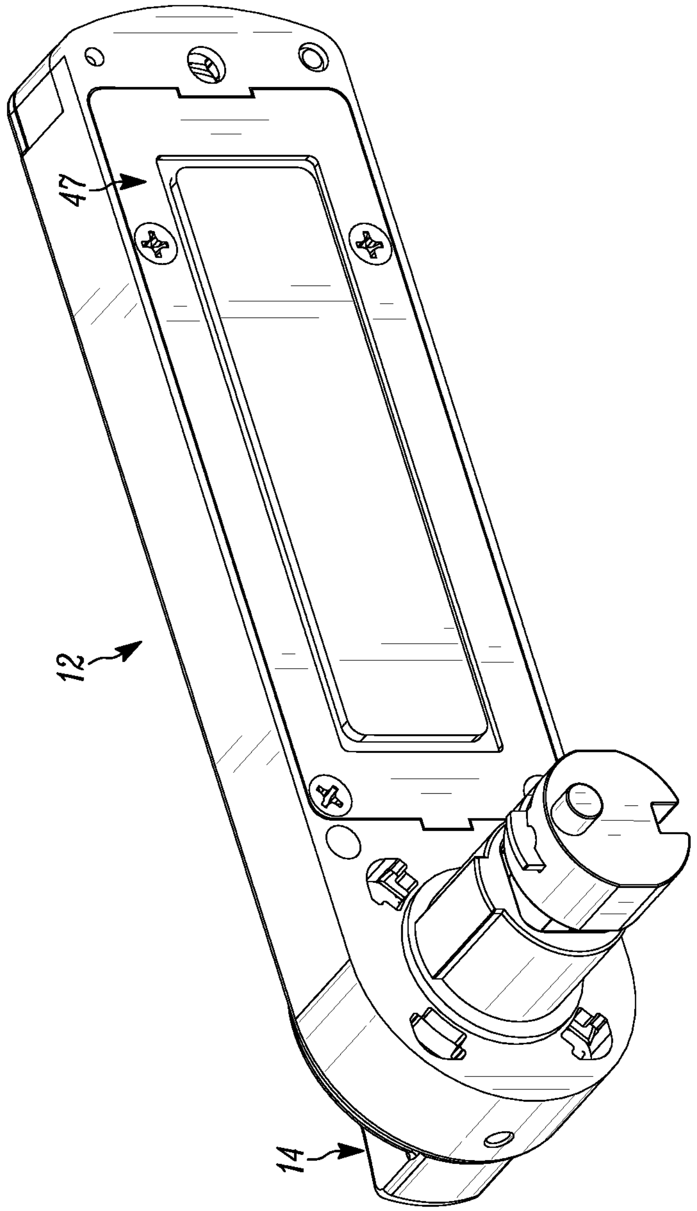
FIG. 1B of the drawings is a back perspective view of the lock of the present disclosure.

Referring now to the drawings and in particular to FIGS. 1 and 1A, the lock of the present invention is shown generally at 10. The lock 10 may be utilized in a number of different environments and in association with a number of different installations, including but not limited to, doors, drawers, cabinets, pantries, desks, etc. One particular use of the lock is in the office furniture application (i.e., desks, credenzas, cabinets, wardrobes, etc), wherein it is contemplated that the lock can be a drop in replacement for the commonly installed office furniture locks. Of course, the disclosure is not limited to use in association with such applications.

Figure 2:
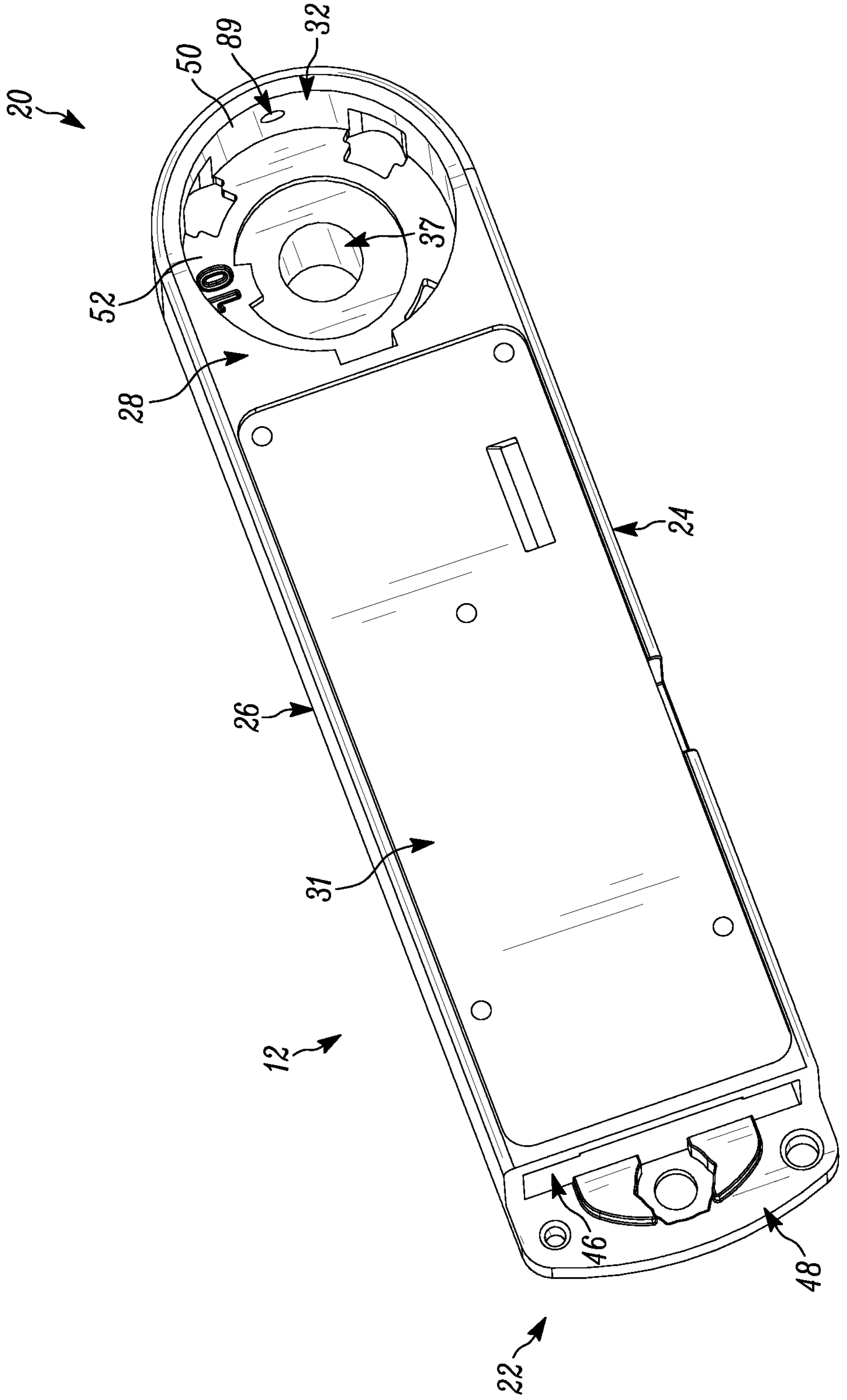
FIG. 2 of the drawings is a front perspective view of components of the housing assembly of the present disclosure.
Figure 3:
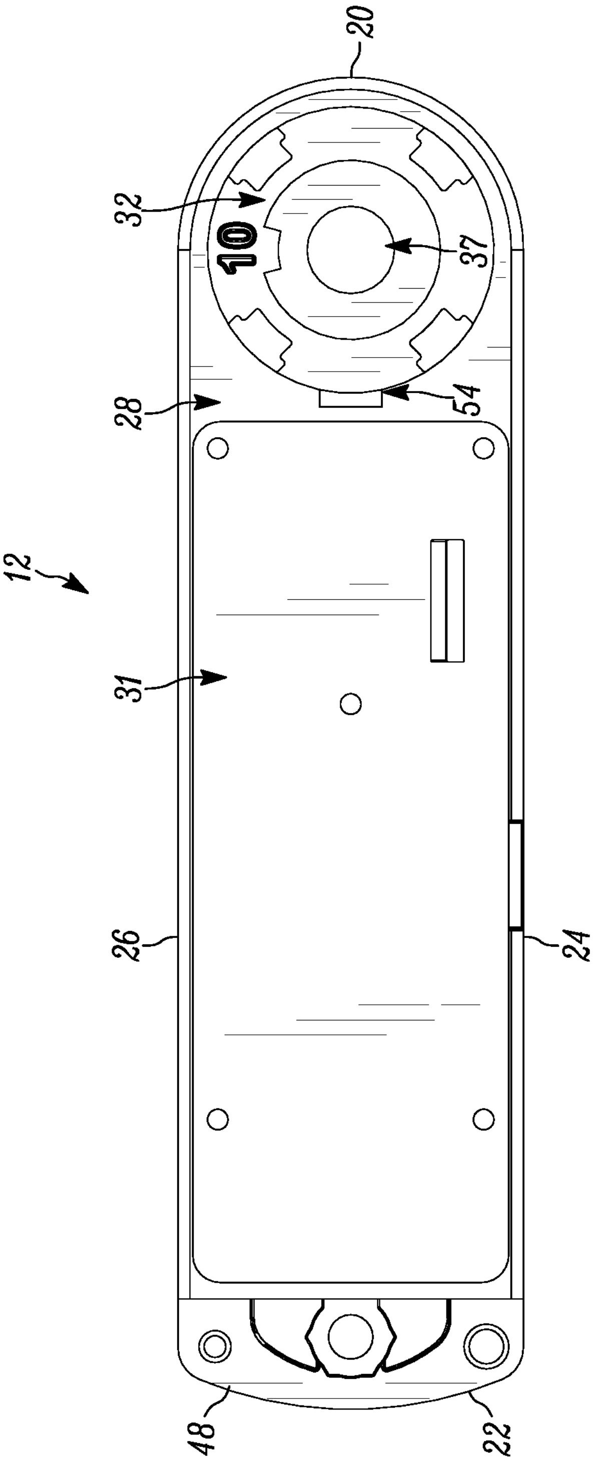
FIG. 3 of the drawings is a top plan view of components of the housing assembly of the present disclosure.
Figure 4:
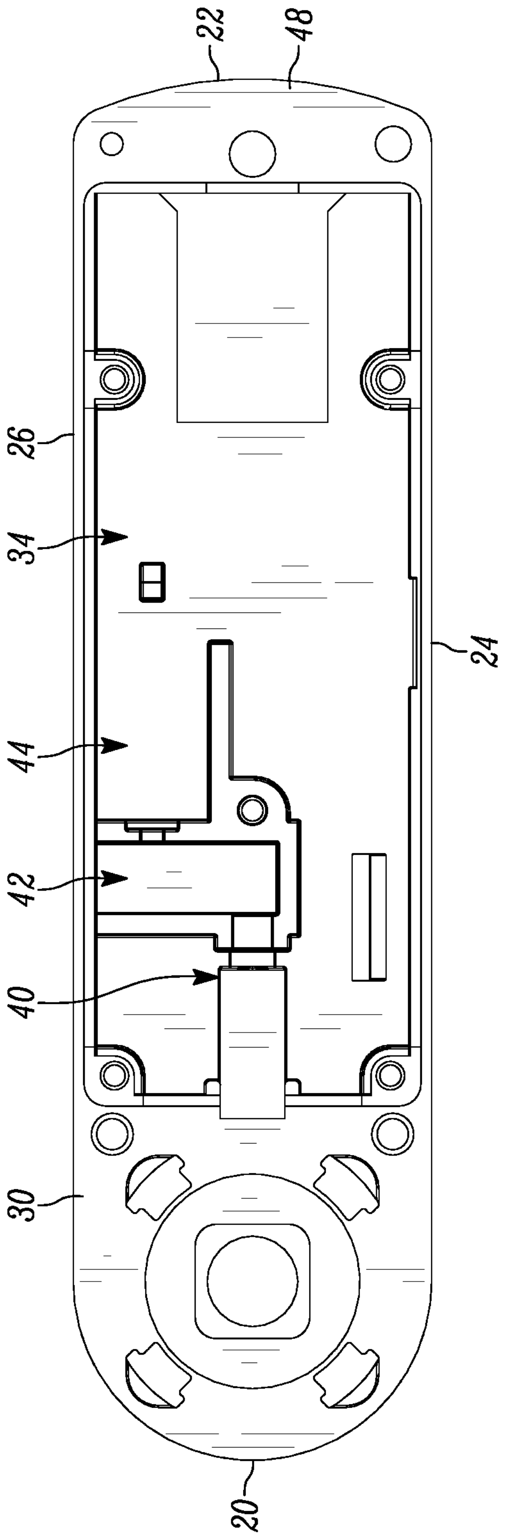
FIG. 4 of the drawings is a bottom plan view of components of the housing assembly of the present disclosure.

Referring again to FIGS. 1A and 1B, the lock 10 is shown as including housing assembly 12, actuatable lock assembly 14, latching assembly 16 (FIG. 12A) and electronic control assembly 18. With reference to FIGS. 2, 3 and 4, the housing assembly 12 comprises a body with first end 20, second end 22, first side 24 and second side 26, top 28 and bottom 30. The housing assembly is shown as comprising a single cast member, although other configurations are contemplated. The single cast member may comprise a metal or alloy thereof, or may comprise a composite or polymer material.

As set forth above, it is contemplated that the lock of the present embodiment be suitable for use in association with furniture. Traditionally, the portion of the furniture that includes a lock has generally a dimension (either a length or a width, typically) that is only slightly larger than the lock body and necessary opening therefore. Generally, such a dimension is on the order of one inch or the like. Thus, it is preferred that the lock have a housing assembly that is one inch or less in width (or length when mounted in another direction) so as to be mountable on such a surface without a portion thereof overhanging the surface. As such, the lock of the present disclosure is sized so as to fit into most of the cabinets and furniture presently manufactured, without requiring any changes or redesign of the cabinet or furniture. Additionally, such a design allows for the retrofitting of existing cabinets and furniture. It will be understood that the lock is not limited to use in association with cabinets or furniture, and that such use is merely utilized for purposes of illustration. It is further contemplated, that to achieve the one inch dimension, the diameter of the cavity 32 is 0.93 inches, the diameter of the knob is 0.97 inches, with the thickness of the housing assembly being 0.39 inches and the thickness including the knob is 0.70 inches. Additionally, it is contemplated that the motor is 0.61 inches in length and 0.32 inches in width. Furthermore, it is contemplated that the battery have a diameter of 0.79 inches and a thickness of 0.13 inches.

The top 28 includes a recessed portion 31 which is configured to receive a keypad or other input device thereon. In one embodiment, the input device may comprise a number pad having a plurality of discrete numbers thereon. The number pad may include an outer perimeter and a thickness that is well suited for fitting into the recessed portion. In the embodiment shown, the recessed portion extends over much of the top 28 between the first side and the second side. The recessed portion may include an opening which provides for the passage of wiring or other electrical connectors that provides electrical communication between the input device and the rest of the electronic control assembly.

At or near the first end 20 of the housing assembly 12, the actuatable lock region 32 is positioned. The actuatable lock region 32 comprises an annular cavity having a base 50 and an upstand wall 52. The base 50 includes a central opening 37 and may include other structures and openings therearound. The central opening 37 is configured for the passage of the portions of the actuatable lock assembly 14 and to link structures thereof on either side of the base 50. For example, in the embodiment shown, four generally round chamfered openings (configured to receive fasteners) are disposed about the central opening in a generally uniformly spaced apart orientation. Additionally, four slot like openings are positioned in the space therebetween.

The upstanding wall 52 is a generally annular wall having a latch opening 54 extending therein providing communication between the cavity of the actuatable lock region with the main body cavity 34. In addition, wall surface variations or indentations may be presented to match with the four slot like openings that are defined in the base. These may comprise detents that cooperate with spring loaded balls or the like incorporated into the knob 70 (FIGS. 10 and 11) to form local positions of stable equilibrium wherein the knob can rest in such a position. It is contemplated that with the four different locations between two and four positions are defined (depending on the rotation of the knob). In other embodiments, a fewer or greater number of detents may be disposed on the upstanding wall 52 to cooperate with spring loaded balls incorporated into the knob. In still other embodiments, structures other than spring loaded balls, such as biasing leaves may be utilized.

In the embodiment shown, the upstanding wall extends from the base 50 to the top 28, and is generally perpendicular to the top 28 as well as the base 50 of the actuatable lock region 32. Additionally, the second end 22 of the housing assembly 12 may have a configuration that generally matches the upstand wall 52.

Referring now to FIG. 4, extending across much of the housing assembly is the main body cavity 34 which opens toward the bottom 30. In the embodiment shown, the main body cavity is on the opposite side of the top from the recessed region 31. The main body cavity 34 includes a latch channel 40, a blocker channel 42, a motor retaining region 44 and a battery opening 46 (FIG. 2). The latch channel 40 extends away from the latch opening 54 of the upstand wall 52 and intersects with the blocker channel 42. The latch opening is generally tangent to the upstand wall 52 and extends longitudinally along the main body cavity, with the blocker channel 42 being substantially perpendicular thereto. Of course, other angular relationships are contemplated between the components and it is not necessarily that the components are tangent and perpendicular to each other, or that they align with the outer configuration of the housing assembly, including oblique relationships. The motor retaining region 44 is positioned adjacent to the blocker channel, and is configured to receive and maintain the motor in the proper orientation. A cover 47 can be provided to extend over the main body cavity 34, and may be secured thereto through a plurality of fasteners. The cover or the housing can be coupled to an outside surface through fasteners at either end thereof, and/or through an adhesive (such as double stick tape) that can be applied to the cover 47.

The battery opening 46 is positioned at the second end 22 of the housing assembly and provides ingress to the main body cavity 34. In the embodiment shown, the opening generally has a rectangular cross-sectional configuration that substantially matches the cross-sectional configuration of the main body opening. A flange may extend from the battery opening at the bottom 30 of the housing assembly. The flange includes a plurality of openings that are configured for the receipt of pins or fasteners and the like.

Figure 5:
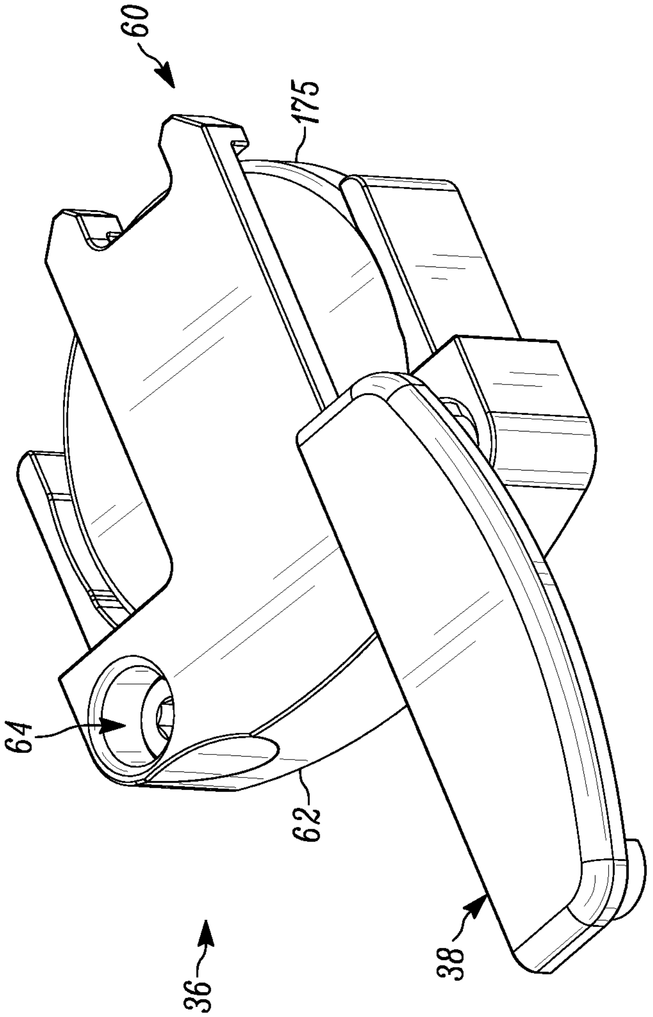
FIG. 5 of the drawings is a top perspective view of the battery housing of the housing assembly of the present disclosure, showing, in particular, the cap in an open position providing access to a fastener which secures the battery housing to the housing assembly at the flange.
Figure 6:
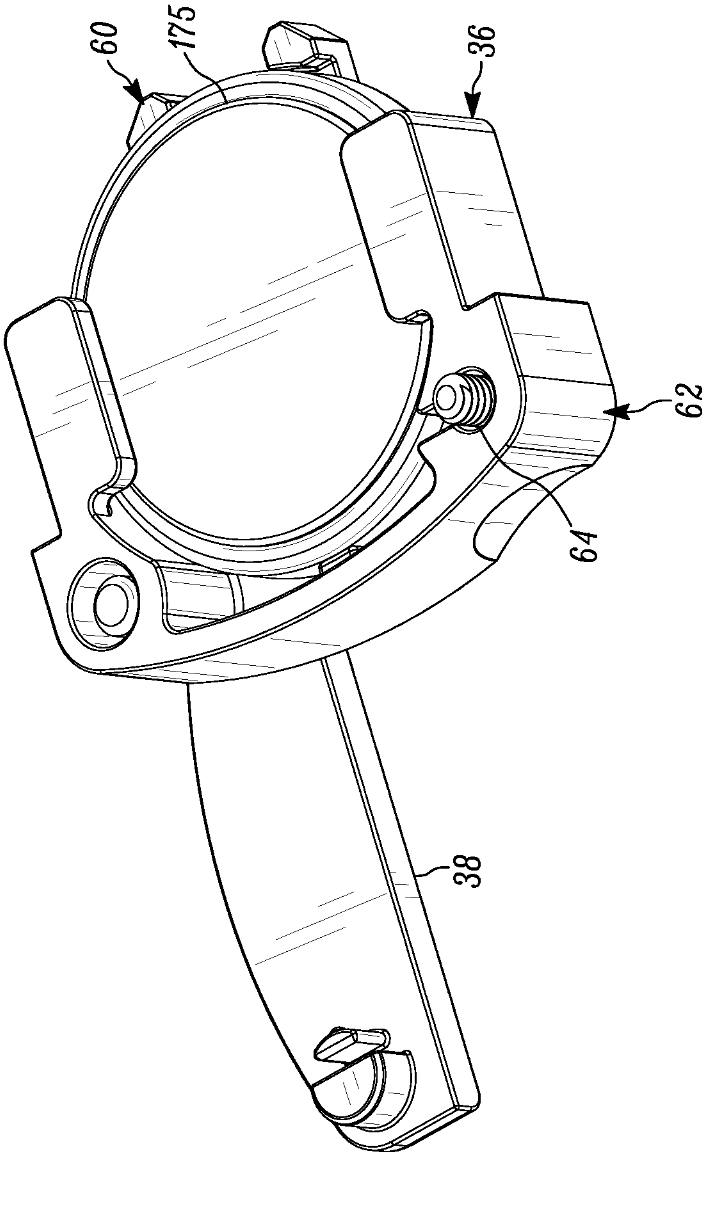
FIG. 6 of the drawings is a bottom perspective view of the battery housing of the housing assembly of the present disclosure, showing, in particular, the cap in an open position providing access to a fastener which secures the battery housing to the housing assembly at the flange.

With reference to FIGS. 5 and 6, the housing assembly 12 further includes a battery housing 36 and an outer cap 38. The battery housing 36 is configured to receive a battery (generally a 3V lithium battery, such as a CR2032 or the like) and to allow for the proper positioning thereof in operation, as well as removal from the housing assembly for purposes of battery replacement. More particularly, the battery housing includes battery cradle 60 and outer region 62. The battery cradle 60 is configured to retain the battery in a stable orientation for coupling to leads that are in electrical communication with electronic control assembly.

The outer region 62 includes a body configuration that fits over the flange and substantially matches the shape of the housing assembly 12 at the first end 20 thereof. The outer region includes an opening which corresponds to one of the openings on the flange 48 so as to allow coupling of the two components with a fastener such as a screw or nut. The removable cap 38 may be positioned over the top of the outer region so as to cover the fastener. In this manner, one must first remove the removable cap to have access to the fastener for disconnecting of the battery housing 36 and, in turn, the battery, from the housing assembly 12, toward removal thereof.

The configuration of the battery housing has a number of functions and advantages. In particular, the battery housing grips and holds the battery, aligns the battery as the battery is inserted into the lock enclosure and insures that the battery makes a proper and secure connection to the contacts of the electronic control assembly. The battery housing additionally helps secure the battery position into the enclosure as it is seated into the enclosure. The battery housing provides means for gripping and withdrawing the battery from the lock enclosure when the changing of the battery is necessary. Advantageously, with the battery housing shown, such a replacement can be achieved without the use of a tool (i.e., tweezers and the like). Furthermore, the battery housing allows for a surface for securing the battery into the lock enclosure with a fastener, and the cap provides a cover for the fastener.

Figure 7:
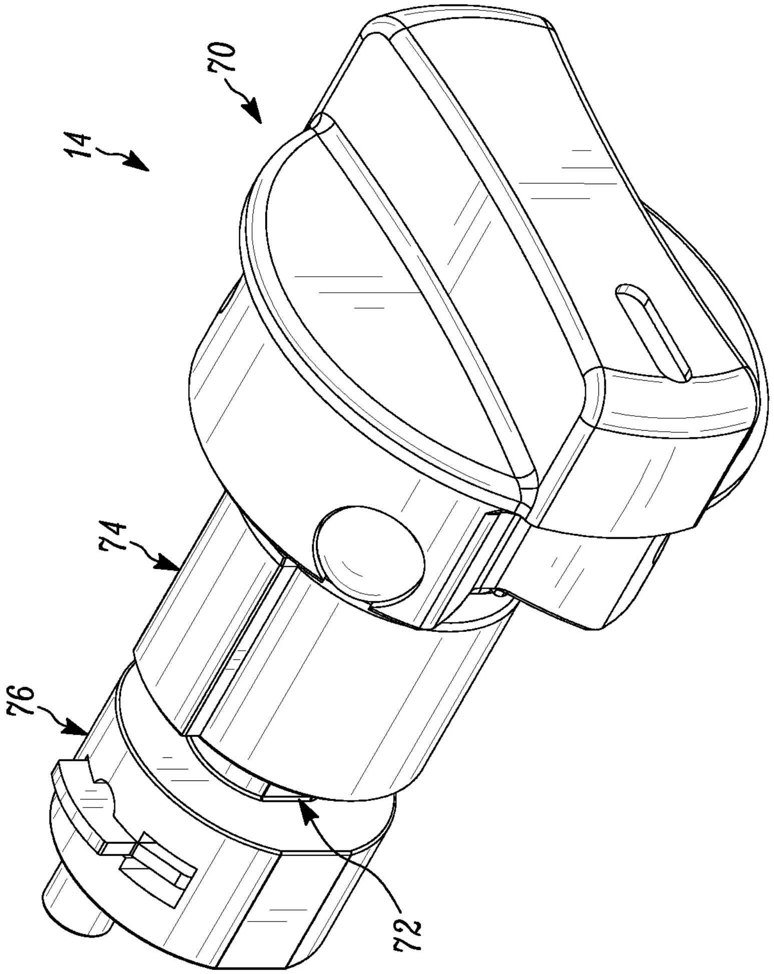
FIG. 7 of the drawings is a perspective view of the actuatable lock assembly of the present disclosure.
Figure 8:
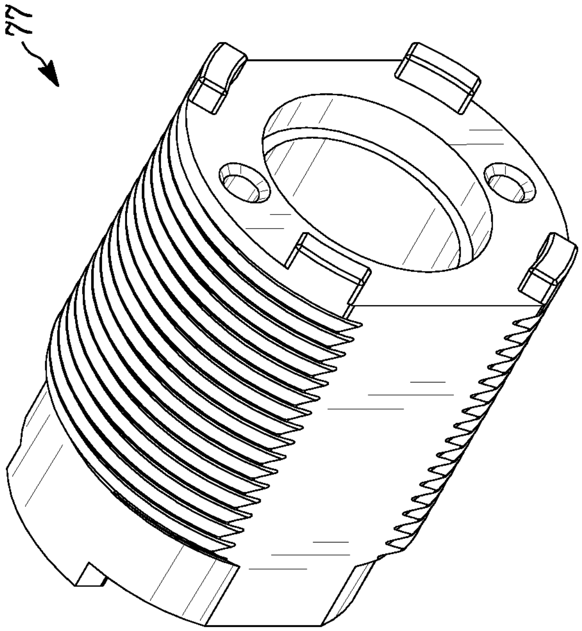
FIG. 8 of the drawings is a perspective view of an existing furniture lock bushing that may be installed on furniture, or other structures which incorporate a lock.

Referring now to FIG. 7 and FIG. 8, the actuatable lock assembly includes knob 70, lock driver 72 and lock spacer 74. These components are coupled to furniture bushing 77. It will be understood that furniture bushing 77 may comprise existing components of an existing furniture lock that has been mounted to the furniture. Advantageously, the present disclosure is directed to an actuatable lock assembly that is configured to fit within the existing furniture bushing 77. Of course, in other embodiments, lock flange and furniture bushing 77 may be provided with the lock. In addition, other configurations that do not utilize the bushing are contemplated.

Figure 9:
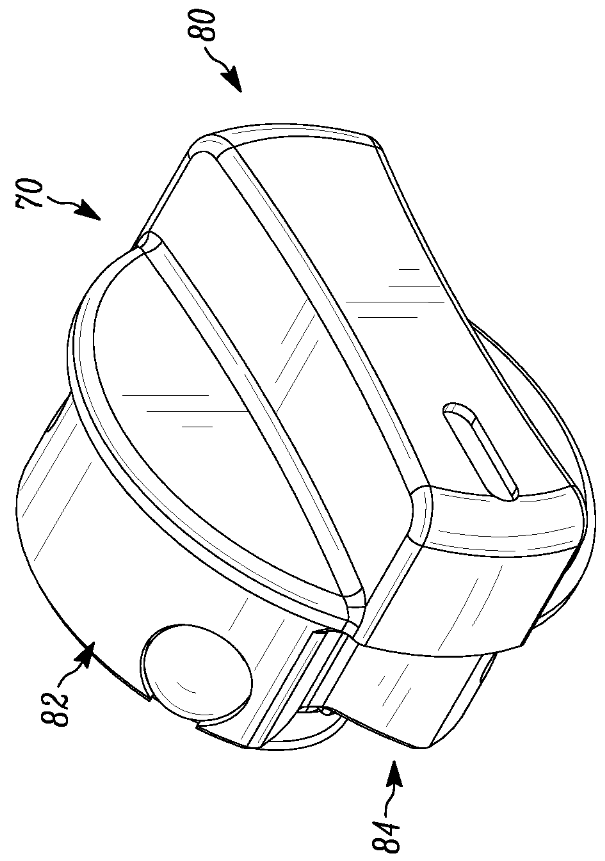
FIG. 9 of the drawings is a front perspective view of the knob of the actuatable lock assembly of the present disclosure.
Figure 10:
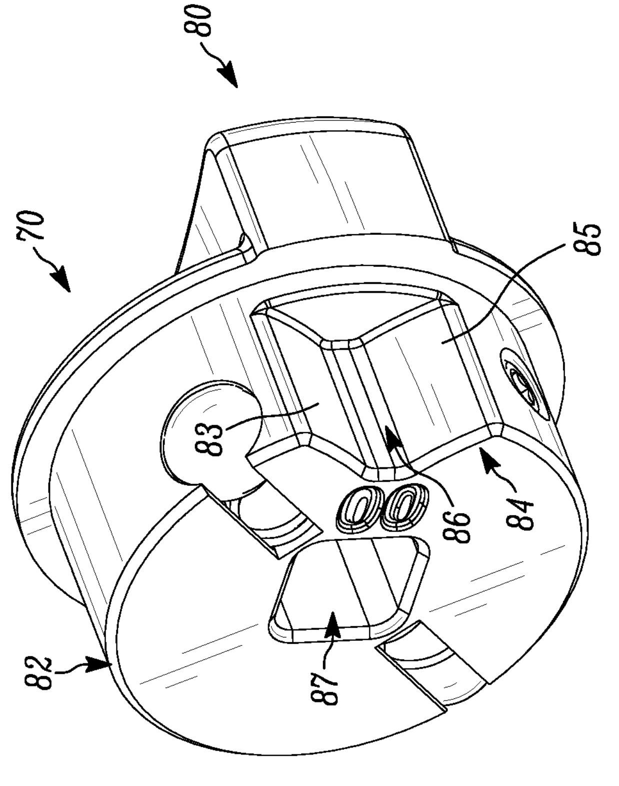
FIG. 10 of the drawings is a back perspective view of the knob of the actuatable lock assembly of the present disclosure.
Figure 11:
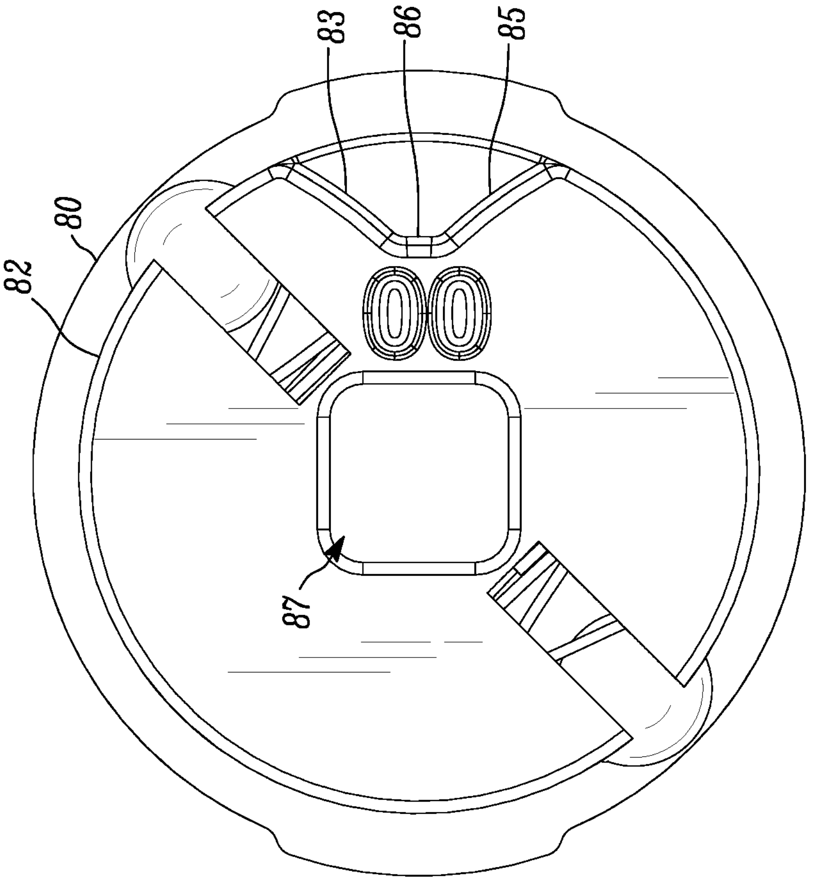
FIG. 11 of the drawings is a bottom plan view of the knob of the actuatable lock assembly of the present disclosure.

Referring now to FIG. 9 through 11, the knob 70 comprises a substantially cylindrical element having an outside surface 80 and dependent skirt 82. As will be explained below the knob 70 is positioned within the cavity defined by the actuatable lock region 32 of the housing assembly 12. The outside surface 80 is configured to facilitate the grasping and rotating thereof by a user, while the knob is in the cavity of the actuatable lock region. In the embodiment shown, the outside surface includes thumb turn regions which are configured to be grasped by the fingers of a user. Of course, a number of different surface configurations are contemplated to accommodate a particular design or a particular application. In another embodiment, in place of a knob, a detachable and reattachable tool can be utilized that plugs into the lock driver when needed. In other embodiments, in place of rotating, the knob can translate in an up and down or right and left configuration. In still other embodiments, the knob may comprise a movement inward and outward (wherein the knob may be biased into an outward position). In each of these embodiments, the movement of the knob (i.e., rotating, translating, moving inward and outward) can be selectively permitted by the positioning of the blocker into the unlocked position.

The dependent skirt 82 extends annularly around the knob 70 below the outside surface 80. The dependent skirt 82 includes axial notch 84 which extends radially inward from the surface of the dependent skirt. The axial notch, as will be explained, is sized so as to receive the distal end of the latch of the latching assembly. The axial notch 84 is defined by two inwardly sloped surfaces, namely, first surface 83 and second surface 85, which meet at vertex 86. In the embodiment shown, the two sloped surfaces are angled relative to each other, defining an angle therebetween. While a number of variations are contemplated, at the dependent skirt, the axial notch defines an approximately 48° arc along the dependent skirt. The vertex 86, in the embodiment shown, comprises a line that is parallel to the axis of rotation of the knob 70 within the cavity of the housing assembly. The surfaces 83, 85 are generally convex surfaces that are configured to shape matingly engage with the distal end of the latch, so that when the knob is turned, the surfaces 83 and/or 85 urge the latch out of the axial notch.

Figure 10B:
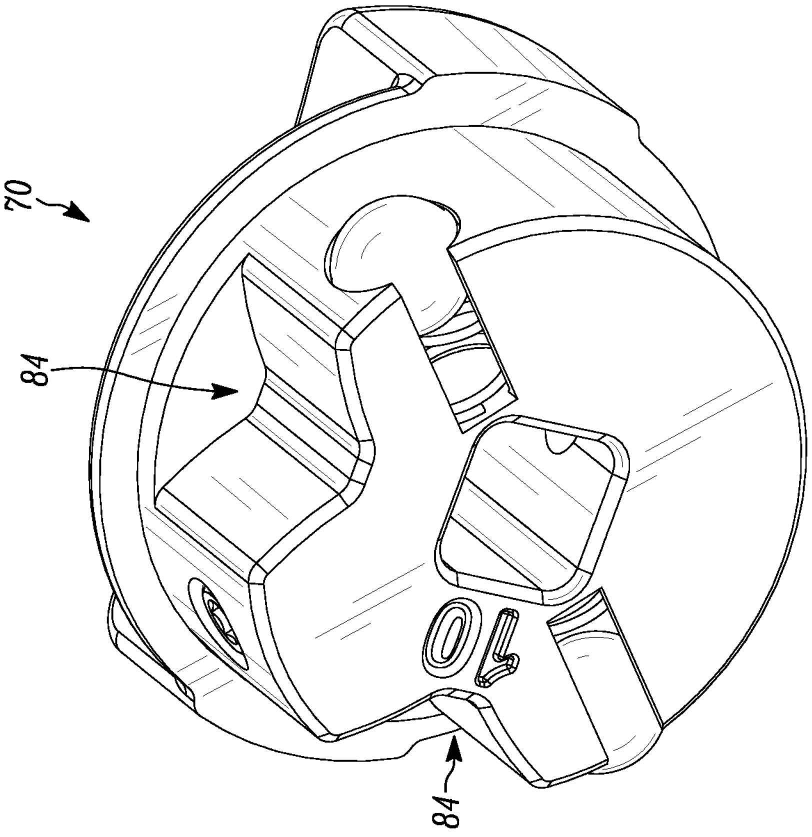
FIG. 10B of the drawings is a back perspective view of an alternate configuration of the knob of the actuatable lock assembly of the present disclosure, showing, in particular, a plurality of axial notches that are spaced apart from each other.

Of course, other configurations are contemplated for the axial notch, which may be paired with a latch having a particular configuration for the distal end thereof. Additionally, it will be understood that even with a configuration like that which is shown in the preferred embodiment, the angle and the length of the axial notch can be varied to achieve a different imparting of force against the distal end of the latch. It will be understood that the knob can be, depending on the embodiment, rotated clockwise or counterclockwise differing degrees of rotation to complete the operation. For example, it may be desirable to have the knob turn 90° or 180° in either the clockwise or counterclockwise direction to achieve the desired operation, however other degrees of rotation are likewise contemplated. Additionally, it is contemplated that the knob includes a plurality of axial notches, such as, for example, two axial notches that are spaced apart (i.e., 90° from each other). In such an embodiment, the blocker can operate in either position of the knob. In one example, such as for a locker application, when the door is unlocked and the knob is moved to the open position, the latch can enter the second axial notch and then the blocker can be moved to a locked configuration. As such, the lock is essentially locked in the unlocked configuration. This provides locking ability in more than one configuration of the knob (and, the associated actuatable lock assembly). One example of such a knob 70 is shown in FIG. 10B, with the axial notch 84 and the second axial notch 84' being shown on the knob 70. Of course, a greater number of axial notches, including, but not limited to three and four axial notches, is likewise contemplated.

The knob 70 may be coupled to the lock driver 72 (FIG. 7) through an interference fit, coupled with a set screw. In particular, the knob 70 includes an axially centered cavity 87 which is configured to engagingly receive the first end of the lock driver. In the embodiment shown, the cavity has a square cross-sectional configuration, such that when the correspondingly shaped first end of the lock driver is inserted, the two structures rotate together. A set screw, or pair of set screws can be extended through the dependent skirt 82 and into the cavity to engage the lock driver and to lock the lock driver in the installed position. Advantageously, access to the set screw is provided by way of a corresponding opening 89 (FIG. 2) on the second end of the housing assembly. It will be understood that the opening of the housing assembly lines up with each one of the set screws on the dependent skirt 82 of the knob 70 when the knob is in a position other than the locked position (that is, the opening can be moved along the second end as long as when locked, the set screw does not match up with the opening). When in the locked position, each of the set screw is offset relative to the opening such that the set screw remains inaccessible. It will further be understood that the set screws provide a means by which to change the effective length of the lock driver. That is, the opening in the knob for receiving the lock driver allows for the lock driver to be inserted and retained by the set screws, at different depths within the opening. As a result, the single structure can accommodate variations in the overall lock depth caused by the application or design.

Figure 7A:
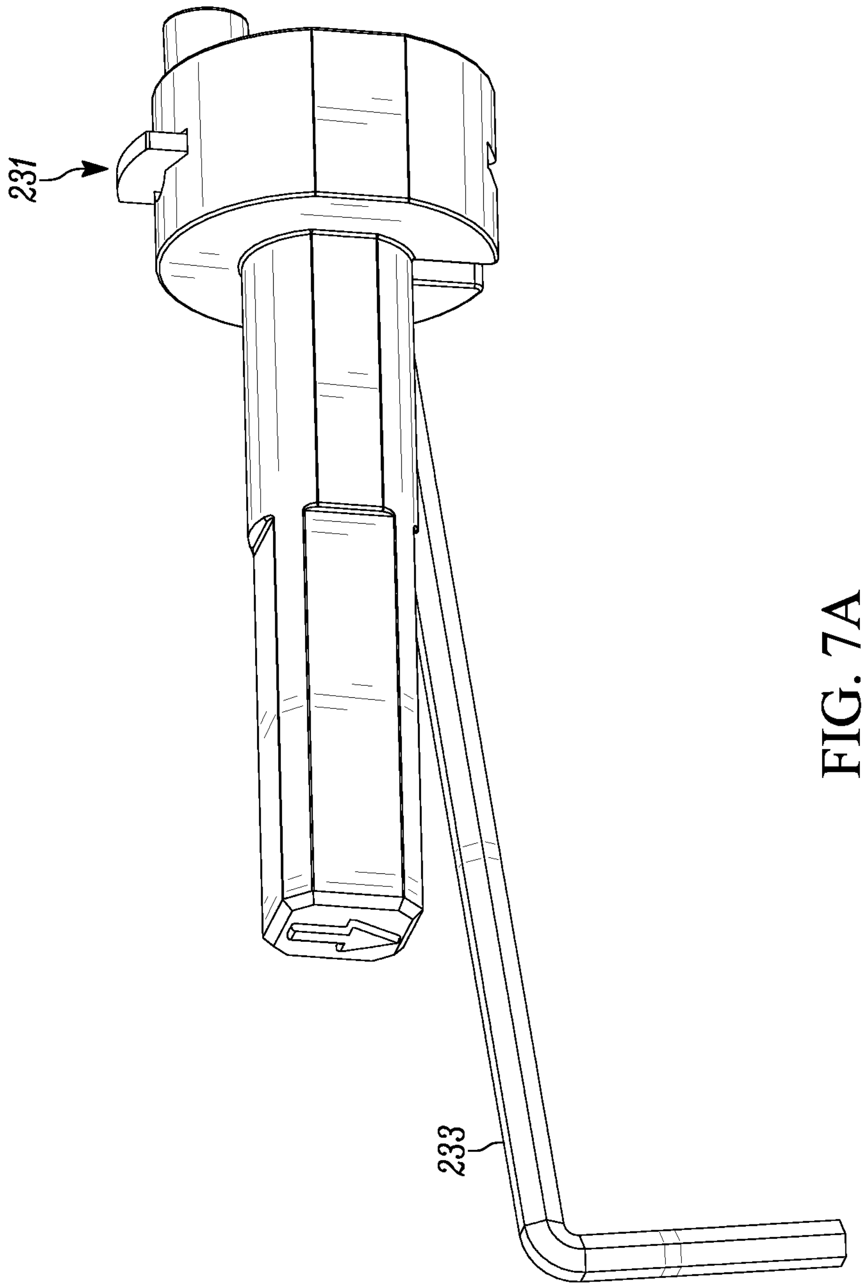
FIG. 7A of the drawings is a perspective view of the lock driver, showing, in particular, the insertion of the attachment tool which can be used to move the master tumbler to allow for insertion into the bushing.
Figure 7B:
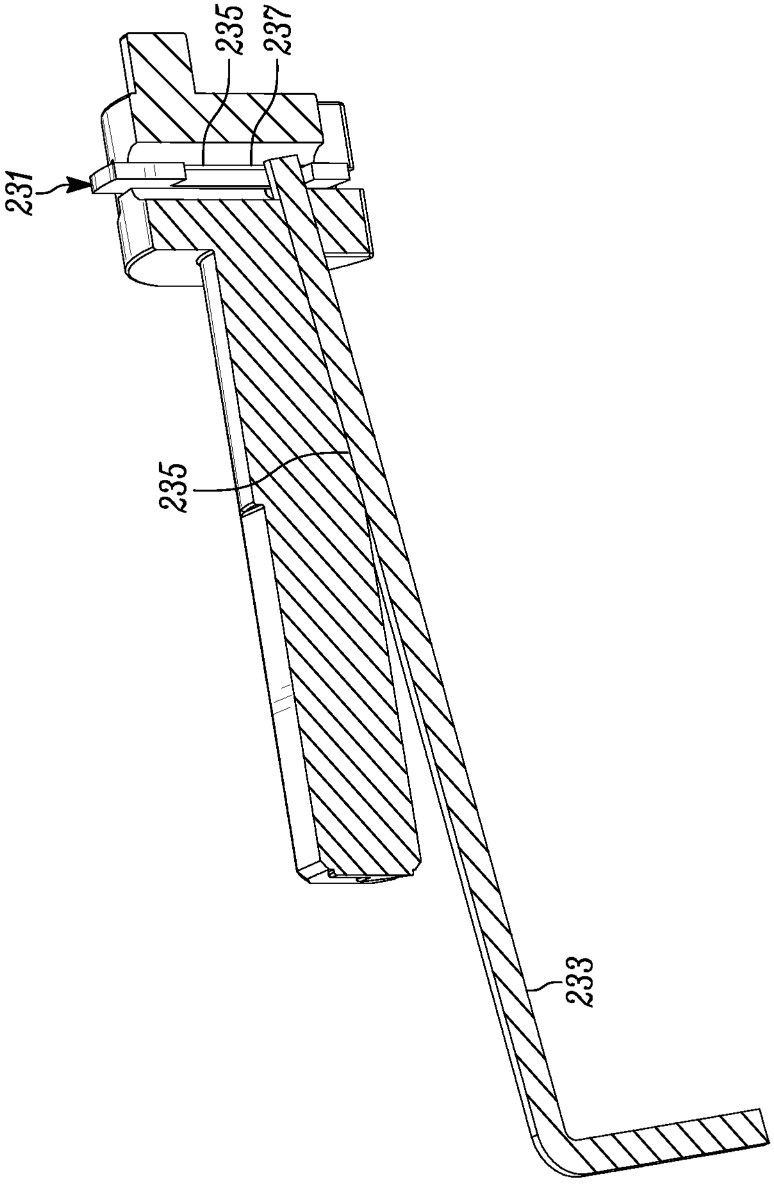
FIG. 7B of the drawings is a cross-sectional view of the lock driver, showing, in particular, the insertion of the attachment tool which can be used to move the master tumbler to allow for insertion into the bushing.

The lock driver 72 is shown in greater detail in FIGS. 7A and 7B as comprising master tumbler 231 which is slidably mounted in a channel that extends perpendicular to the axis of rotation of the lock driver in operation. A tool 233 is configured to be directable through a slot 235 in the lock driver so as to extend through opening 237 in the master tumbler 231. The master tumbler 231 is biased by a spring (or other biasing member) so as to have an end stick out beyond the lock driver 72. As such, when the lock driver 72 is inserted into the bushing, the tool can be utilized to overcome the biasing member and to pull the master tumbler into the lock driver 72. Once in the driver, the lock driver can be inserted into the bushing. Once inserted, the tool 233 can be removed, and the spring will return the master tumbler to an orientation that extends out of the lock driver and interfaces with an axial channel in the bushing, which maintains the lock driver in engagement with the bushing so that it can rotate about its axis without being able to move axially. The tool can be reinserted to move the master tumbler so as to have the end thereof exit the axial channel of the bushing, so as to remove the lock driver from the bushing. In other embodiments, the lock driver 72 can be manipulated or tilted for installation purposes.

The lock spacer 74 is positionable along the lock driver and couples to the furniture bushing 77 while allowing adjustment to compensate for slight variations in the depth of the furniture bushing. The lock spacer includes a tumbler flange which is configured to engage the furniture bushing to allow relative rotative movement while precluding axial movement of the lock relative to the furniture bushing. More particularly, the spacer flange serves to fit into the grooves in the bushing that will interlock into the flange and into the grooves in the housing. With such a configuration, in the event that someone applies a force to the external housing, the force will be transferred from the housing to the spacer and to the furniture bushing, but not to the lock driver, therefore maintaining the security of the lock. This is due to the free rotation of the spacer around the driver. Additionally, the spacer precludes radial movement.

Figure 12A:
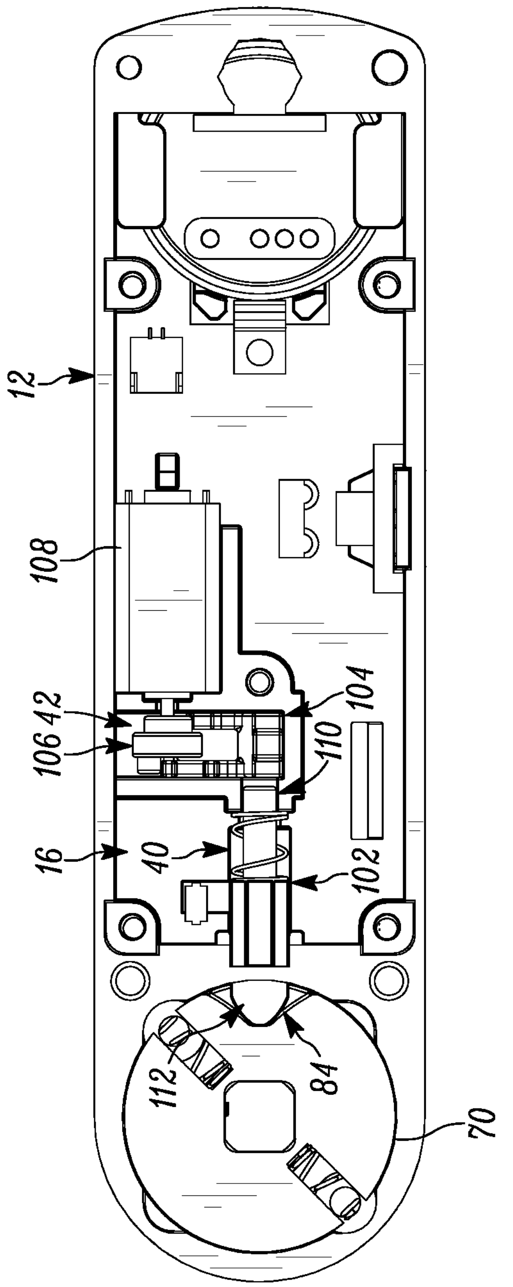
FIG. 12A of the drawings is cross-sectional view of the lock showing, in particular, the latching assembly as mounted within the housing assembly and interfacing with the knob of the actuatable lock assembly of the present disclosure, showing the lock in a locked position.
Figure 12B:
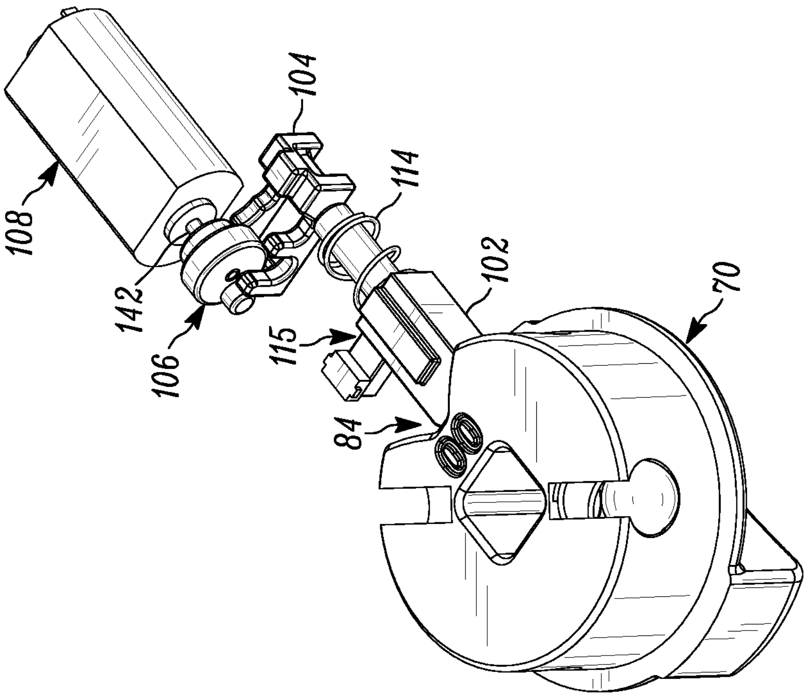
FIG. 12B of the drawings is a perspective view of components of the latching assembly and the knob of the actuatable lock assembly in the locked position.
Figure 13A:
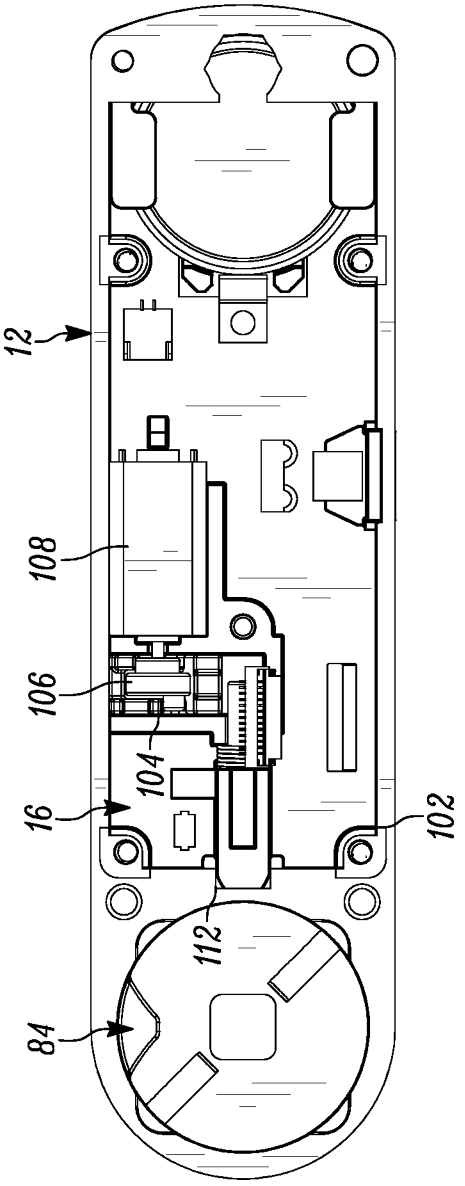
FIG. 13A of the drawings is a cross-sectional view of the lock showing, in particular, the latching assembly as mounted within the housing assembly and interfacing with the knob of the actuatable lock assembly of the present disclosure, showing the lock in an unlocked position.
Figure 13B:
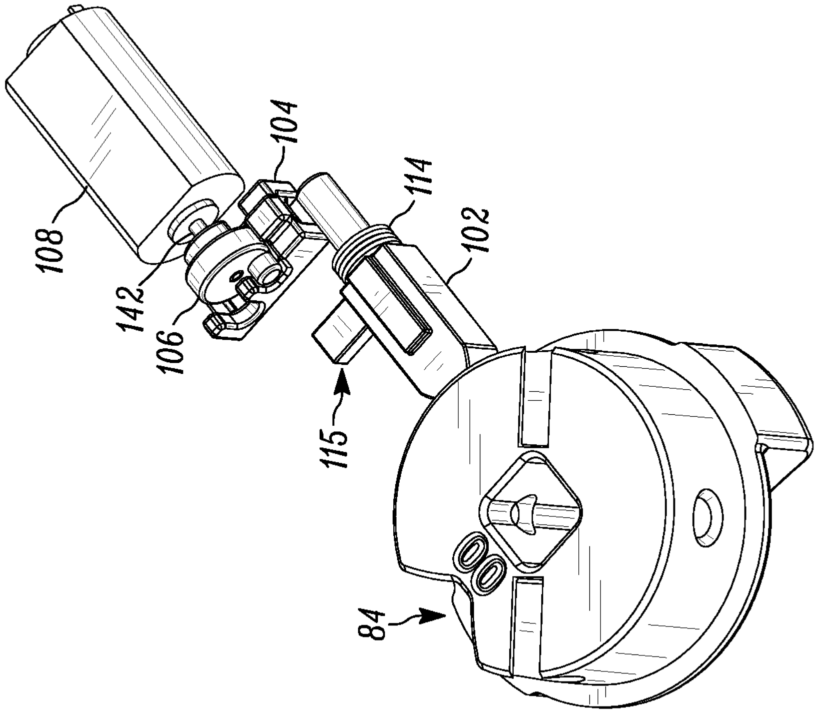
FIG. 13B of the drawings is a perspective view of components of the latching assembly and the knob of the actuatable lock assembly in the unlocked position.
Figure 14:
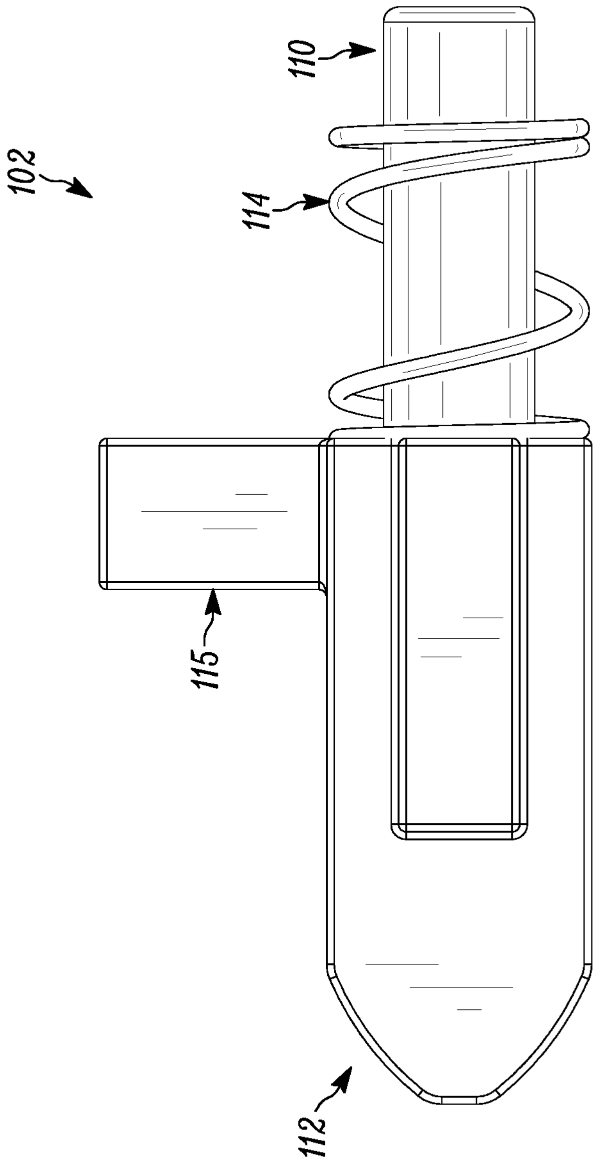
FIG. 14 of the drawings is a side elevational view of the latch of the present disclosure, shown with the biasing member extending around a portion thereof.

Referring now to FIGS. 12A, 12B, 13A and 13B, the latching assembly 16 is shown as comprising latch 102, blocker 104, cam 106 and motor 108. It will be understood that FIGS. 12A and 12B show the blocker in the locked position, and, the FIGS. 13A and 13B show the blocker in the unlocked position. The latch 102 includes proximal end 110 and distal end 112. The latch 102 is positioned within the latch channel 40 and is slidably movable therewithin. In the locked position, which is shown in FIGS. 12A and 12B, and as will be explained, the distal end 112 of the latch 102 extends into the axial notch 84 of the knob 70. The proximal end 110 is configured to interface with the blocker 104. With further reference to FIG. 14 a biasing member, in the form of a compression spring 114 extends between the latch and the housing assembly so as to bias the distal end of the latch toward and into the knob 70. Additionally, a flag or flange 115 extends transversely from the latch. As will be explained, the flag 115 interfaces with a position sensor and provides to the position sensor the orientation and position of the latch. In other embodiments, other mechanism may be utilized for monitoring the position of the latch and/or knob, such as, for example, detecting directly the position of the knob.

Figure 15:
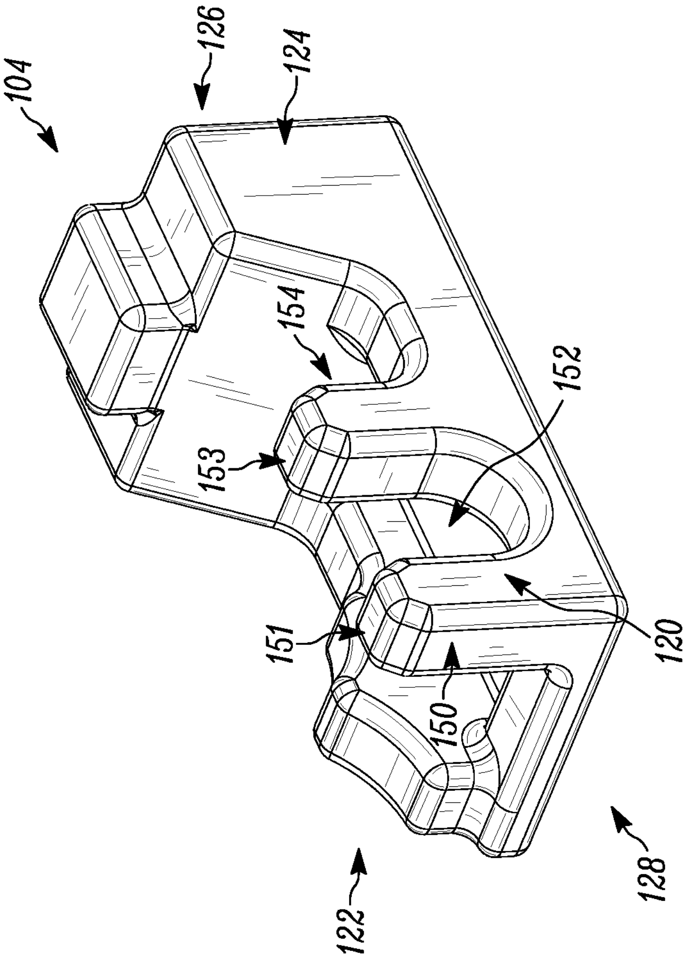
FIG. 15 of the drawings comprises a front perspective view of the blocker of the present disclosure.
Figure 16:
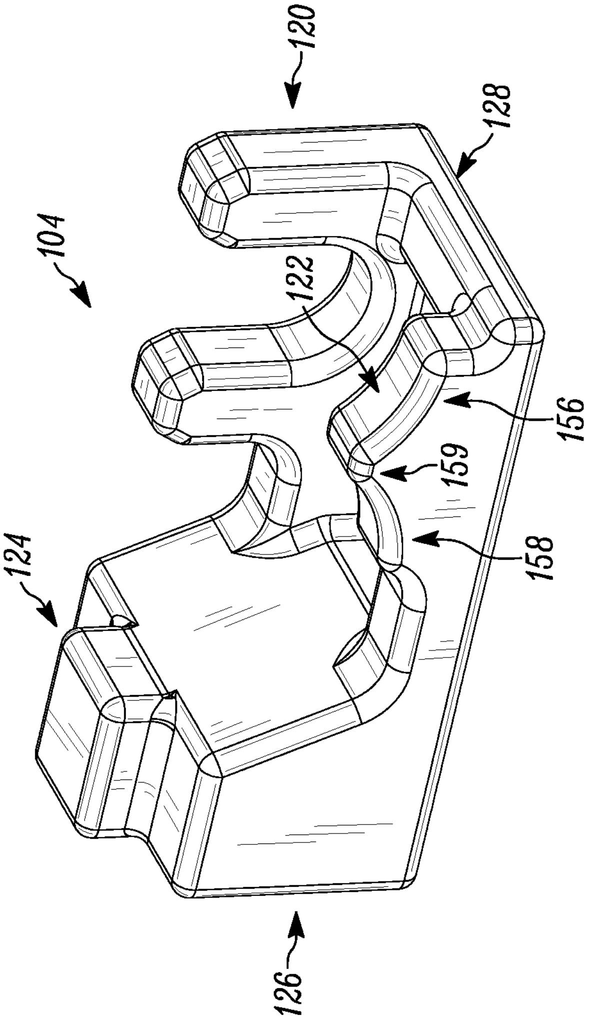
FIG. 16 of the drawings comprises a back perspective view of the blocker of the present disclosure.

With reference to FIGS. 15 and 16, the blocker 104 is shown as comprising first cam profile 120, second cam profile 122, latch engagement body 124. The latch engagement body 124 is positioned at a second end 128 of the blocker 104. The first cam profile 120 extends between the first end 126 and the latch engagement body 124. Similarly the second cam profile 122 extends between the first end 126 and the latch engagement body 124 in a generally parallel and spaced apart orientation from the first cam profile. The spaced apart orientation of the two cam profiles defines a longitudinal channel therebetween. It will be understood that the cam body rotatably extends through the longitudinal channel as the followers thereof interact with the first and second cam profiles.

The first cam profile 120 includes first slot 150, second slot 152, and third slot 154. A first ridge 151 is defined between the first slot 150 and the second slot 152. A second ridge 153 is defined between the second slot 152 and the third slot 154. In the embodiment shown, the first slot 150 is formed on the outside of the first ridge 151, however, provides a single sided slot function. The second cam profile 122 includes first ramp 156, second ramp 158 and peak 159 positioned therebetween.

In the embodiment shown, the blocker comprises a metal member, such as zinc or the like. Of course, other materials are contemplated. It will be understood that the blocker is the component that precludes latch movement in the event that the knob is attempted to be rotated in the locked position so as to defeat the lock. As such, the latch engagement body 124 may comprise a solid member that provides the necessary strength to overcome the forces that may be exerted against the knob and, in turn, the latch.

Figure 17:
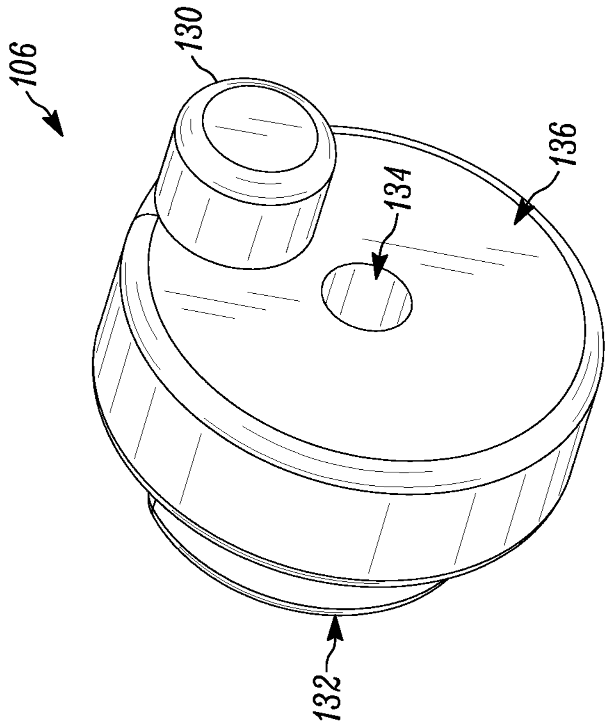
FIG. 17 of the drawings comprises a front perspective view of the cam of the present disclosure.
Figure 18:
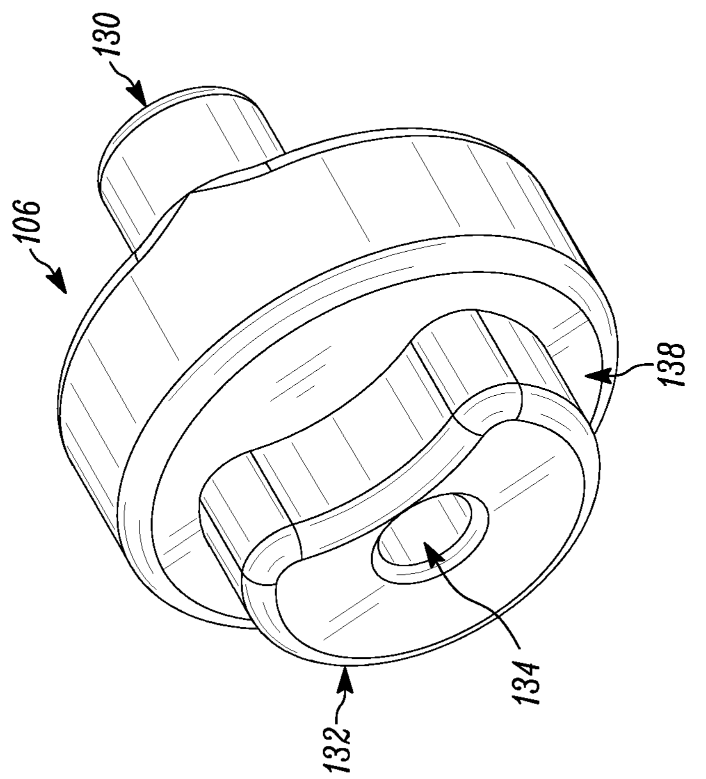
FIG. 18 of the drawings comprises a back perspective view of the cam of the present disclosure.

With reference to FIGS. 17 and 18, the cam 106 includes a body having a first side 136 and a second side 138, and, an axis of rotation 134. The first side includes first follower 130 and the second side includes second follower 132. With reference to FIGS. 12B and 13B, the cam is rotatably coupled to the motor 108 about axle 142. It will be understood that the motor is positioned within the motor retaining region with the axle extending into the blocker channel. With continued reference to FIGS. 12A, 12B, 13A and 13B, the cam 106 is positioned so that the body is within the longitudinal channel between the first and second cam profiles, the first follower 130 is configured to interface with the first cam profile 120 and the second follower 132 is configured to interface with the second cam profile 122. As can be seen in FIGS. 19A through 19E, sequentially, and as will be explained below in greater detail, as the motor rotates the cam 106, the cam 106 intermittently connects the first follower with the first cam profile, to, in turn, translate the blocker within the blocker channel.

It is contemplated that other cam profiles and other cam follower configurations may be utilized to achieve the intermittent interaction therebetween, to, translate the blocker along the blocker channel between a blocking position and a released position. It is further contemplated that the position of the two cam profiles can be swapped. Additionally, the blocker may have a alternate configurations for the first cam profile or the second cam profile. For example, additional slots may be presented, and corresponding ridges to increase the stroke of the blocker movement through additional rotation and interaction with the cam, if necessary.

Figure 20:
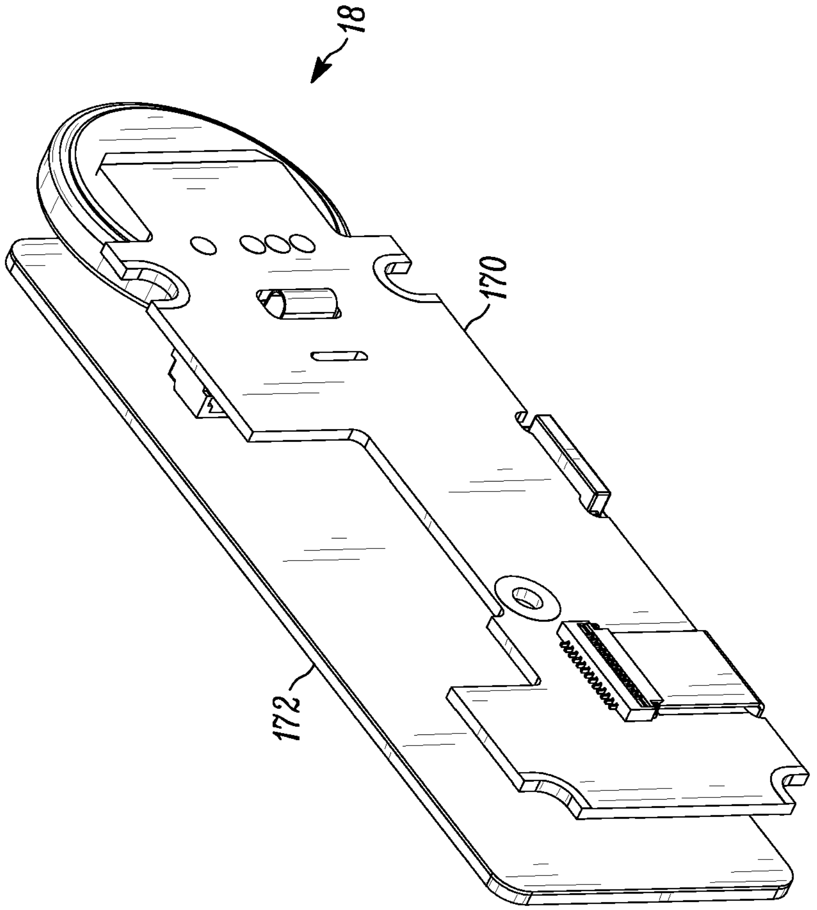
FIG. 20 of the drawings comprises a front perspective view of the electronic control assembly of the present disclosure.
Figure 21:
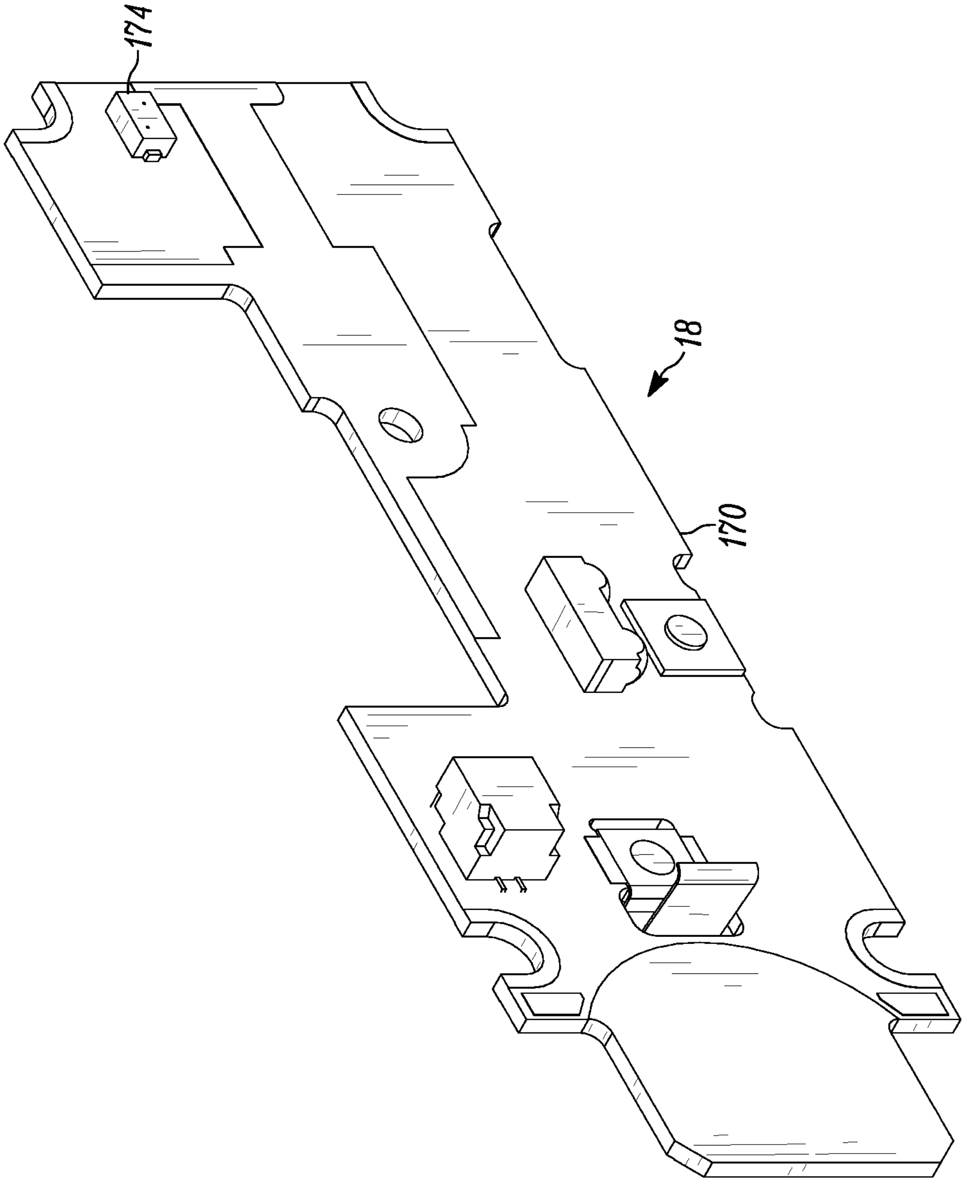
FIG. 21 of the drawings comprises a front perspective view of the PC board of the control assembly of the present disclosure.
Figure 22C:
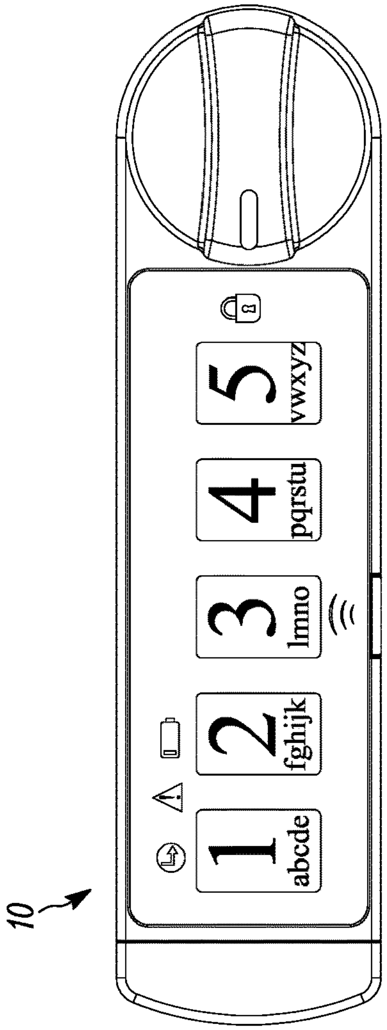
FIG. 22A through 22D of the drawings are top plan views of the lock of the present disclosure in four different orientations, a vertically upward orientation, a vertically downward orientation, a horizontal orientation in a first direction and a horizontal orientation in a second direction.
Figure 22D:
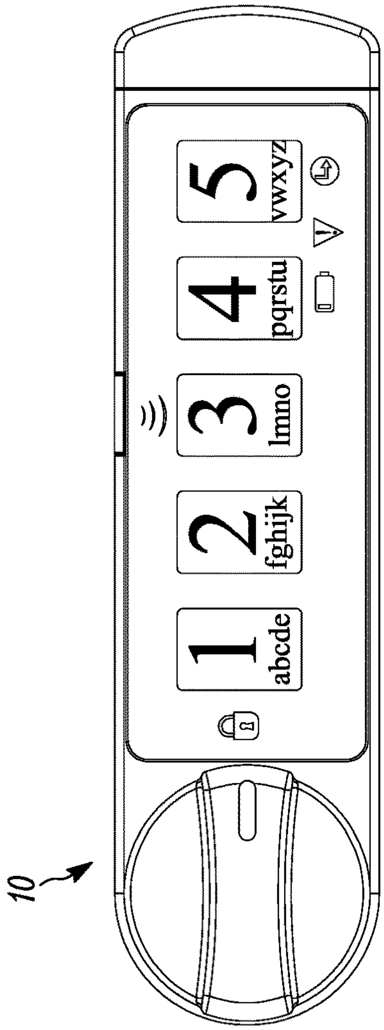
Figure 22B:
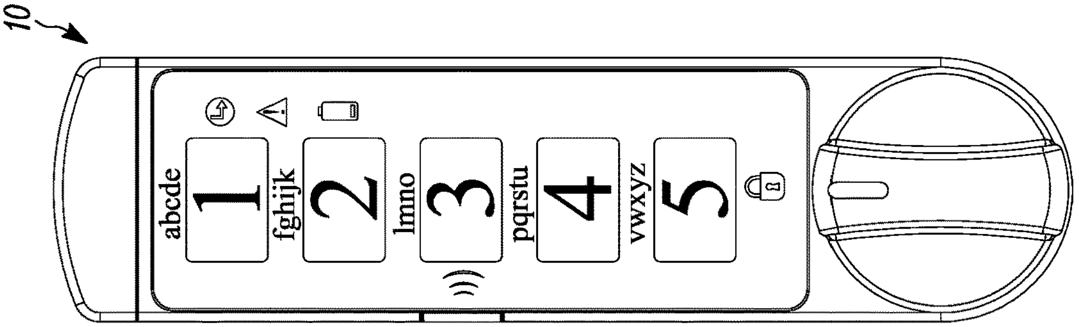
Figure 22A:
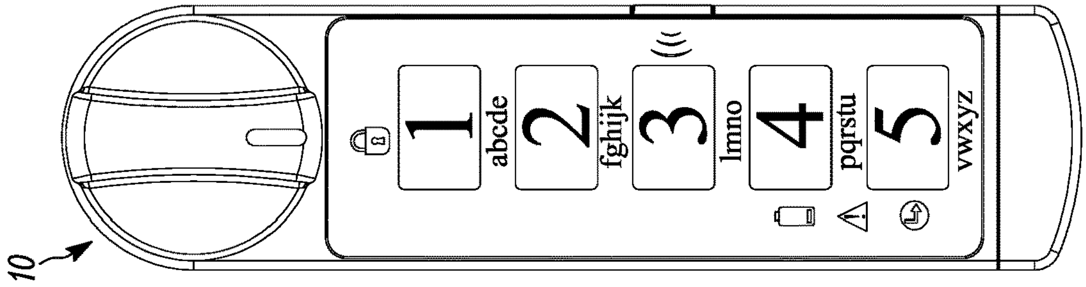

Referring now to FIGS. 20 and 21, the electronic control assembly 18 includes electronic PC board 170, input device 172, and latch position sensor 174. The PC board 170 includes the logic necessary to understand and process the signals coming from the input device 172 and the latch position sensor 174, so as to appropriately direct the actuation and direction of the motor 108. The configuration and design of such PC boards to achieve the desired functions set forth below are known to those of skill in the art. The input device 172 may comprise a keypad having a plurality of keys (in the embodiment shown, a total of five sequentially numbered keys). The input device 172 further includes a receiver for receipt of wireless signals (i.e., IR, RF, Bluetooth, zigbee, among others). More specifically, the keypad comprises an outer surface that has a thin-film metallic and polyester or polycarbonate surface configuration to resist damage and wear over the course of millions of cycles, and to provide resistance to solvents and chemicals, as well as to deter static charges (due to the relatively high dielectric strength). The combination of metallic and polyester properties on the outer surface can be provided by application of a metallic silver mirror ink on a polyester film to provide a low gloss look, textured surface with resistance to impact, scratching, scuffing, dents, ultraviolet light, and fingerprinting. Since the metallic surface is relatively thin (i.e., 150-200 micron) it may be applied by a printing process, and thus the keypad and the lock would be light-weight. The application of the metallic ink can be in a brushed or grain look running north-south or east-west. Below the outer surface a plurality of metallic conductive domes and conductive pads are provided to create the switch function.

The latch position sensor 174 is positioned in an orientation that is in a close relationship with position flange 115 (FIG. 12B) such that the sensor can determine the orientation and position of the latch relative to the housing assembly (and, as such, the knob). It is contemplated that the sensor is positioned on the PC board. The PC board is configured to reside within the main body cavity of the housing assembly.

It will further be understood that a position sensor can be configured to sense the position of the latch, which in turn, provides indirect feedback to detect at least two positions of the knob. Alternatively, a sensor can also detect one or more flags directly on the knob to detect at least two positions on the knob. The position sensor, it is contemplated may be of the optical type. To prolong the life of the battery, it is contemplated that the sensor intermittently detects the position and a change in position (i.e., a few milli-seconds every 1-2 second period). Of course, the sensor can be configured for a different intermittent interval, or may be configured for a continuous or generally continuous sensing.

In operation of the preferred embodiment, the lock is disposed in an operational environment, such as, for example, a desk. The housing assembly may be coupled to the furniture through any number of different means. It is contemplated that a double stick tape may be utilized on the cover 47 or fasteners may be extended through the furniture (or other structure in a different use) and into a corresponding bore of the housing assembly. In other embodiments, both double stick tape and threaded fasteners may be utilized. In addition, other means by which to couple the lock are contemplated. It will further be understood that the housing assembly can be mounted in any number of different orientations relative to the furniture bushing. For example, and as is shown in FIGS. 22A through 22D, the housing assembly may extend to the right or left, or vertically upward or downwardly. Other orientations (i.e., angular) are likewise contemplated.

Initially, with reference to FIGS. 12A and 12B, portions of the lock are shown in the locked configuration. In such a configuration, the blocker is in the blocking position, at the locked end of the blocker channel. The latch 102 is positioned within the latch channel with the distal end 112 of the latch 102 biased by the biasing member 114 into the axial notch 84 of the knob 70. The latch is precluded from slidable movement within the latch channel 40, as the blocker is positioned so as to extend through the latch channel and limiting the slidable movement of the latch within the latch channel. In some embodiments, the proximal end 110 of the latch 102 abuts the latch engagement body 124. In other embodiments, the biasing member 114 maintains a small separation between the latch and the blocker. Regardless of the interface, the blocker precludes the movement of the latch so that the distal end of the latch remains within the axial notch 84.

Figure 19A:
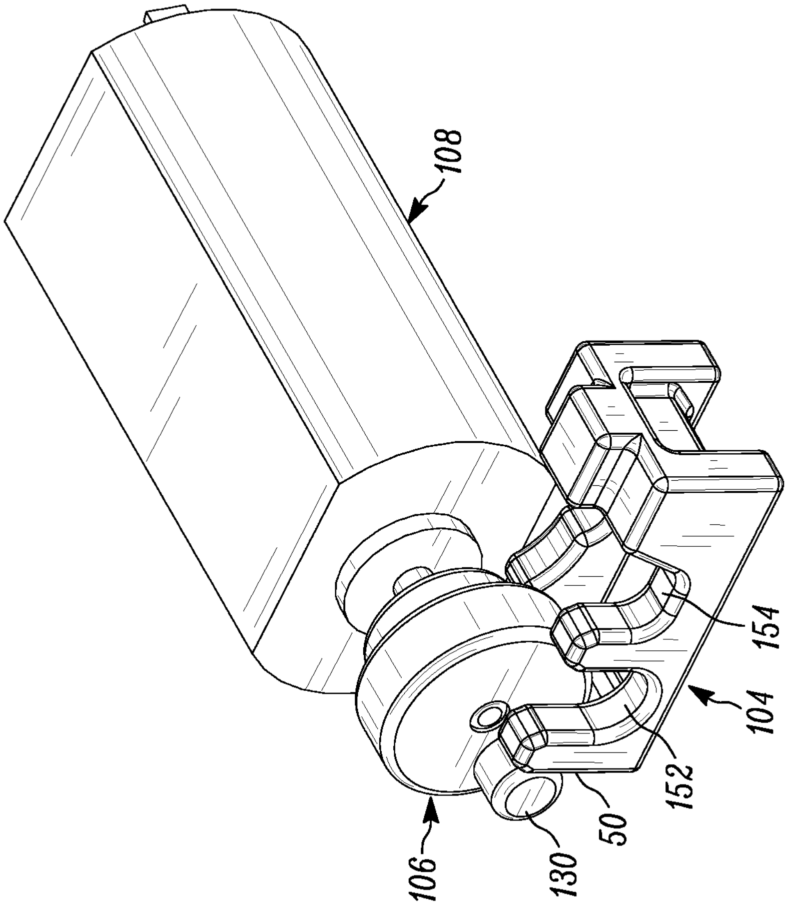
FIGS. 19A through 19E comprise sequential perspective views of the blocker, the cam and the motor as the cam and blocker move from the locked position to the unlocked position.

Additionally, in the locked configuration, the cam 106 is rotated such that the first follower 130 engages the first cam profile at the first slot 150. At the same time, the second follower engages the first ramp 156. Such a configuration is also shown at FIG. 19A with respect to the motor, cam and blocker. As will be explained below, the sequence of moving the blocker from a locked position to an unlocked position is achieved through rotation of the cam through approximately one and one half revolutions (although variations are contemplated which require lesser or greater revolutions of the cam and the motor.

To unlock the lock so that the locking flange 76 can be rotated, the user must direct the PC board to initiate an unlocking procedure. In one embodiment, a particular code or combination of keys is depressed in a particular combination to provide the necessary authorization to the electronic control assembly. In other embodiments, a wireless signal may be sent to the PC board via the input device 172. Regardless of the method of communicating the proper combination or code for initiating the unlocking procedure, once the procedure is initiated, the position of the latch is determined through sensor 174, and the motor is actuated.

Figure 19B:
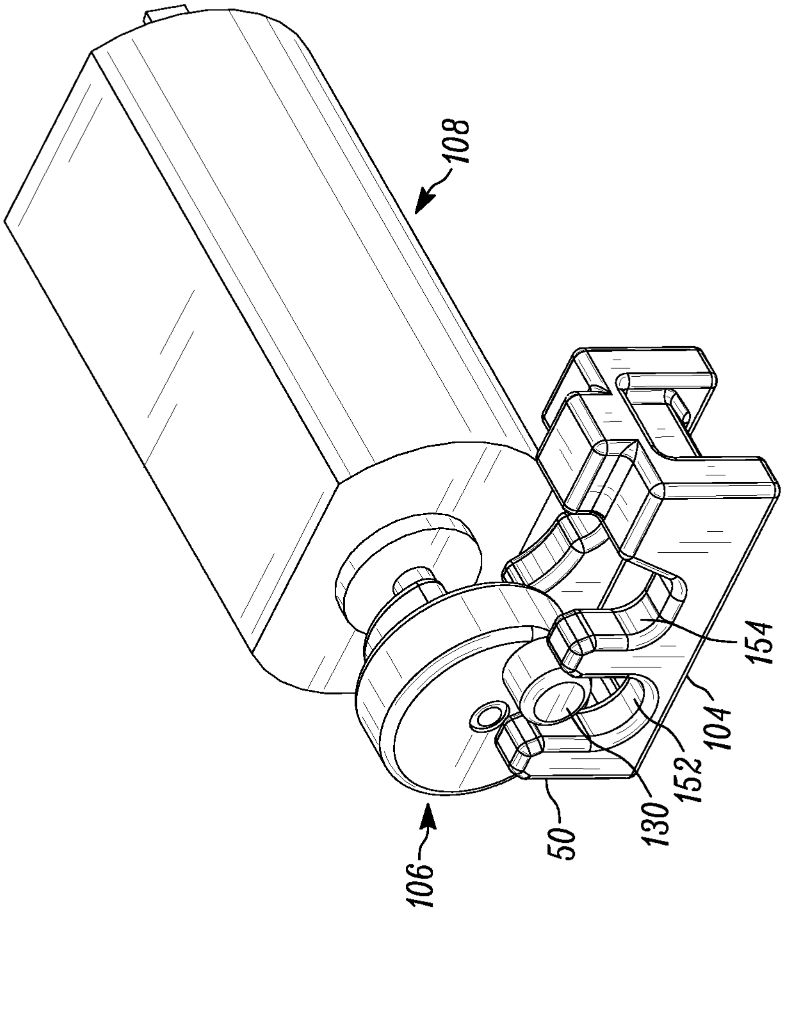
Figure 19C:
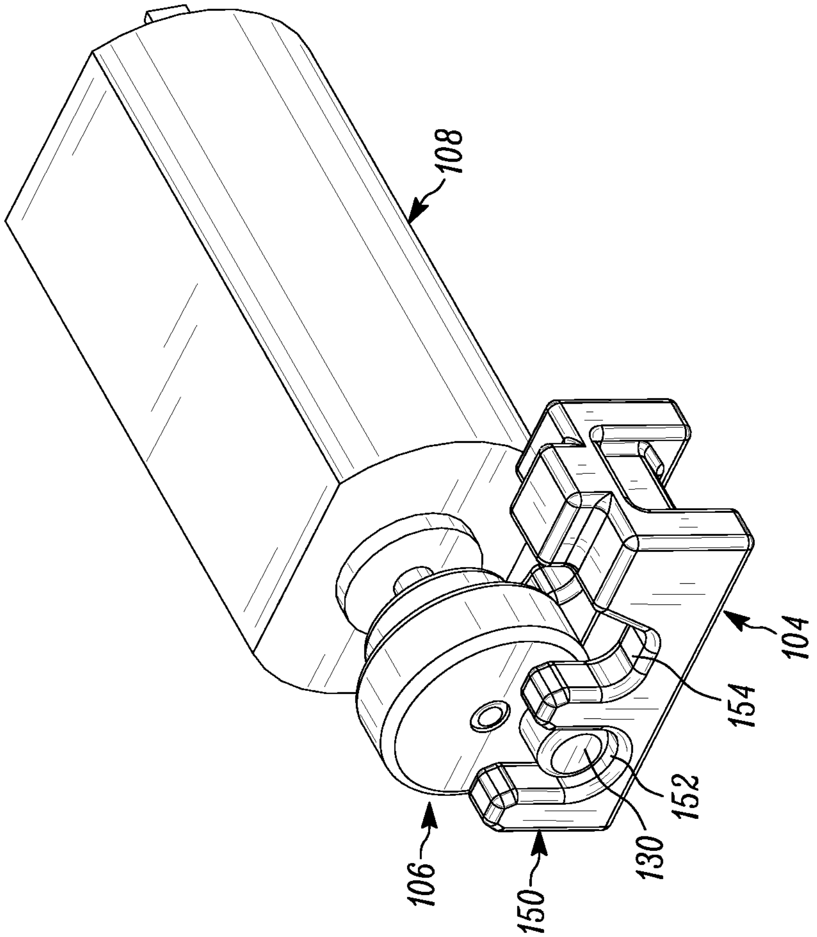
Figure 19D:
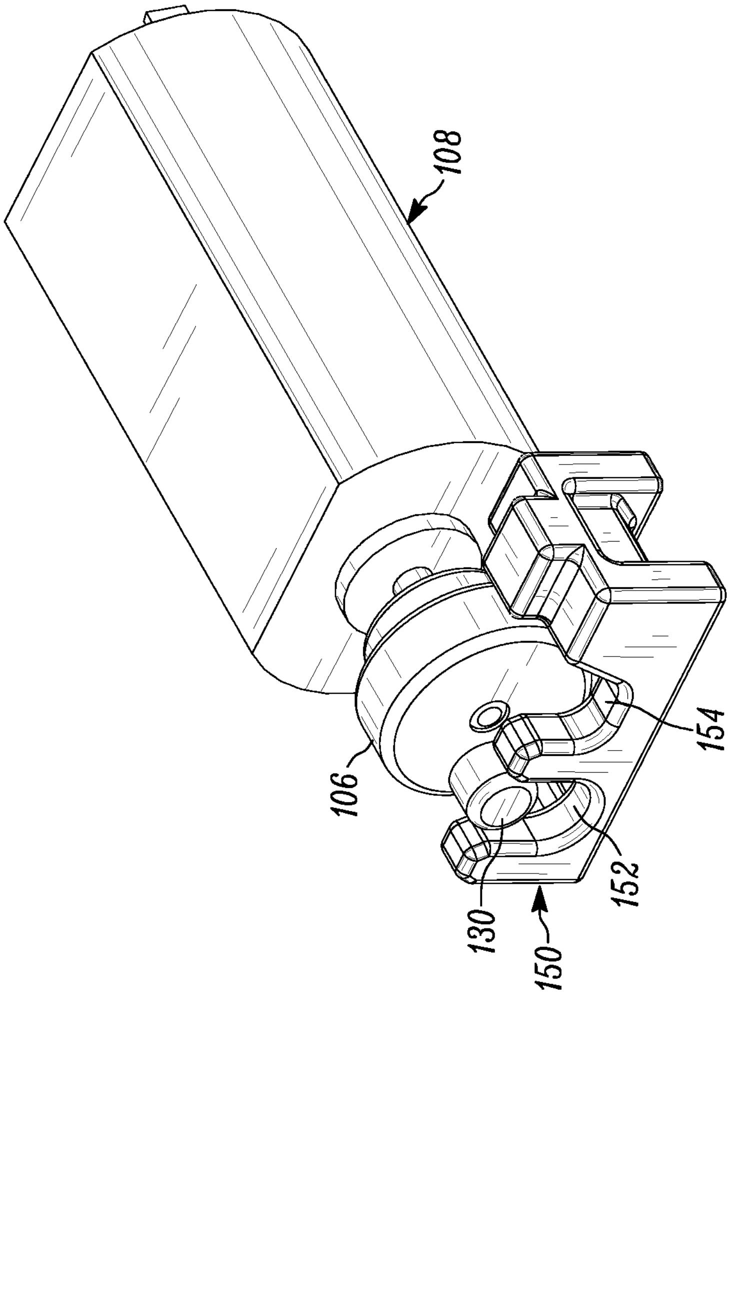

When the motor is actuated in a first direction, the cam 106 rotates in a first direction disengaging the first follower 130 from the first slot 150 (FIGS. 19A and 19B), the motor continues to rotate, and the first follower 130 eventually enters into the second slot 152 (FIG. 19B). Eventually, the continued rotation of the cam 106 with the first follower 130 positioned in the second slot 152 begins to translate the blocker 104 along the blocker channel 42 (FIGS. 19C and 19D). It will be understood that, advantageously, the cam 106 rotates through an arcuate distance prior to engaging the first cam profile with force being directed upon the blocker in a translating direction. In the embodiment shown, the cam 106 rotates through about a half turn prior to initiating the translation of the blocker. Advantageously, the motor is allowed to initiate rotation without load, such that momentum can be built up, which momentum is sufficient to initiate translation of the blocker. Such a momentum building, relatively load free, initiating step removes the need to utilize a gear train to reduce the speed of the cam or to increase the torque applied by the cam. Rather, a direct drive of the cam by the motor (which greatly simplifies the construction) can be utilized.

Figure 19E:
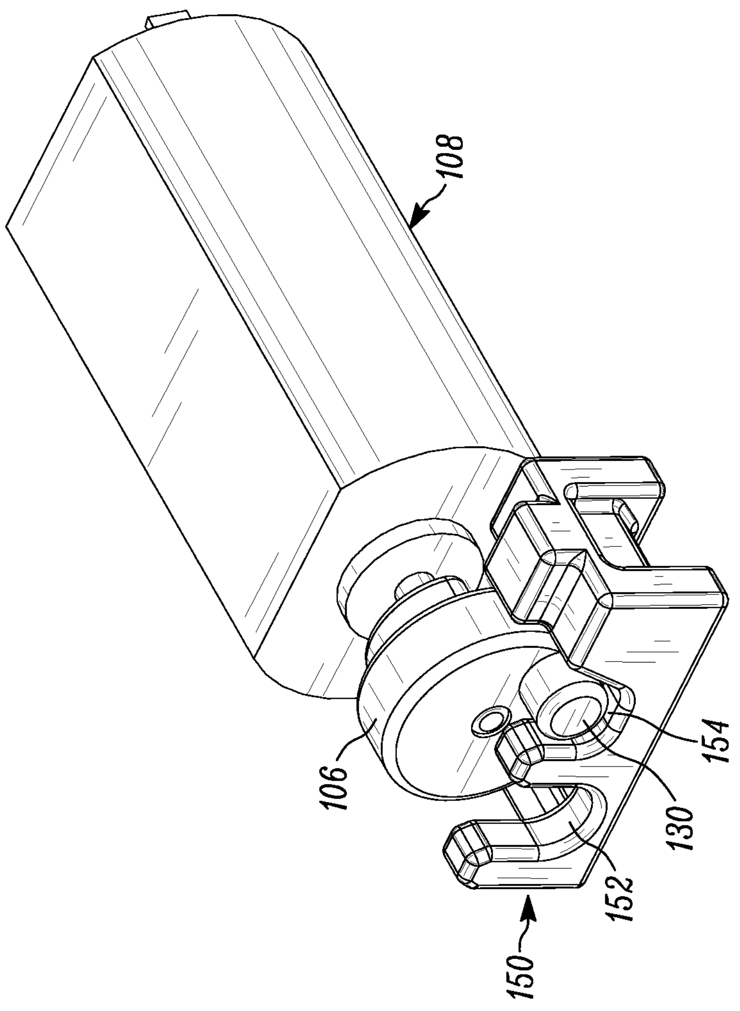

As the rotation of the cam 106 continues, eventually, the blocker continues to translate due to the interaction of the first follower 130 within the second slot 152 of the first cam profile. Eventually, the first follower 130 reaches a point, as does the blocker 104 wherein the first follower 130 no longer exerts a force on the blocker 104 to translate further (FIG. 19D). Shortly thereafter, the first follower 130 exits from the second slot 152 and continued rotation directs the first follower 130 into the second slot. When the first follower 130 is fully inserted into the second slot, further movement is precluded (FIG. 19E). The PC board senses that the first follower is in such a position (i.e., through a sensing of the draw of the motor, or through other means, such as a sensor or the like). The PC board then directs the motor to cease rotation. In another embodiment, a timer can trigger the motor circuit to de-energize the motor. It will also be understood that the cam follower 132 interacts with the second cam profile, and the ramps in order to retain the blocker in proper alignment with slots 152, 154, when the follower is outside of the slots 152, 154, and also prior to entry into these slots.

The blocker is now in the unlocked orientation shown in FIGS. 13A and 13B. That is, the blocker is moved out of the path of the latch channel, and the latch can be slidably moved within the latch channel. The engagement of the cam 106 with the third slot 154 and the interaction of the second follower 132 with the second cam profile, maintains the blocker in the unlocked configuration.

In such a configuration, and with reference to FIG. 13A?, the user can initiate rotation of the knob 70 to move the locking flange into an unlocked position. As the user initiates rotation of the knob 70, the first surface 83 or the second surface 85 (depending on the direction of rotation being clockwise or counterclockwise) imparts a force on the distal end 112 of the latch 102. The two surfaces are angled such that the imparting of force includes a force component in the longitudinal direction of the latch 102. In turn, the continued rotation of the knob pushes the latch 102 out of the axial notch, overcoming the biasing means. There is no blocker to preclude the slidable movement of the latch, and, as such, the knob can force the latch out of the way so that the latch does not preclude movement of the knob. As the knob is further turned, unimpeded, the locking flange can be moved into an unlocked position.

Due to the biasing member 114, the distal end 112 of the latch 102 is directed toward the knob. In the unlocked condition, the distal end of the latch remains in contact with the dependent skirt 82 of the knob 70. At the same time, the blocker 104 is maintained by the cam 106 in the unlocked position to preclude interference with or impeding of the latch.

To relock the lock, the user turns the knob back so as to direct the lock flange 76 into the locked position. Eventually, the knob is returned to an orientation wherein the axial notch 84 of the knob aligns with the latch 102, and the distal end of the latch extends into the axial notch 84. In the embodiment shown, the position sensor 174 (FIG. 24) in cooperation with position flange 115 senses the position of the latch within the axial notch. In such an orientation, the latch has travelled toward the knob such that the distal end thereof is outside of the blocker channel 42.

Next, the motor is activated again, by the electronic control 18, in the opposite direction from the direction of rotation during unlocking. The steps shown in FIGS. 19A through 19E are carried out in reverse. Namely, the cam 106 is rotated by the motor, and the first follower 130 exits the third slot, extends over the second ridge 153 and enters the second slot 152 (FIGS. 19E and 19D). Continued rotation imparts a force upon the blocker having a component in the direction of the locked position and the blocker slidably moves toward the locked position along the blocker channel (FIG. 19C). Eventually, the blocker reaches a translated position wherein the cam 106 no longer slidably moves the blocker (FIG. 19B). In such a position, further rotation of the cam 106 directs the first follower 130 to exit the second slot, traverse over the first ridge 153 and returns to first slot 150 (FIG. 19A).

Similar to that which was explained above with respect to the unlocking procedure, during the locking procedure, the cam 106 rotates an arcuate distance without the first follower 130 imparting a force on the first cam profile of the blocker. As such, the cam can gather speed, and in turn, momentum, such that when the cam enters the second slot 152, the cam has sufficient force to impart onto the blocker to translate the blocker. Such an intermittent contact with the first cam profile, and intermittent application of a translational force allows for the use of a directly driven cam, and a motor smaller than would otherwise be required. Furthermore, the consumption of power from the battery is reduced for each cycle as compared to a rack and pinion with constant engagement and application of force therebetween.

Once in the first slot 150, the cam 106 is precluded from rotation as the blocker has reached the locked position (i.e., the end of travel of the blocker along the blocking channel). Thus, while rotation is precluded, the motor continues to impart a rotational force on the cam 106, thereby increasing the power draw. The electronic control 18 realizes the increased power draw by the motor as a signal that the blocker has returned to the locked position. In turn, the power to the motor ceases.

In this position, the blocker 104 is in a position that precludes slidable movement of the latch sufficient to move the latch out of the axial notch 84 to allow rotation of the knob 70. Any rotation of the knob by the user will translate to translative movement of the latch into contact with the blocker which will stop the movement of the latch while the distal end remains in the axial notch 84.

It will be understood that the electronic control 18 may be programmed in any number of different manners. In addition to the operation above, other operation configurations are contemplated. For example, in a setting such as a locker room, it is desirable for each user of a locker to be able to input his or her own code for each use. As such, while the mechanical locking and unlocking steps are the same as disclosed above, the blocker movement is initiated by differing conditions.

More particularly, initially, the locker may be closed and the lock flange may be in the locked configuration. However, the blocker may be in the unlocked position, thereby allowing the rotation of the knob 70. Once the knob 70 is rotated and the lock flange 76 is in the unlocked position, the latch is driven out of the axial notch and the position sensor 174 senses that the latch has been moved out of the axial notch. At such time, the operation may direct the user to input a new unlocking key sequence on the keypad of the input device. This input sets the code for the operation of the lock through the next cycle. Once the code is input, the electronic control is programmed to execute the locking procedure the next time that the knob is rotated into a locked position and the latch is biased into the axial notch 84. More specifically, the motor is activated and through the cam 106, the blocker is translated into the locked position.

To re-unlock the lock, the user must provide the authorization through an unlock code (or another code to over-ride the communication to the electronic control). Once the code is provided, the motor is activated in the other direction, translating the blocker to the unlocked position. At the same time, the electronic control is ready for another cycle. That is, the electronic control is ready to receive a new code from the user through the input device. As such, a new code is applied each time the lock cycles between the locked and unlocked configuration.

It may, from time to time, be necessary to service the lock. To service the lock the knob is first removed from the housing assembly. As explained above, a set screw or multiple set screws, maintain the engagement of the knob 70 and the lock driver 72. The set screw is accessible through the opening on the second end of the housing, but only when the knob 70 is in a particular rotative position to line up the set screw with the opening. It will be understood that, to preclude access to the set screw, except when the blocker is in the unlocked position, the opening and the set screw are not in alignment when the knob is in the locked condition.

As can be seen in the figures, the lock is configured to extend through a bushing (also referred to as a shell) held by a cabinet or enclosure (not shown). The actuatable lock assembly is configured can be connected and disconnected from the bushing. Advantageously, a portion of the actuatable lock assembly is within the cabinet or enclosure with a portion of the actuatable lock assembly outside of the cabinet or enclosure, when coupled to the bushing. The latching assembly as discussed above is positioned within a housing assembly. The housing assembly extends along the outside of the cabinet or enclosure.

The actuatable lock assembly includes a longitudinal axis that generally corresponds to the axis of rotation thereof (although not required). The housing assembly likewise includes a longitudinal axis. The longitudinal axis of the actuatable lock assembly is substantially perpendicular to the longitudinal axis of the housing assembly.

Figure 23:
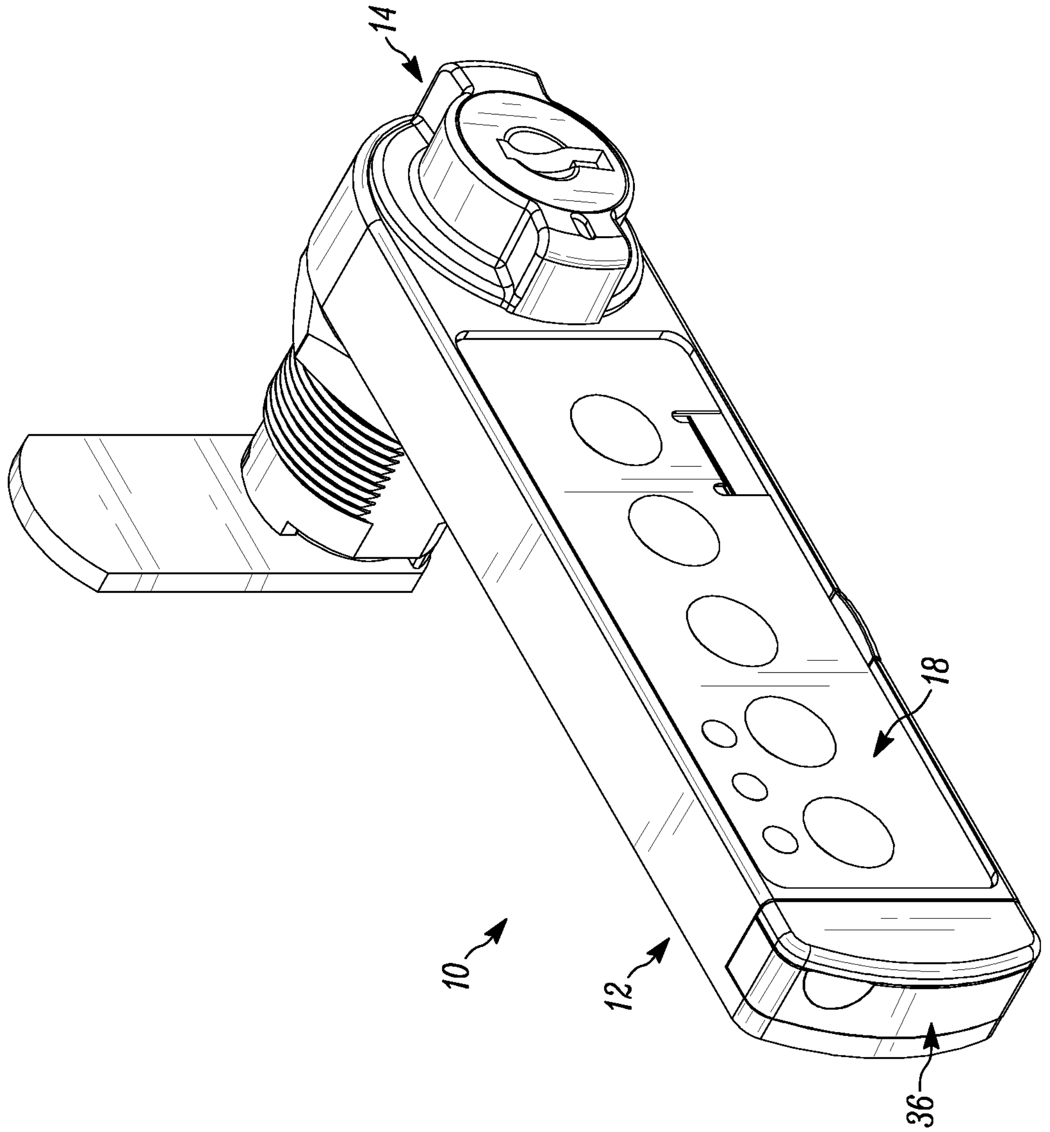
FIG. 23 of the drawings is a perspective view of an alternate embodiment of the lock, showing, in particular, an actuatable lock member having a mechanical key over-ride.
Figure 24:
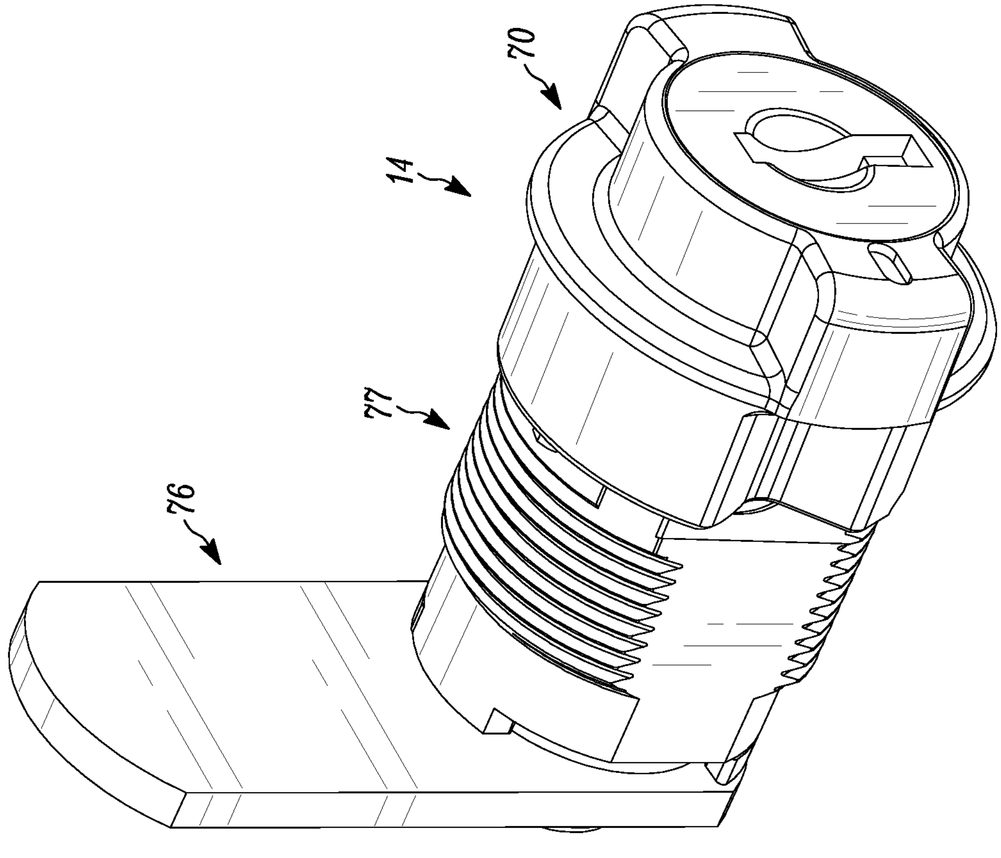
FIG. 24 of the drawings is a perspective view of an alternate embodiment of the actuatable lock member of the type shown in FIG. 27A with a key inserted therein.

In the embodiment shown in FIGS. 23 and 24, a key override can be provided to over-ride the electronic locking function. In such an embodiment, a lock core controlled by a mechanical key can be integrated into the actuatable lock assembly 14. Such a configuration allows the lock to be unlocked even if the blocker is in the locked position, precluding slidable movement of the latch along the latch channel. Insertion and turning of the mechanical key in the lock core allows the tumblers in the lock core to retract and allow the core to rotate. The lock flange rotates with the key while the knob remains in its locked configuration, due to the latch and blocker position. In a related embodiment, the rotating of the lock core causes movement to the blocker so that the latch can be freely moved out of the axial notch of the knob to allow functional rotation of the knob. It is also contemplated that a mechanical key over-ride mechanism could be rotated in order to move the latch relative to the channel, and/or out of engagement with the knob, or to move the blocker out of the channel of the latch.

Figure 25:
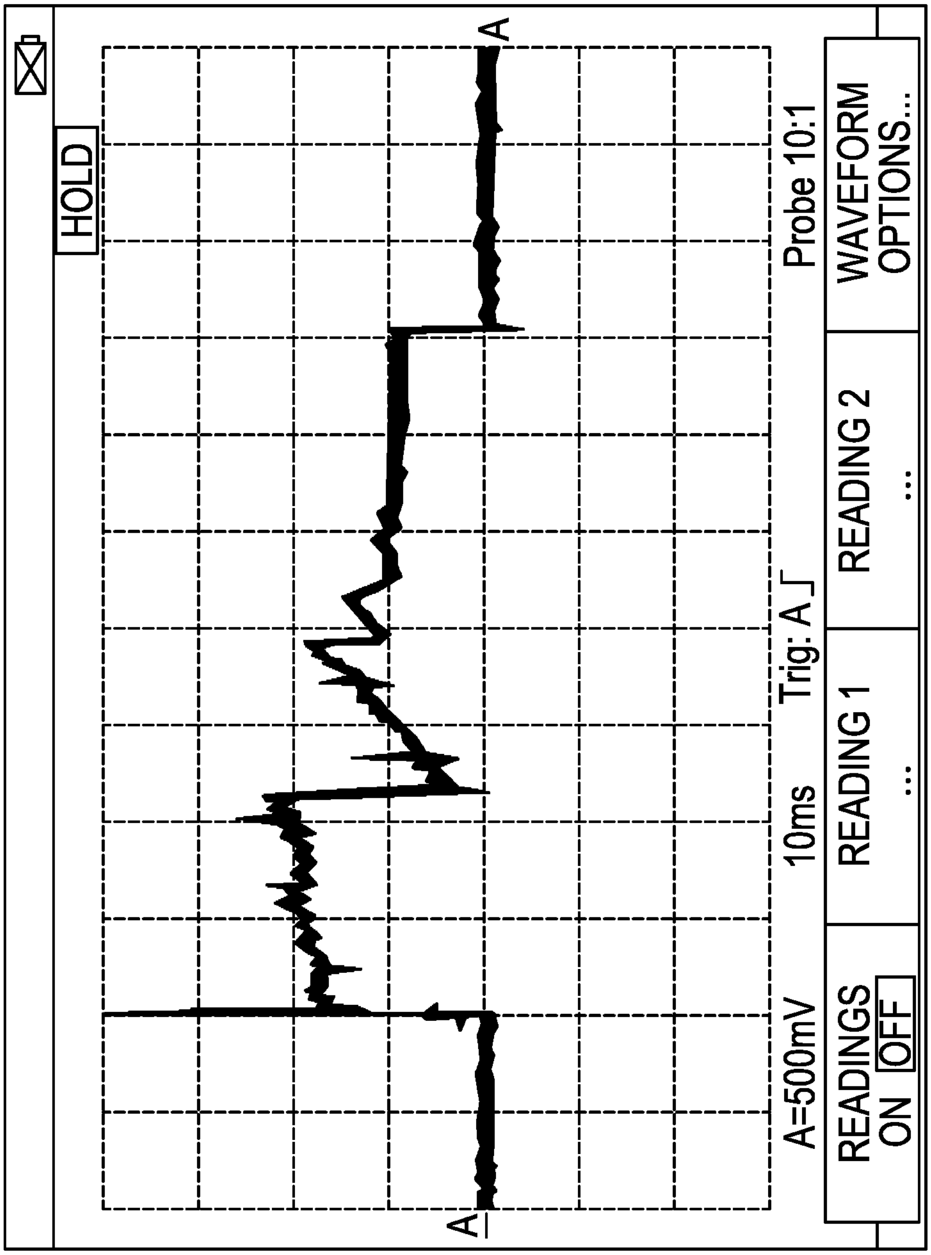
FIG. 25 of the drawings is a graphical representation of the current by the motor as measured through the unlocking cycle.
Figure 26:
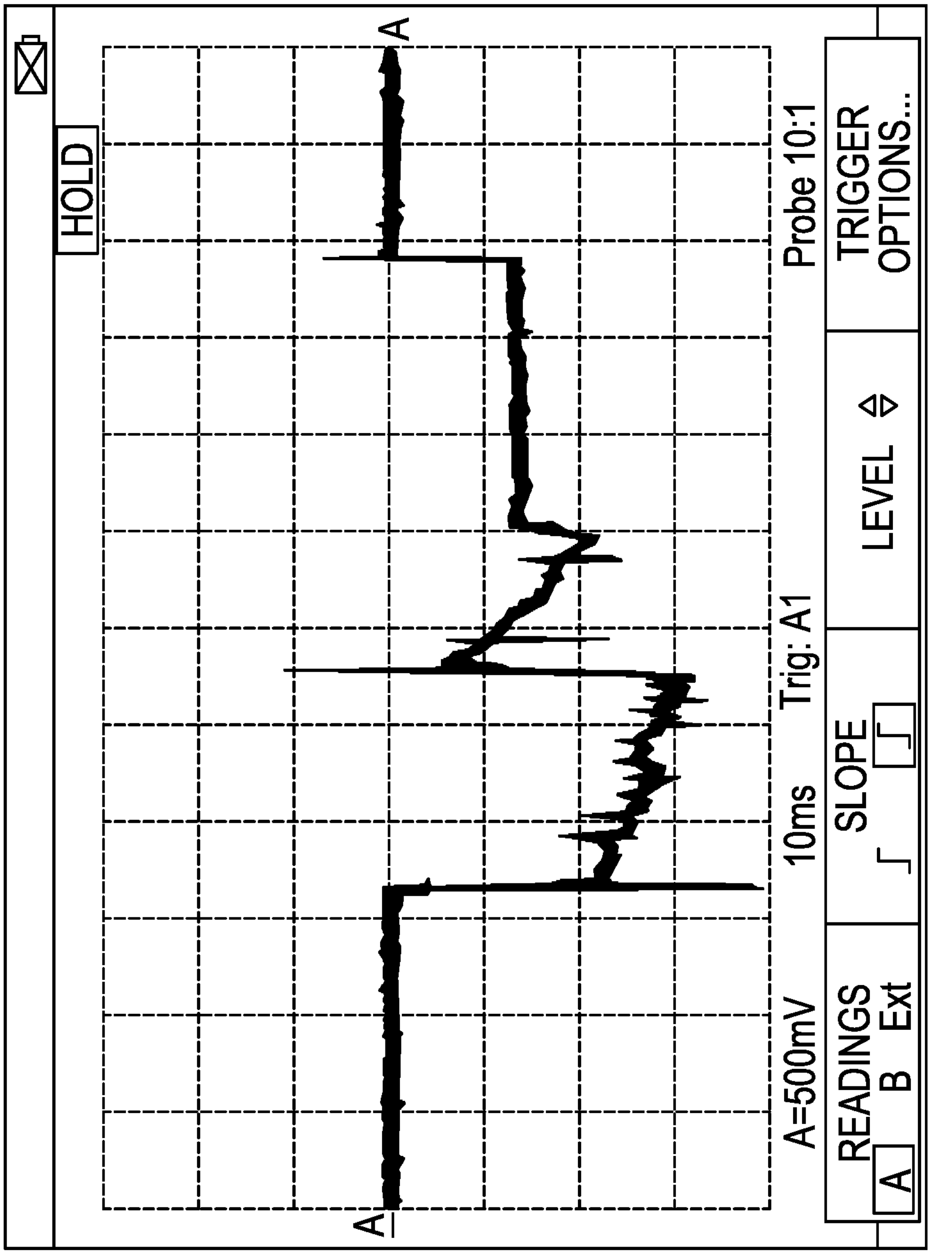
FIG. 26 of the drawings is a graphical representation of the current draw by the motor as measured through the locking cycle.

Referring now to FIGS. 25 and 26, a graph is shown of the current waveform of the motor 108 during operation. In particular, FIG. 25 shows the current waveform to accomplish the translation of the blocker from the locked position to the unlocked position. The current waveform has multiple slopes of increasing and decreasing current through the translation of the blocker. First, when the motor is initiated, there is an inrush of current, to overcome the inertia and to begin rotation. Next, the current decreases as the cam 106 continues to rotate and accelerate from a resting position to a position where the first follower reaches the second slot 152. As the continued rotation initiates translation of the blocker, the current decreases abruptly. The current begins another increasing slope as the blocker translates across to the unlocked position. As the rotation of the cam continues, the first follower 130 exits the second ramp, causing a quick drop in current draw, with the current draw entering another increasing slope as the speed of the cam increases without resistance toward and into the third slot 154. Finally, as the first follower reaches the end of the third slot 154, the current drops to a to a steady draw in an effort to cause further rotation (i.e., substantially flatlines). It is the sensing of this relatively steady current draw that signals to the electronic control assembly that the blocker has reached the unlocked configuration.

The opposite is shown in FIG. 26, wherein a waveform for the motor is shown for a locking operation. In particular, the waveform is inverted, and transitions through the same regions (although, as the motor operates in the opposite direction, the current is in the opposite direction). Again, when the end of travel is reached, the current reaches a substantially steady draw which triggers the electronic control assembly to cease rotation of the motor, as the blocker has reached the locked configuration. The two FIGS. 25 and 26 show the intermittent nature of the contact between the blocker and the cam, thereby showing how the overall use of power is not continuous, but that it varies throughout the cycle. While variations in the actual current draw will be seen depending on a number of variables, the general configuration of a spike when movement of the cam is initiated, followed by a sloped change of increased current draw during rotation of the cam without coacting with the blocker to effectuate translation of the blocker, followed by a drop in current draw when contact is made with the blocker and force is imparted upon the blocker to translate across the blocker channel, followed by another drop in current draw when the blocker reaches the end of translation, and the first follower is free to rotate without imparting force upon the blocker, followed by an increase in current draw as the cam accelerates, finally followed by a drop and a flatline when the end of rotation of the cam is reached with the first follower positioned at the end of the final slot (slot 150 when reaching the locked orientation and slot 154 when reaching the unlocked configuration).

Figure 27A:
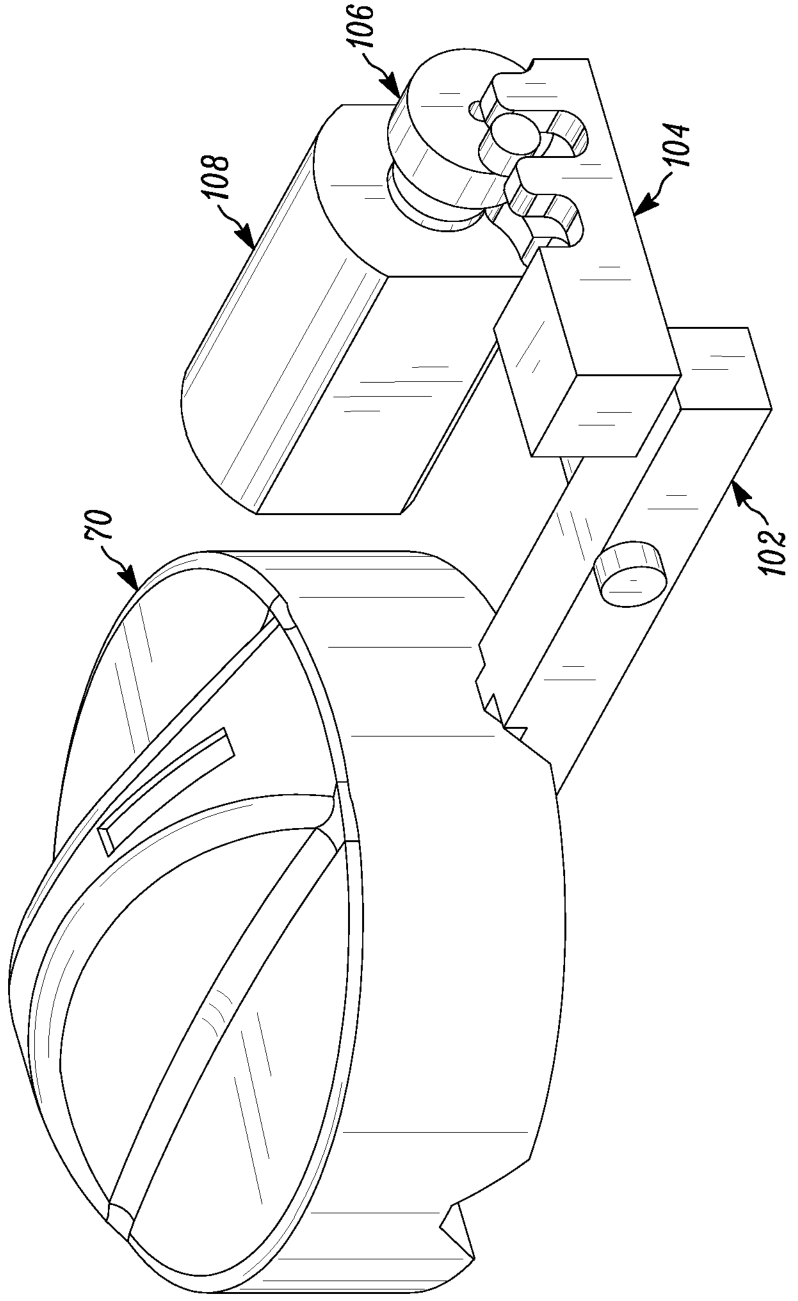
FIG. 27A of the drawings is an alternate embodiment of the latch assembly and the knob of the actuatable lock assembly of the present disclosure, in the locked position.
Figure 27B:
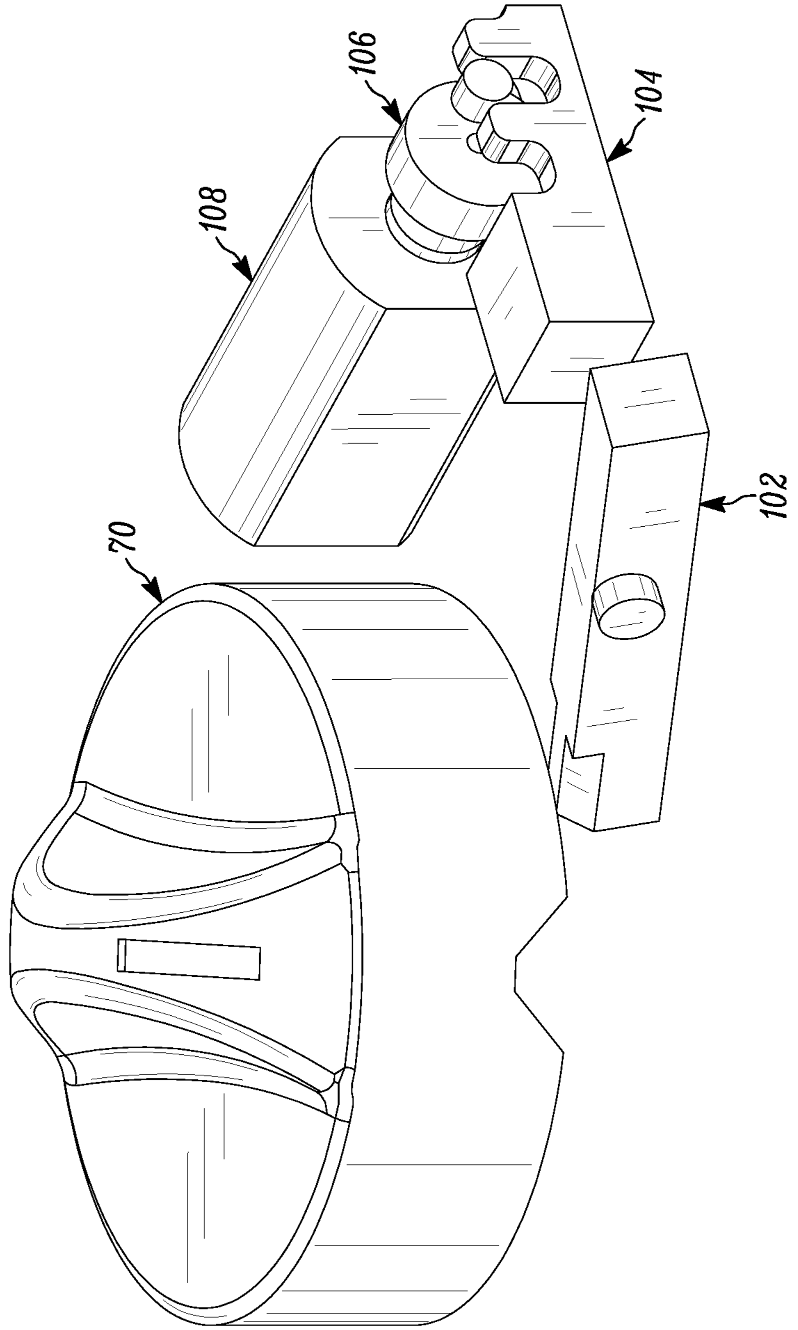
FIG. 27B of the drawings is an alternate embodiment of the latch assembly and the knob of the actuatable lock assembly of the present disclosure, that is shown in FIG. 27A, in the unlocked position.

It will be understood that variations to the structure of the latching assembly are contemplated. For example, and with reference to FIGS. 27A and 27B, a variation is contemplated wherein the operation of the blocker remains the same in that the blocker translates within a blocker channel. However, the latch rotates about an axis of rotation that is positioned between the proximal and distal ends. The axis of rotation is further substantially parallel to the blocker channel, and spaced apart therefrom. The knob in such an embodiment has a downwardly opening notch in the dependent skirt which interfaces with the distal end of the latch.

In the locked configuration, the latch is biased so that the distal end is rotated about the axis of rotation into the downwardly opening notch. The blocker extends over the proximal end of the latch precluding rotation about the axis of rotation, thereby maintaining the latch in the downwardly opening notch. When the blocker is moved to an unlocked position, the blocker is spaced apart from the latch, and the latch is free to be rotated about the axis of rotation. Thus, when the knob is rotated, the shape of the downwardly opening notch imparts a downward force upon the latch driving the latch out of the notch and allowing free rotation of the knob. The opposite sequence is performed to again return the blocker to the locked position.

Figure 28A:
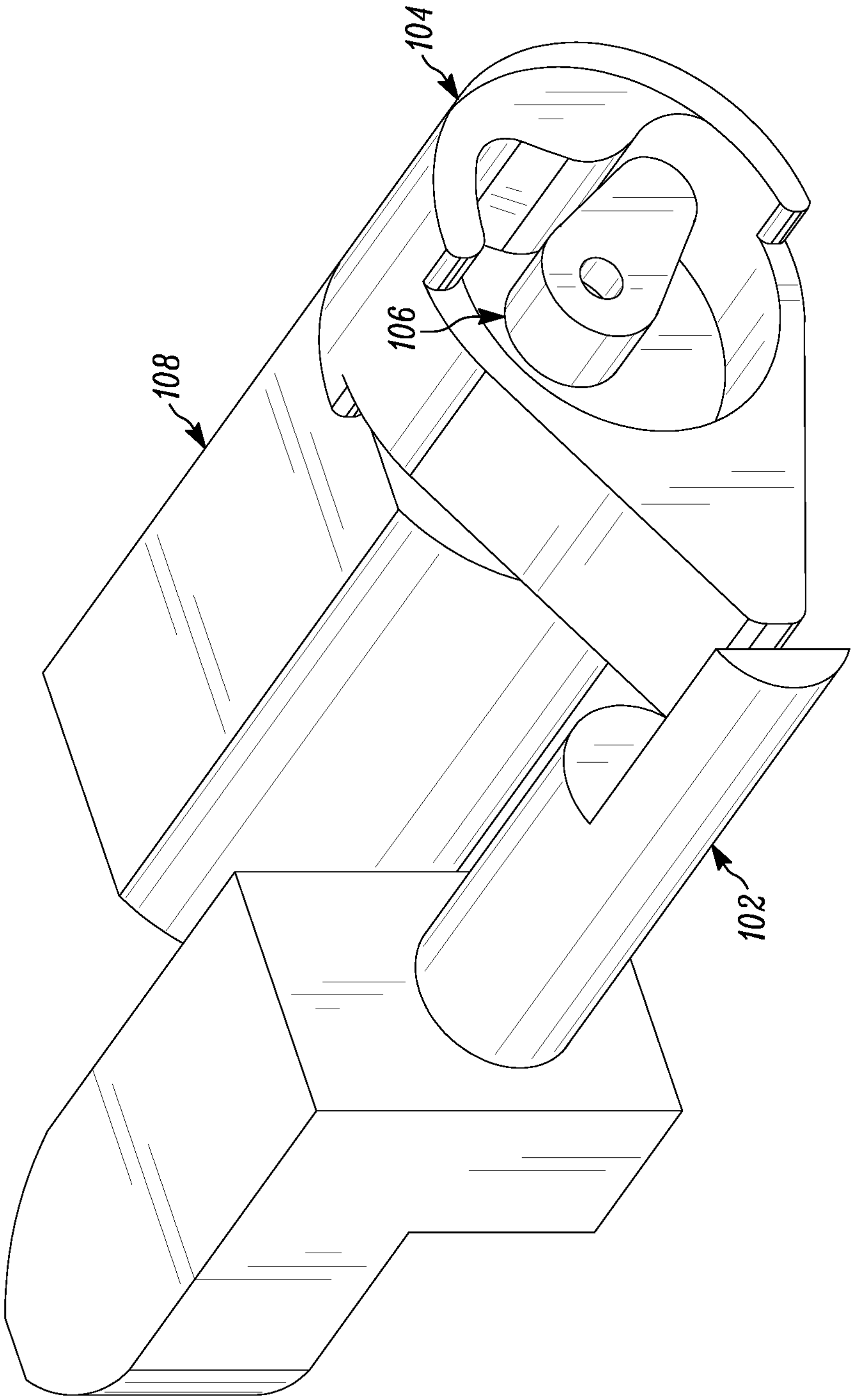
FIG. 28A of the drawings is an alternate embodiment of the latch assembly of the present disclosure, in the locked position.
Figure 28B:
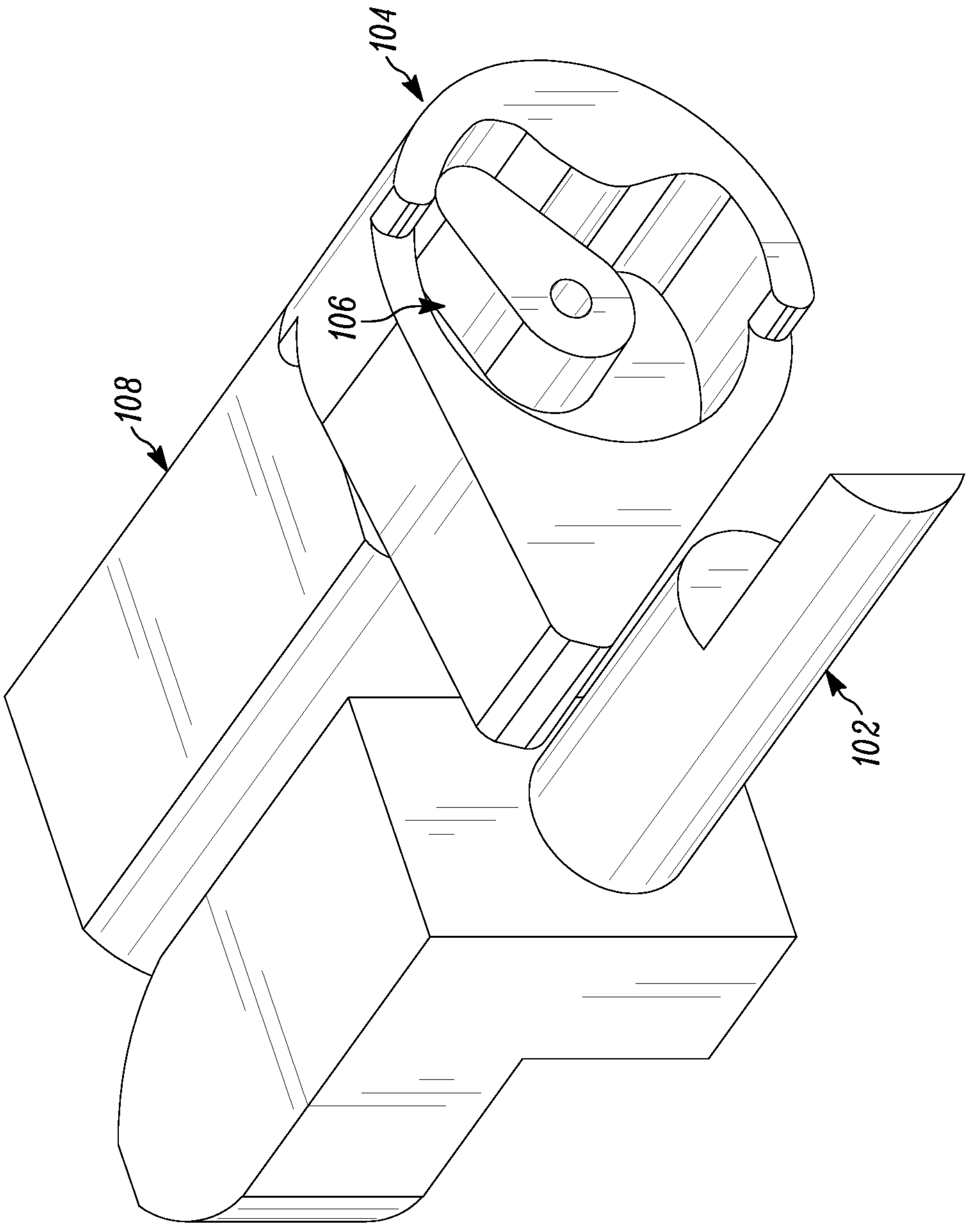
FIG. 28B of the drawings is an alternate embodiment of the latch assembly of the present disclosure, that is shown in FIG. 28A, in the unlocked position.

With the embodiment of FIGS. 28A and 28B, a rotationally movable blocker is contemplated. In such an embodiment, the rotational blocker includes a first cam profile within a cavity of the blocker, and a lobe extending on an outer surface thereof. The lobe interfaces with the proximal end of the latch. The cam 106 is positioned within the cavity of the blocker so that rotation of the motor interfaces the first follower of the cam with the first cam profile of the blocker. As such, when rotated in a first direction, the first cam follower freely rotates relative to the blocker until the first stop is reached. At such time, continued rotation of the first cam follower rotates the blocker, as shown in FIG. 28B. The rotation of the blocker, eventually moves the blocker out of the way of the latch. The latch is then free to slidably move within a latch channel.

To return the device to the locked orientation, the cam 106 is rotated in the opposite direction relative to the blocker until the second stop is reached. When the second stop is reached, the continued rotation of the cam by the motor rotates the blocker, returning the blocker into a position that interfaces with the proximal end of the latch. As such, the blocker precludes slidable movement, which, in turn, precludes rotation of the knob that interfaces with the distal end of the latch.

Figure 29A:
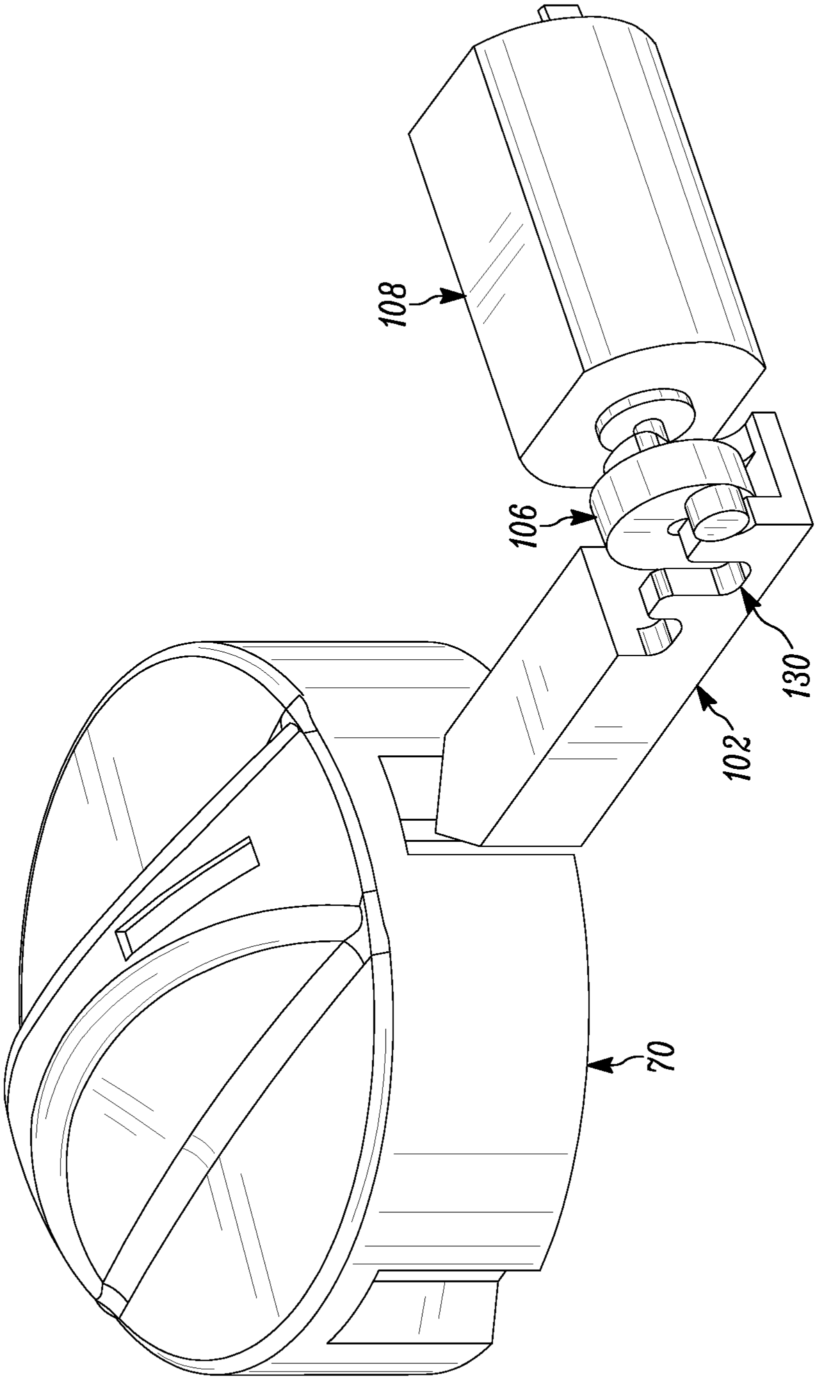
FIG. 29A of the drawings is an alternate embodiment of the latch assembly of the present disclosure, in the locked position.
Figure 29B:
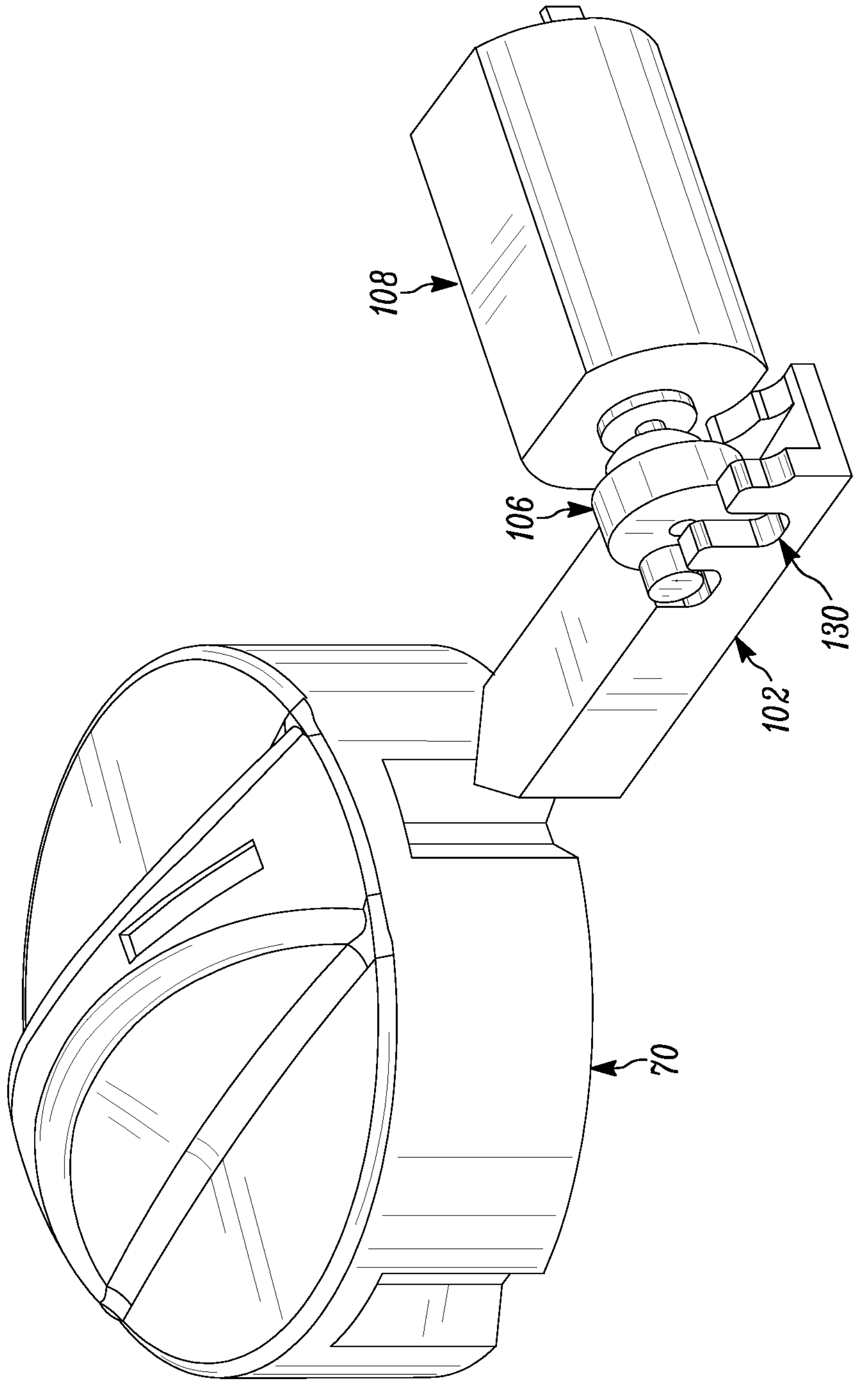
FIG. 29B of the drawings is an alternate embodiment of the latch assembly of the present disclosure, that is shown in FIG. 29A, in the unlocked position.
Figure 29C:
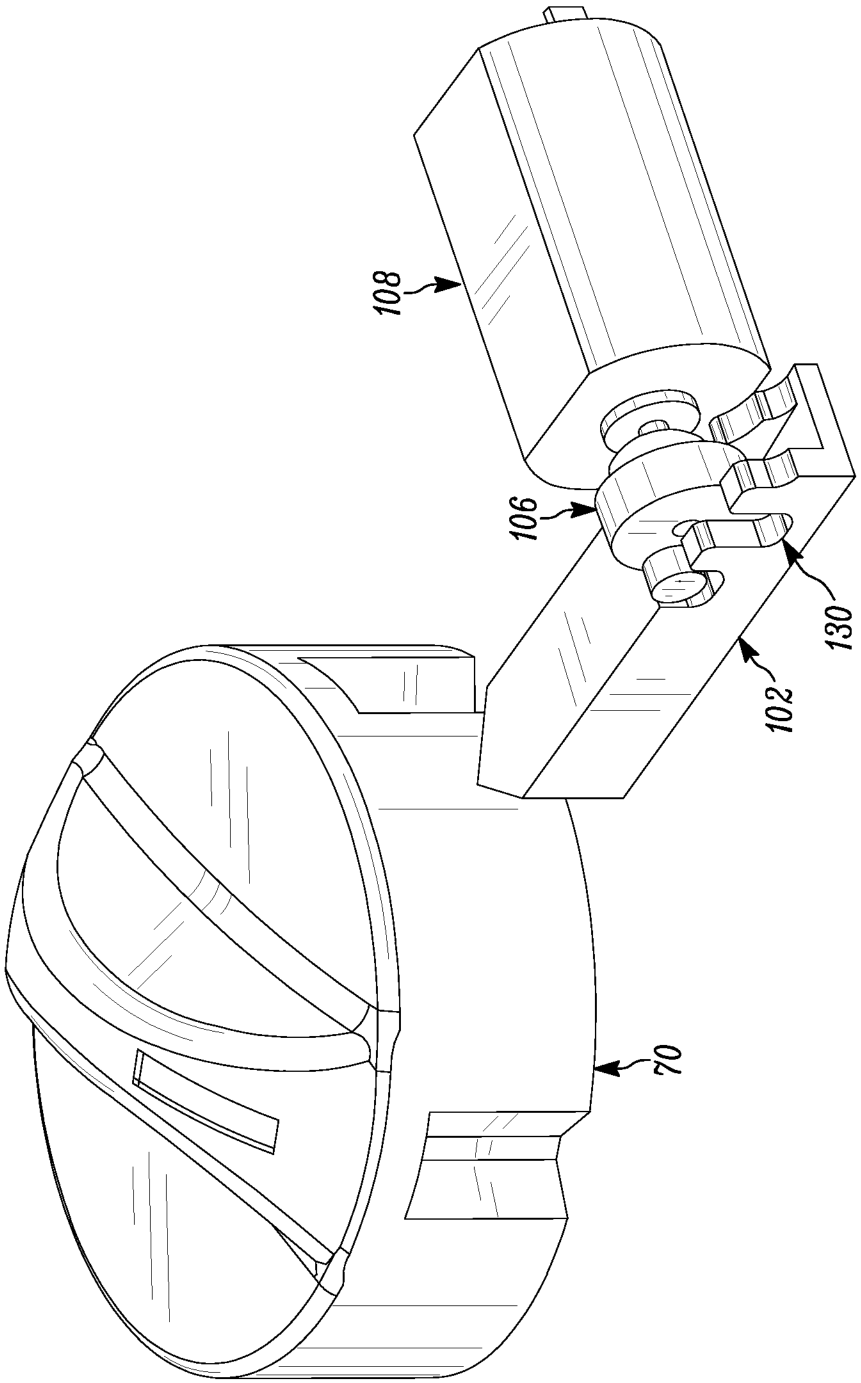
FIG. 29C of the drawings is an alternate embodiment of the latch assembly of the present disclosure, that is shown in FIG. 29A, in the unlocked position, with the knob rotated relative to the knob position in FIG. 29B.
Figure 30:
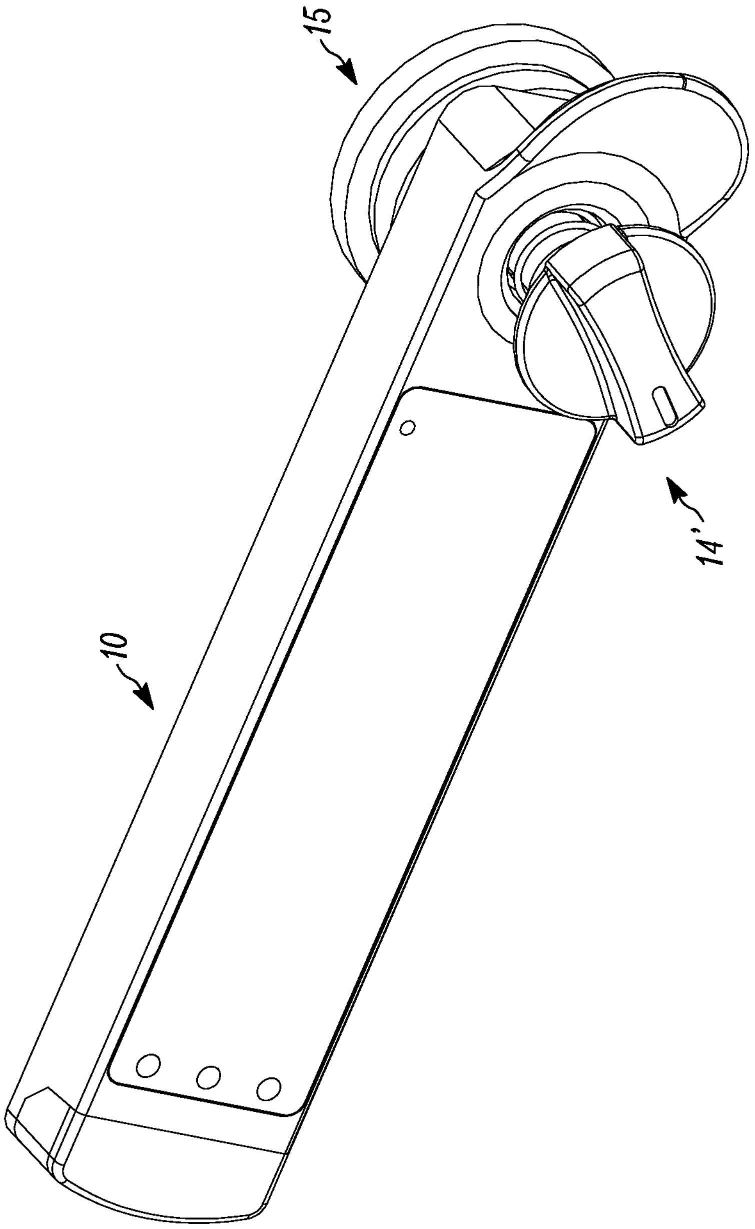
FIG. 30 of the drawings is a perspective view of another configuration of the lock of the present disclosure.
Figure 31:
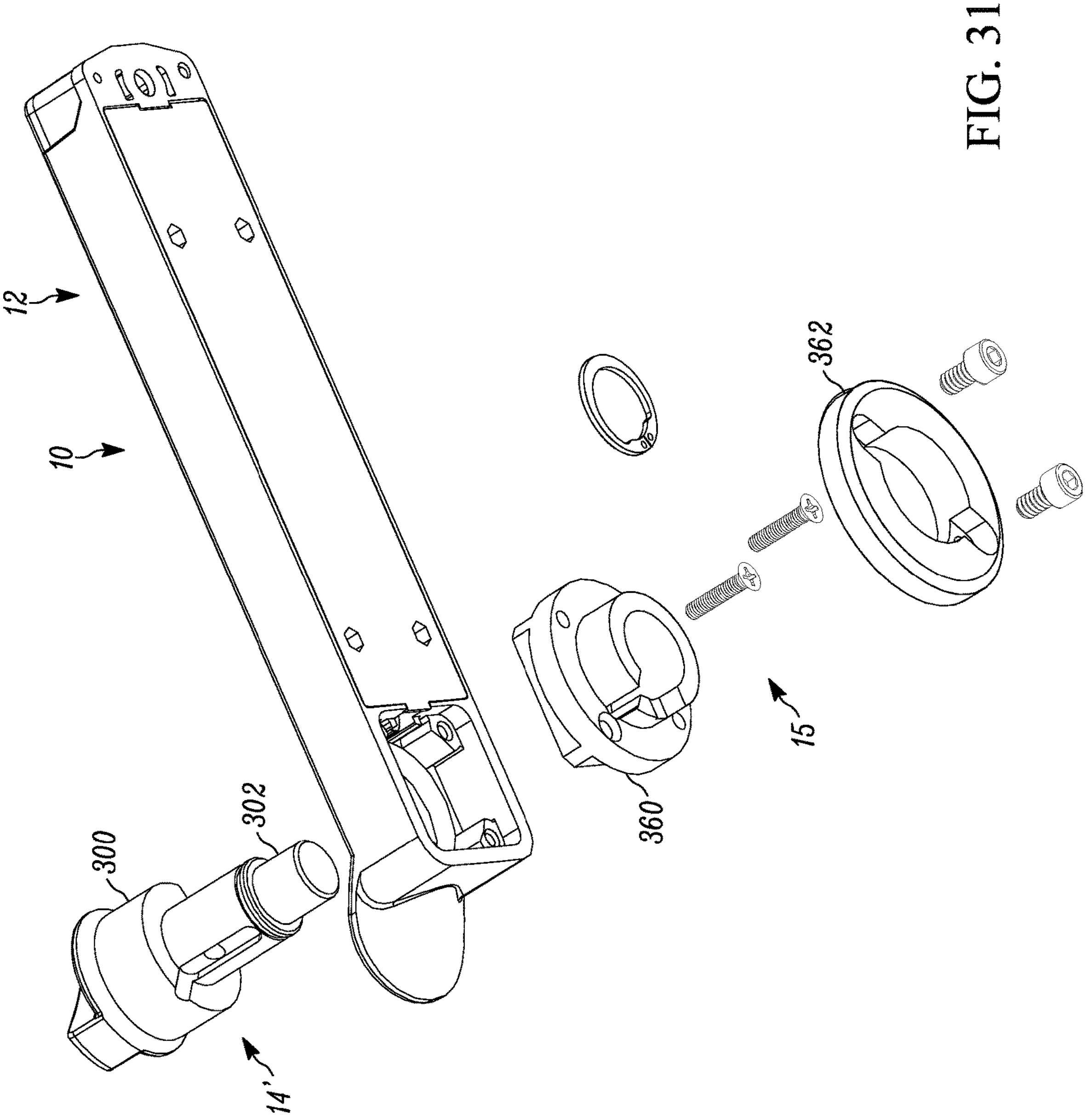
FIG. 31 of the drawings is an exploded perspective view of the lock of the present disclosure in the locked configuration.
Figure 32:
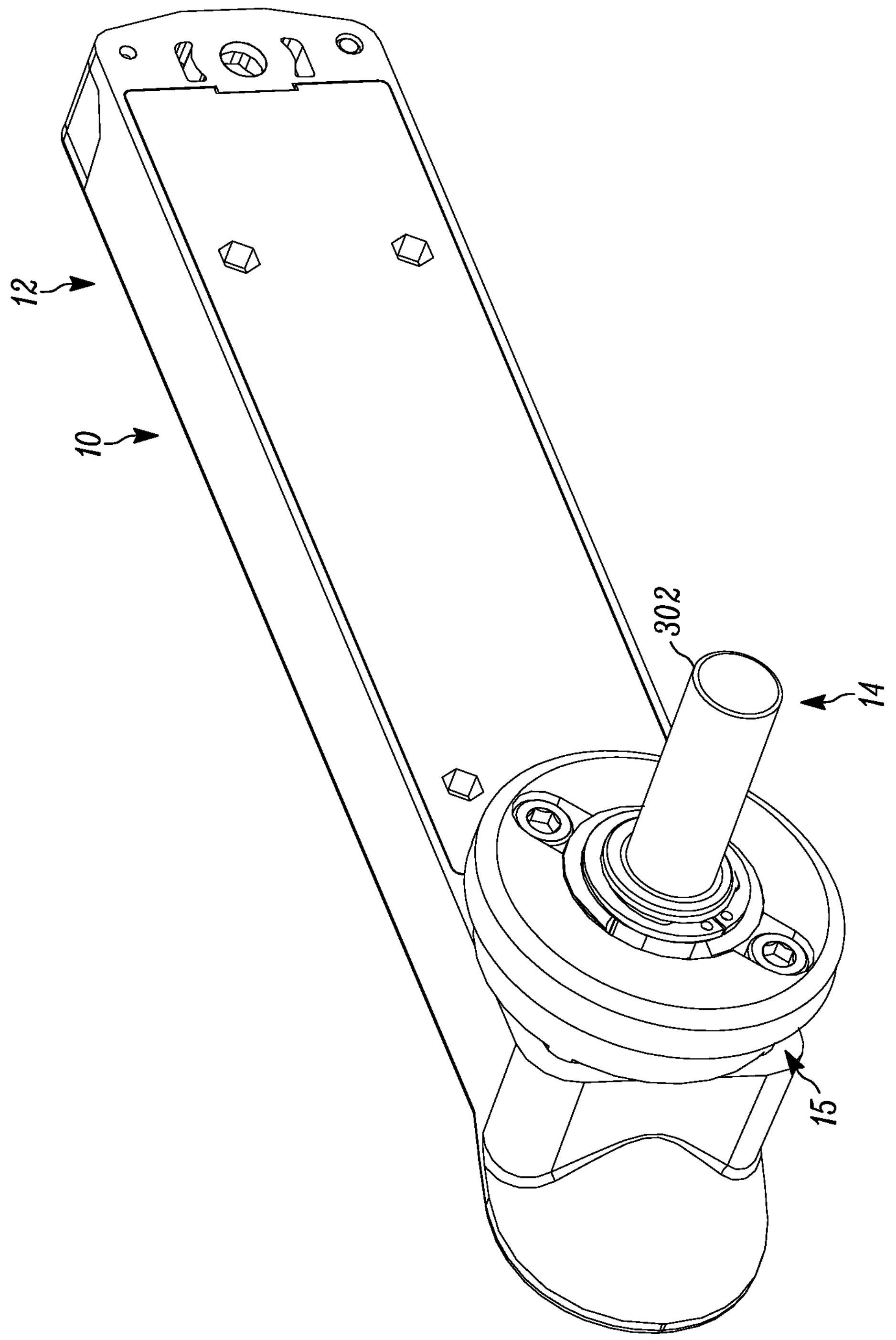
FIG. 32 of the drawings is a back perspective view of the lock of the present disclosure in the locked configuration.
Figure 33:
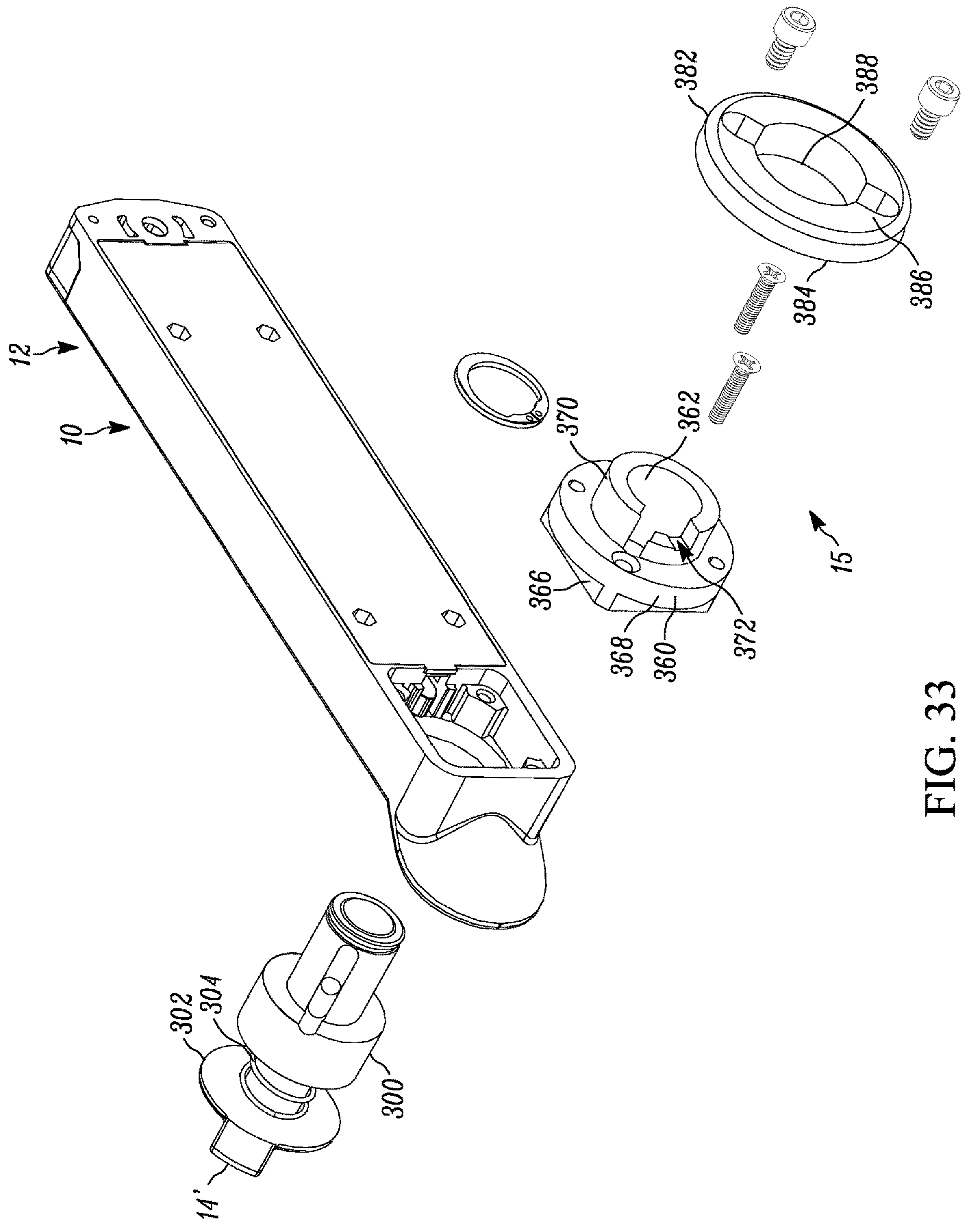
FIG. 33 of the drawings is an exploded perspective view of the lock of the present disclosure in the unlocked configuration.
Figure 34:
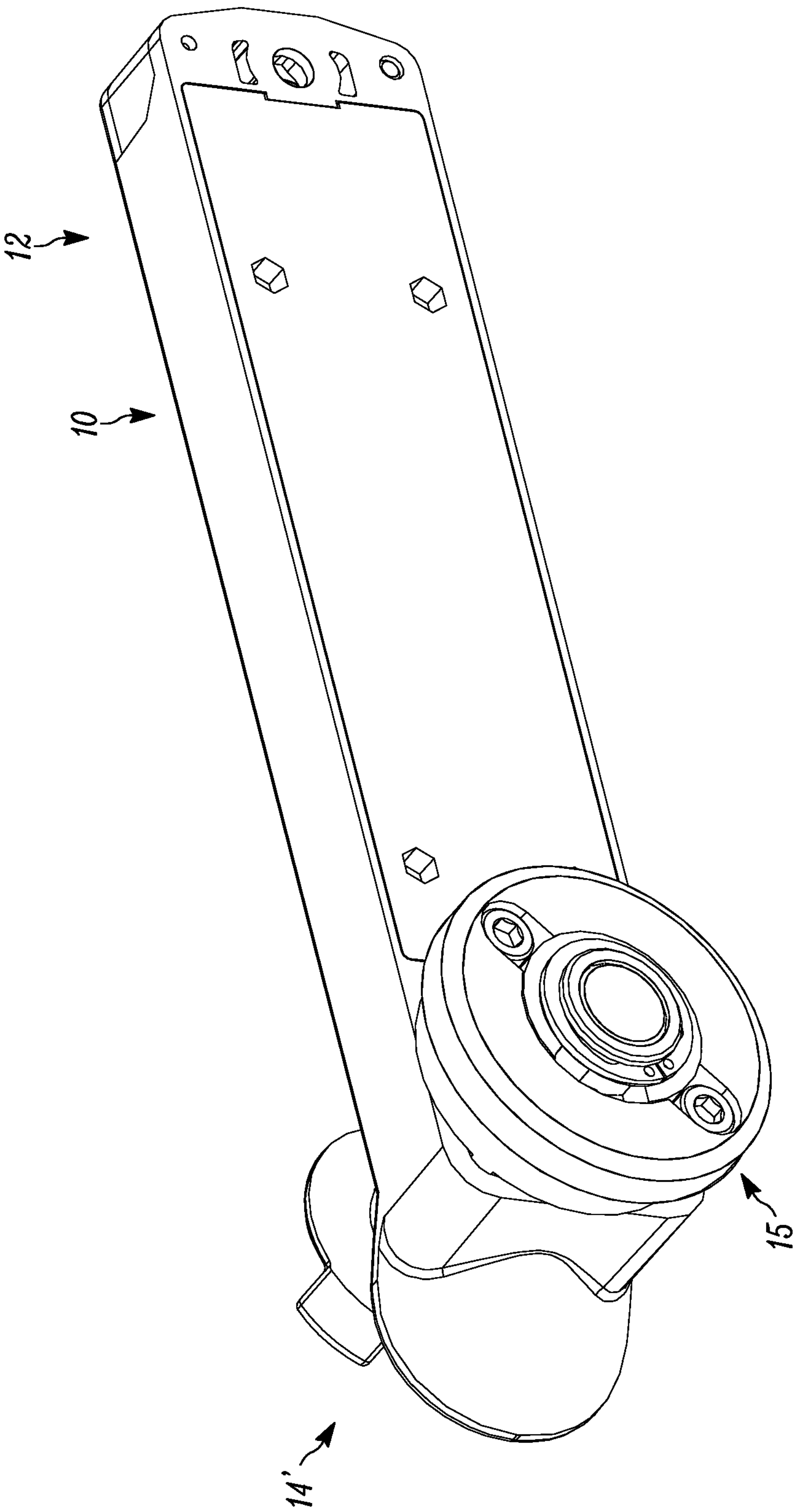
FIG. 34 of the drawings is a back perspective view of the lock of the present disclosure in the unlocked configuration.
Figure 36:
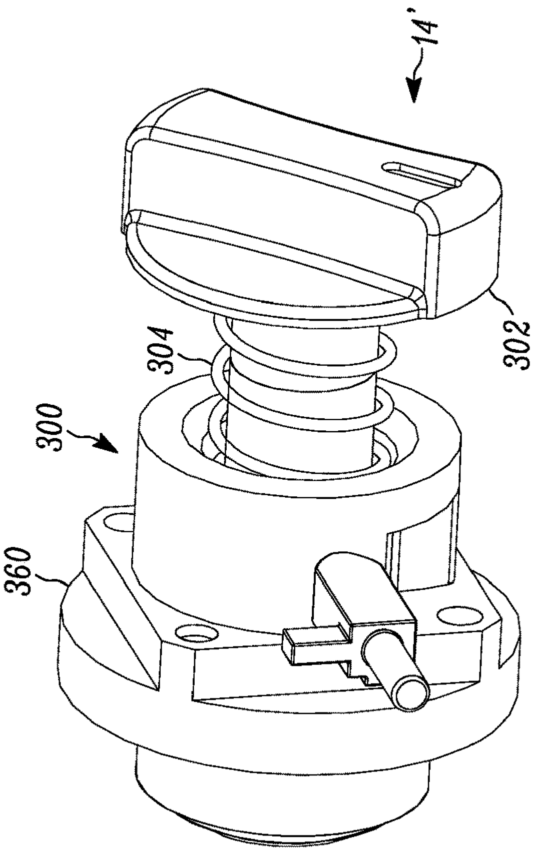
FIG. 36 of the drawings is a front perspective view of the locking shell assembly and the actuatable lock assembly of the present disclosure in an unlocked configuration.
Figure 35:
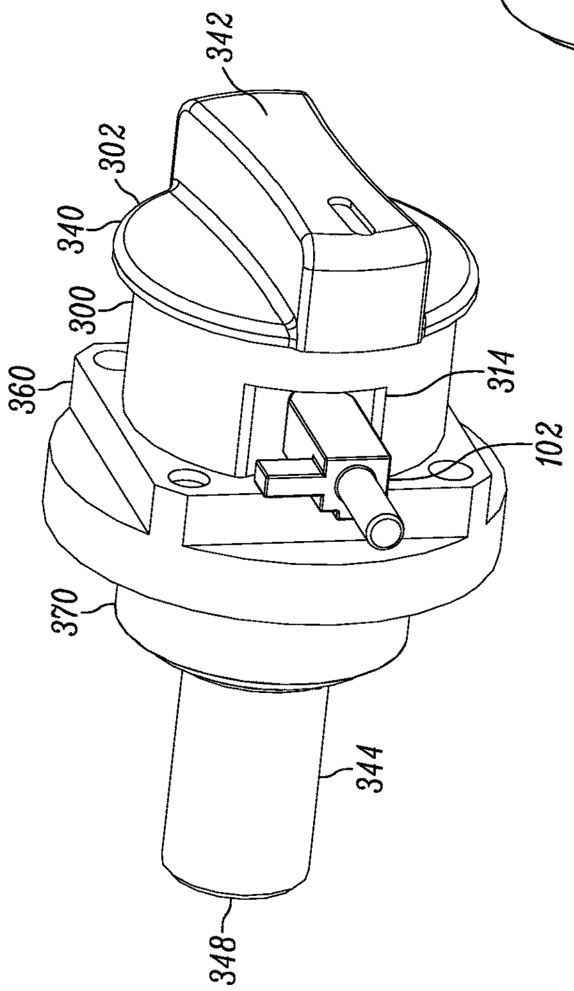
FIG. 35 of the drawings is a front perspective view of the locking shell assembly and the actuatable lock assembly of the present disclosure in a locked configuration.
Figure 38:
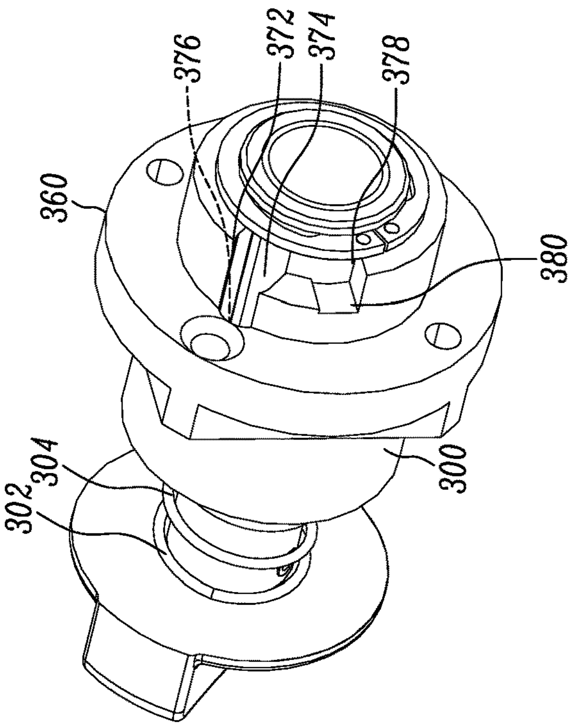
FIG. 38 of the drawings is a back perspective view of the locking shell assembly and the actuatable lock assembly of the present disclosure in an unlocked configuration.
Figure 37:
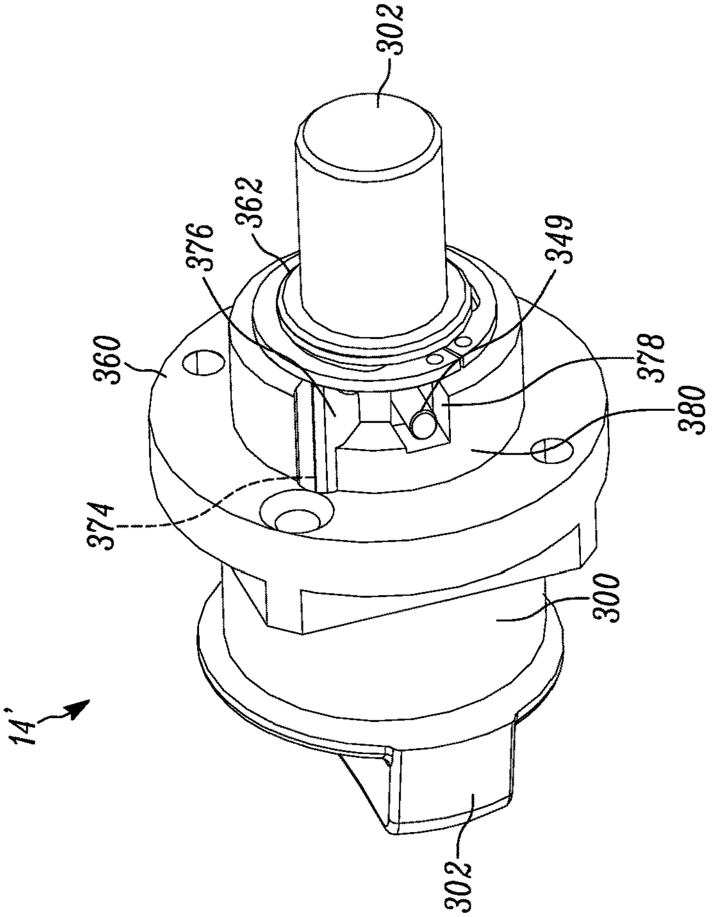
FIG. 37 of the drawings is a back perspective view of the locking shell assembly and the actuatable lock assembly of the present disclosure in a locked configuration.
Figure 39:
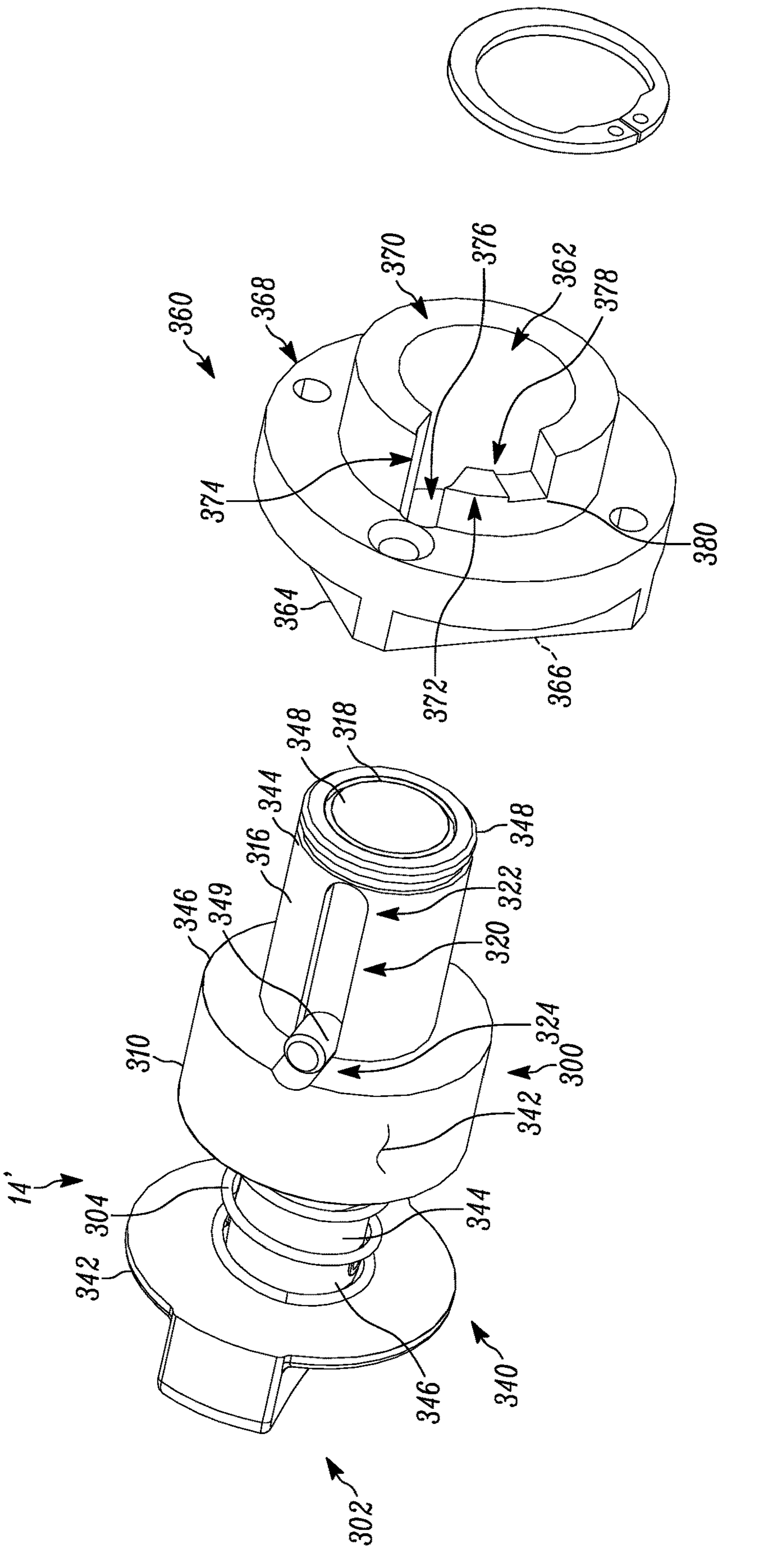
FIG. 39 of the drawings is an exploded back perspective view of the locking shell assembly and the actuatable lock assembly of the present disclosure in an unlocked configuration.
Figure 40:
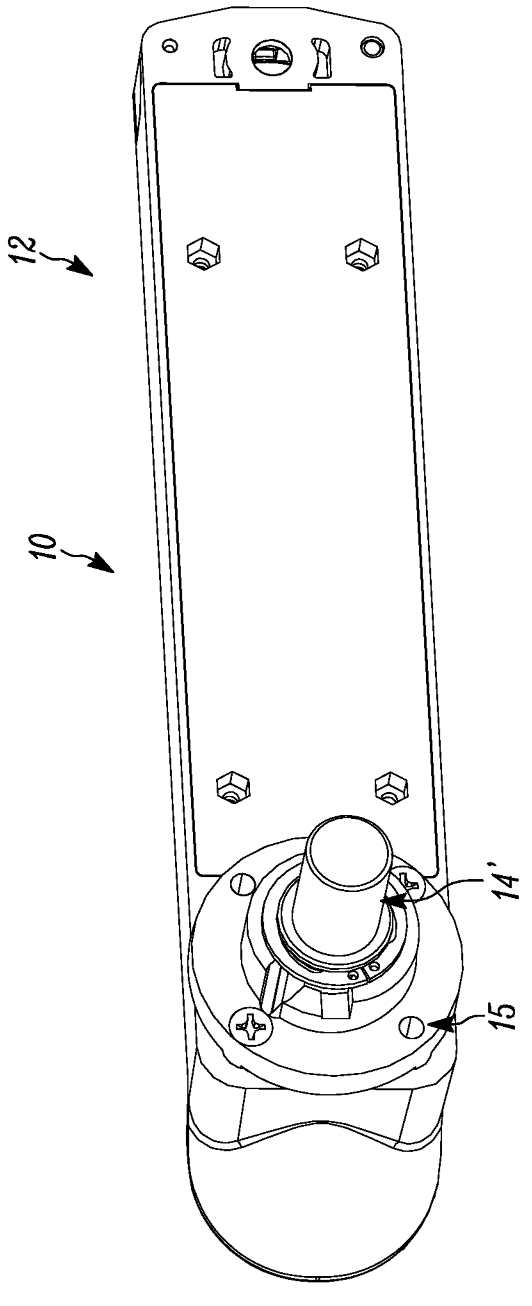
FIG. 40 of the drawings is a back perspective view of the lock without the back plate in an unlocked configuration.
Figure 41:
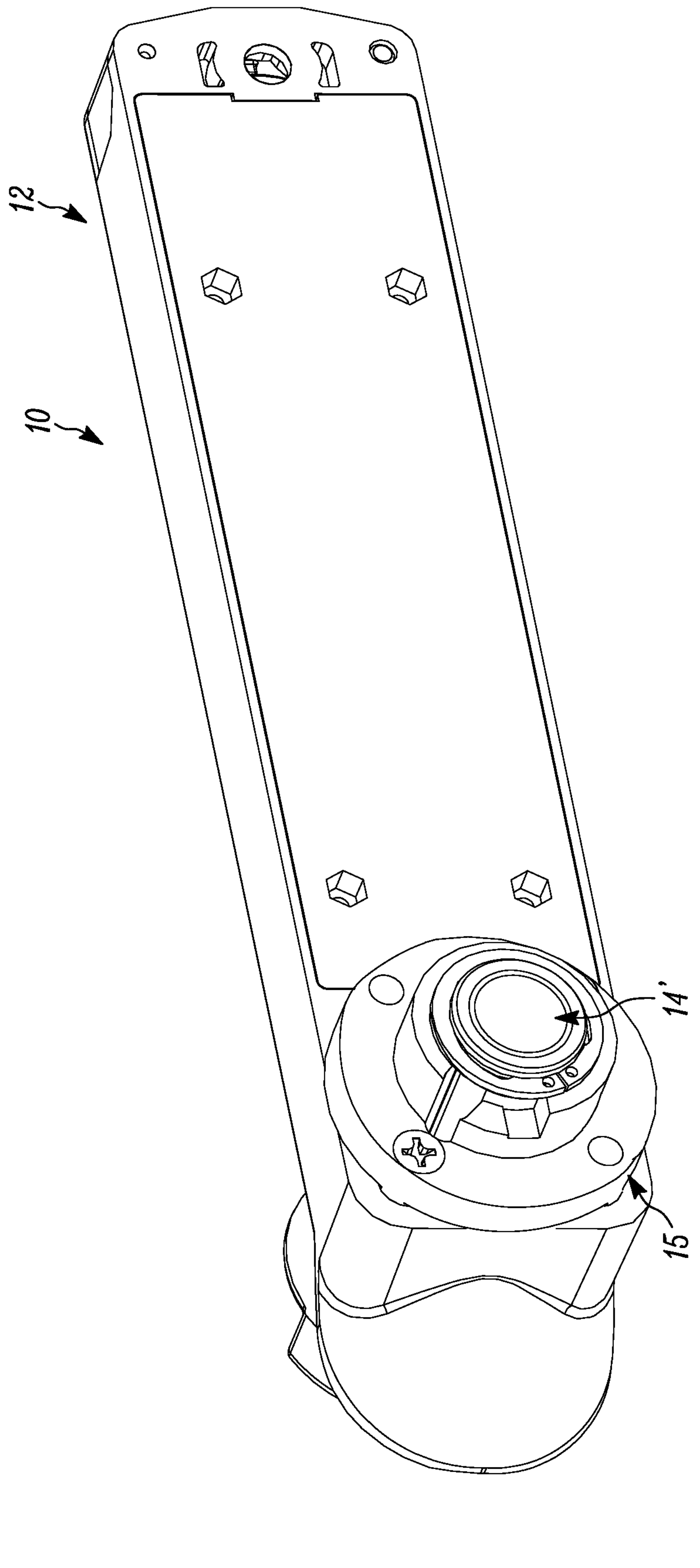
FIG. 41 of the drawings is a back perspective view of the lock without the back plate in a locked configuration.

In yet another embodiment, shown in FIGS. 29A through 29C, the blocker function and the latch function can be integrated into a single element. That is, the distal end of the latch can be configured to include the first cam profile and the second cam profile that was on the blocker. The cam profiles are in the direction of translation of the latch, as opposed to being perpendicular thereto in the other embodiments. The cam and the motor are rotated so that the cam can interface with the first and second cam profiles. In turn, actuation of the motor directly moves the latch.

In another configuration, with reference to FIGS. 30 through 41, the actuatable lock assembly 14' is shown cooperating with locking shell assembly 15. The actuatable lock assembly 14' includes outer body 300, inner body 302 and biasing member 304. The actuatable lock assembly 14' can be utilized in place of the actuatable lock assembly 14 and cooperatively with the locking shell assembly 15. The remainder of the lock may be similar, although variations are contemplated. For example, the housing assembly 12 may include additional structures to allow for improved grasping and manipulation by a user. Other configurations are likewise contemplated.

The outer body 300 of the actuatable lock assembly 14' includes front portion 310 and rear portion 316. A bore 318 extends through the outer body 300 (configured to slidably and rotatably receive the inner body 302). The front portion 310 and the rear portion each comprise cylindrical members having a common central longitudinal axis with the front portion having a larger diameter than the rear portion. The front portion includes outer surface 312 that includes axial notch 314 (which is similar to the axial notch 84 in function, as it engages with the latch 102 when aligned).

The rear portion 316 includes the longitudinal slot 320 which has a proximal end 324 and a distal end 322. The longitudinal slot is generally parallel to the longitudinal central axis of the outer body, and in the configuration shown, generally extends the length of the rear portion, and may extend into the front portion as well, as is shown in the present configuration.

The inner body 302 is slidably and rotatably positionable within the bore 318 of the outer body and includes a knob 340, and an elongated shaft 344 (which is the component that is slidably and rotatably movable within the bore 318 of the outer body). The knob 340 includes outer surface 342 which includes surface variations that allow for rotative and transitive movement of the knob relative to the lock both in an inward and outward motion and also in a rotative motion.

The elongated shaft 344 includes proximal end 346, distal end 348 and axial pin 349. The elongated shaft is sized so as to slidably fit (and generally shape match) the bore 318. Between the proximal end 346 and the distal end 348, an axial pin 349 extends axially outwardly therefrom. The axial pin 349 is configured to slide within the longitudinal slot 320 between the proximal and distal ends thereof. The cooperation of the axial pin 349 and the longitudinal slot 320 defines the slidable limits of motion of the inner body relative to the outer body, and also joins the two structures so that they rotate in unison, as the longitudinal slot is parallel to the central longitudinal axis of the outer and inner bodies.

A biasing member 304, shown to be a compression spring, outwardly biases the inner body relative to the outer body. In particular, the biasing member at one end interfaces with the front portion 310 and at the other end, the rear surface of knob 340 so as to direct the knob away from the outer body. This also directs the axial pin 349 toward and into contact with the proximal end 324 of the longitudinal slot 320.

The locking shell assembly 15 is shown as comprising shell housing 360 and back plate 382, both of which are fixedly attached to the housing assembly 12. The locking shell assembly interfaces with the actuatable lock assembly 14'. The shell housing 360 includes bore 362, front portion 364, front face 366, attachment flange 368 and rear portion 370. The front portion is coupled to a back surface of the housing assembly so that the bore 362 aligns with and is sized so as to receive the rear portion 316 of the outer body 316. The attachment flange 368 extends beyond the front face and is configured to interface with an opening in a door or other part of a volume to be protected. The rear portion 370 comprises a generally cylindrical portion that whose diameter is such that the axial pin does not extend beyond the outer surface thereof.

A slot 372 is formed in the shell housing 360 and includes a first portion and a second portion. The first portion extends longitudinally through the shell housing, and through the front and rear portions 364, 370. The first portion generally corresponds in length to the longitudinal slot 320 of the outer body 300. The proximal end of the first portion defines front stop 376.

The second portion 378 extends from a distal end of the first portion and extends transverse to the first portion 374 along the distal end of the rear portion (and may be open at the distal end of the rear portion of the shell housing). The second portion of the slot terminates (allowing for less than a quarter turn of the outer and inner bodies) at a longitudinal locking detent 380 formed at the far end of the second portion, away from where the second portion meets the first portion.

A back plate 382 is attached to the shell housing 360. The back plate 382 includes front face 384 and back face 386, with bore 388. The rear portion 370 is configured to extend through the bore 388 of the back plate 382. The back plate, in the configuration shown, has a cylindrical outer surface that extends beyond the outer surface of the attachment flange 368 of the shell housing 360.

In operation, and with reference to FIGS. 35 through 38, the actuatable lock assembly 14' is first assembled by extending the inner body through the bore 318 of the outer body 300, and sandwiching the biasing member 304 there between. Once extended, the axial pin is attached to the inner body by being extended through the longitudinal slot. Once the axial pin is attached, the outer and inner bodies are attached to each other, with the biasing member being sandwiched therebetween and the engagement of the longitudinal slot and the axial pin limits the movement of the components relative to each other.

Once the actuatable lock assembly 14' is assembled it is ready to be coupled to the lock. The lock is assembled by attaching the shell housing 360 and the back plate 382 to the housing of the lock. The lock assembly is directed through the bores 362 and 388 (once the axial pin 349 is aligned with the first portion of the slot 372. The lock assembly is further driven through the bores until fully inserted. A circlip may interface with the distal end of the rear portion of the outer body 300 so as to lock against the rear portion 370 so as to preclude separation of the actuatable lock assembly 14' from within the bores.

To operate the lock, in a locked configuration, the latch 102 extends into the axial notch 314 of the outer body. At the same time, the inner body is fully extended through the outer body, and the axial pin reaches the locking detent 380 of the slot 372 of the rear portion 370. In such a configuration, the latch 102 cannot be slidably moved, and the outer body and inner body remain in the configuration described.

When the latch 102 is freely slidably movable. The user can rotate the knob to direct the latch 102 out of the axial notch. As the knob is rotated, the axial pin moves from the locking detent 380 toward the first portion 374 with the inner and outer bodies rotating in unison. Once the axial pin reaches the end of the second portion and the distal end of the first portion, the biasing member directs the inner body 302 to slidably withdraw from the bore of the 362. The relative movement is reached when the axial pin reaches the front stop 376. When this is reached, the inner body is substantially flush with the distal end of the outer body.

It will be understood that the locking can be achieved through the same operation in reverse. It will be understood that, due to the configuration of the slot 372, the inner body must first be pushed inward through the outer body so that the axial pin reaches the second portion of the slot 372. Only when reached, can the knob be rotated (with the axial pin) traversing the second portion of the slot 372.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A lock comprising:

a housing assembly defining a cavity, the housing assembly having front surface and a back surface opposite the front surface, with a bore extending therethrough;

an actuatable lock assembly associated with the housing, the actuatable lock assembly being rotatable relative to the housing assembly in at least one of a closed orientation and an open orientation, the actuatable lock assembly further comprising:

an outer body extendable through the bore of the housing assembly, the outer body having a bore extending therethrough, and having a front portion and a rear portion, with a longitudinal slot defined in the rear portion, and an axial notch defined in the front portion;

an inner body including a knob with an elongated shaft extending therefrom, and through the bore of the outer body, and, an axial pin extending radially from the elongated shaft and slidably positionable along the longitudinal slot;

a locking shell assembly having a shell housing with a shell housing bore extending therethrough, a rear portion of the shell housing having a slot with a longitudinal first portion and a transverse second portion, wherein the axial pin is slidably movable along the longitudinal first portion and slidably movable along the transverse second portion upon rotation of the inner body relative to the shell housing; and a latch positionable within the cavity of the housing, the latch insertable into the axial notch of the front portion of the of the actuatable lock assembly, wherein in a locked configuration, removal of the latch from the axial notch is precluded, thereby precluding rotation of the outer body relative to the housing, and wherein in an unlocked configuration, the latch is removably positionable relative to the latch so as to be directable out of the axial notch sufficiently to allow rotation of the outer body relative to the housing.

2. The lock of claim 1 wherein the transverse second portion of the slot of the shell housing further includes a locking detent, wherein, in a locked configuration, the axial pin is positioned within the locking detent.

3. The lock of claim 2 wherein the transverse slot defines a quarter turn of the knob.

4. The lock of claim 1 wherein the housing is positionable on an outer surface of a volume to be protected.

5. A lock comprising:

a housing assembly defining a cavity, the housing assembly having front surface and a back surface opposite the front surface, with a bore extending therethrough;

an actuatable lock assembly associated with the housing, the actuatable lock assembly being rotatable relative to the housing assembly in at least one of a closed orientation and an open orientation, the actuatable lock assembly further comprising:

an outer body extendable through the bore of the housing assembly, the outer body having a bore extending therethrough, and having a front portion and a rear portion, with a longitudinal slot defined in the rear portion;

an inner body including a knob with an elongated shaft extending therefrom, and through the bore of the outer body, and, an axial pin extending radially from the elongated shaft and slidably positionable along the longitudinal slot; and a locking shell assembly having a shell housing with a shell housing bore extending therethrough, a rear portion of the shell housing having a slot with a longitudinal first portion and a transverse second portion, wherein the axial pin is slidably movable along the longitudinal first portion and slidably movable along the transverse second portion upon rotation of the inner body relative to the shell housing, wherein the longitudinal slot has a proximal end at or near the front portion, and a distal end spaced apart therefrom away from the front portion, the actuatable lock assembly further comprising a biasing member biasing the axial pin toward the proximal end of the longitudinal slot, and wherein the biasing member biases the axial pin into the proximal end of the longitudinal slot, with the axial pin limiting the further slidably movement by the inner body relative to the outer body.

6. The lock of claim 5 wherein the biasing member comprises a spring positioned between an outer surface of the front portion and a rear portion of the knob.

7. A lock comprising:

a housing assembly defining a cavity, the housing assembly having front surface and a back surface opposite the front surface, with a bore extending therethrough;

an actuatable lock assembly associated with the housing, the actuatable lock assembly being rotatable relative to the housing assembly in at least one of a closed orientation and an open orientation, the actuatable lock assembly further comprising:

an outer body extendable through the bore of the housing assembly, the outer body having a bore extending therethrough, and having a front portion and a rear portion, with a longitudinal slot defined in the rear portion;

an inner body including a knob with an elongated shaft extending therefrom, and through the bore of the outer body, and, an axial pin extending radially from the elongated shaft and slidably positionable along the longitudinal slot; and a locking shell assembly having a shell housing with a shell housing bore extending therethrough, a rear portion of the shell housing having a slot with a longitudinal first portion and a transverse second portion, wherein the axial pin is slidably movable along the longitudinal first portion and slidably movable along the transverse second portion upon rotation of the inner body relative to the shell housing, wherein the outer body is precluded from longitudinal slidable movement within the bore of the housing, while the inner body is both selectively rotatable with the outer body within the bore of the housing, and, slidably movable within the bore of the housing and the within the bore of the outer body.

8. A lock comprising:

a housing assembly defining a cavity, the housing assembly having front surface and a back surface opposite the front surface, with a bore extending therethrough;

an actuatable lock assembly associated with the housing, the actuatable lock assembly being rotatable relative to the housing assembly in at least one of a closed orientation and an open orientation, the actuatable lock assembly further comprising:

an outer body extendable through the bore of the housing assembly, the outer body having a bore extending therethrough, and having a front portion and a rear portion, with a longitudinal slot defined in the rear portion;

an inner body including a knob with an elongated shaft extending therefrom, and through the bore of the outer body, and, an axial pin extending radially from the elongated shaft and slidably positionable along the longitudinal slot;

a locking shell assembly having a shell housing with a shell housing bore extending therethrough, a rear portion of the shell housing having a slot with a longitudinal first portion and a transverse second portion, wherein the axial pin is slidably movable along the longitudinal first portion and slidably movable along the transverse second portion upon rotation of the inner body relative to the shell housing; and a circlip at a distal end of the rear portion of the outer body, the circlip interfacing with the rear portion of the shell housing, to, preclude slidable movement of the outer body within the bore of the housing.

9. A lock comprising:

a housing assembly defining a cavity, the housing assembly having front surface and a back surface opposite the front surface, with a bore extending therethrough;

an actuatable lock assembly associated with the housing, the actuatable lock assembly being rotatable relative to the housing assembly in at least one of a closed orientation and an open orientation, the actuatable lock assembly further comprising:

an outer body extendable through the bore of the housing assembly, the outer body having a bore extending therethrough, and having a front portion and a rear portion, with a longitudinal slot defined in the rear portion;

an inner body including a knob with an elongated shaft extending therefrom, and through the bore of the outer body, and, an axial pin extending radially from the elongated shaft and slidably positionable along the longitudinal slot;

a locking shell assembly having a shell housing with a shell housing bore extending therethrough, a rear portion of the shell housing having a slot with a longitudinal first portion and a transverse second portion, wherein the axial pin is slidably movable along the longitudinal first portion and slidably movable along the transverse second portion upon rotation of the inner body relative to the shell housing; and a latching assembly positionable in one of a locked position and an unlocked position, the latching assembly being positioned within the cavity of the housing, the latching assembly further including an actuator, upon actuation of thereof, is configured to position the latching assembly in one of a locked position and an unlocked position, wherein positioning in the unlocked position allows rotation of the knob, and, in turn, direction of the actuatable lock assembly from a closed orientation to the open orientation, and wherein positioning in the locked position precludes direction of the actuatable lock assembly into the open orientation.

10. The lock of claim 9 further comprising an electric control assembly electronically coupled to the actuator and positioned within the housing assembly, the electronic control assembly configured to control the same, and an input device positioned on the front surface of the housing assembly, the input device allowing a user to provide an authorizing signal to the electronic control assembly to direct the actuator to initiate rotation thereof.

* * * * *